(12) United States Patent
Rodrigues et al.

(10) Patent No.: US 9,109,068 B2
(45) Date of Patent: *Aug. 18, 2015

(54) HYBRID COPOLYMER COMPOSITIONS

(75) Inventors: Klin A. Rodrigues, Signal Mountain, TN (US); Matthew M. Vanderhoof, Chattanooga, TN (US); Allen M. Carrier, Hixson, TN (US); Jannifer Sanders, Hixson, TN (US)

(73) Assignee: AKZO NOBEL N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/387,882

(22) PCT Filed: Jul. 30, 2010

(86) PCT No.: PCT/US2010/043919
§ 371 (c)(1),
(2), (4) Date: Jan. 30, 2012

(87) PCT Pub. No.: WO2011/014783
PCT Pub. Date: Feb. 3, 2011

(65) Prior Publication Data
US 2012/0128608 A1    May 24, 2012

Related U.S. Application Data

(63) Continuation of application No. 12/689,844, filed on Jan. 19, 2010, now abandoned, which is a continuation of application No. 11/458,180, filed on Jul. 18, 2006, now Pat. No. 7,666,963, said application No.
(Continued)

(30) Foreign Application Priority Data

Nov. 10, 2009  (EP) ................................. 09175465

(51) Int. Cl.
C08B 37/00    (2006.01)
C08F 289/00    (2006.01)
(Continued)

(52) U.S. Cl.
CPC ................. *C08F 289/00* (2013.01); *C02F 5/10* (2013.01); *C08F 2/38* (2013.01); *C08F 251/00* (2013.01);
(Continued)

(58) Field of Classification Search
USPC ............ 524/31; 525/54.3; 210/702; 526/200; 252/175; 510/247
See application file for complete search history.

(56) References Cited

U.S. PATENT DOCUMENTS 2,536,658 A    1/1951    Rheineck
2,798,053 A    7/1957    Brown
(Continued)

FOREIGN PATENT DOCUMENTS

CA    2074747    2/1993
CN    1087649 A    6/1994
(Continued)

OTHER PUBLICATIONS

Pal, S., et al., "Cationic starch: an effective flocculating agent," Carbohydrate Polymers, 2005, 59, 417-423.*
(Continued)

*Primary Examiner* — Liam J Heincer
*Assistant Examiner* — Nicholas Hill
(74) *Attorney, Agent, or Firm* — Sandra B. Weiss

(57) ABSTRACT

Hybrid copolymer compositions include a hybrid copolymer including at least one ethylenically unsaturated monomer and a naturally derived hydroxyl containing chain transfer agent as an end group; and a hybrid synthetic copolymer including one or more synthetic polymers derived from the at least one ethylenically unsaturated monomer with at least one initiator fragment as an end group. The hybrid copolymer composition may be prepared as a scale inhibiting composition. Methods of preparing a hybrid copolymer are also included.

29 Claims, 9 Drawing Sheets

Related U.S. Application Data

PCT/US2010/043919 is a continuation of application No. 12/533,802, filed on Jul. 31, 2009, now abandoned.

(60) Provisional application No. 60/701,380, filed on Jul. 21, 2005.

(51) Int. Cl.

| | | |
|---|---|---|
| C02F 5/10 | (2006.01) | |
| C08F 2/38 | (2006.01) | |
| C08F 251/00 | (2006.01) | |
| C08F 251/02 | (2006.01) | |
| C08F 291/00 | (2006.01) | |
| C08L 51/00 | (2006.01) | |
| C08L 51/02 | (2006.01) | |
| C11D 3/22 | (2006.01) | |
| C11D 3/37 | (2006.01) | |

(52) U.S. Cl.
CPC ............ *C08F 251/02* (2013.01); *C08F 291/00* (2013.01); *C08L 51/003* (2013.01); *C08L 51/02* (2013.01); *C11D 3/222* (2013.01); *C11D 3/3788* (2013.01)

(56) References Cited

U.S. PATENT DOCUMENTS

| | | |
|---|---|---|
| 2,954,347 A | 9/1960 | St. John et al. |
| 3,048,548 A | 8/1962 | Martin et al. |
| 3,308,067 A | 3/1967 | Diehl |
| 3,314,891 A | 4/1967 | Schmolka et al. |
| 3,334,147 A | 8/1967 | Brunelle et al. |
| 3,442,242 A | 5/1969 | Laskey et al. |
| 3,455,839 A | 7/1969 | Rauner . |
| 3,518,176 A | 6/1970 | Reyes et al. |
| 3,629,121 A | 12/1971 | Eldib |
| 3,639,312 A | 2/1972 | Turner |
| 3,673,148 A | 6/1972 | Vasta |
| 3,687,878 A | 8/1972 | Imoto et al. |
| 3,723,322 A | 3/1973 | Diehl |
| 3,803,285 A | 4/1974 | Jensen |
| 3,929,107 A | 12/1975 | Renger |
| 3,929,678 A | 12/1975 | Laughlin et al. |
| 3,933,672 A | 1/1976 | Bartolotta et al. |
| 4,048,122 A | 9/1977 | Sibley et al. |
| 4,131,576 A | 12/1978 | Iovine et al. |
| 4,133,779 A | 1/1979 | Hellyer et al. |
| 4,141,841 A | 2/1979 | McDanald |
| 4,228,042 A | 10/1980 | Letton |
| 4,239,660 A | 12/1980 | Kingry |
| 4,260,529 A | 4/1981 | Letton |
| 4,265,779 A | 5/1981 | Gandolfo et al. |
| 4,322,472 A | 3/1982 | Kaspar et al. |
| 4,374,035 A | 2/1983 | Bossu |
| 4,379,080 A | 4/1983 | Murphy |
| 4,388,205 A | 6/1983 | Stettler et al. |
| 4,412,934 A | 11/1983 | Chung et al. |
| 4,483,779 A | 11/1984 | Llenado et al. |
| 4,483,780 A | 11/1984 | Llenado |
| 4,521,578 A * | 6/1985 | Chen et al. .................. 526/288 |
| 4,536,314 A | 8/1985 | Hardy et al. |
| 4,539,130 A | 9/1985 | Thompson et al. |
| 4,557,763 A | 12/1985 | George et al. |
| 4,565,647 A | 1/1986 | Llenado |
| 4,597,898 A | 7/1986 | Vander Meer |
| 4,605,721 A | 8/1986 | Jenkins et al. |
| 4,606,838 A | 8/1986 | Burns |
| 4,618,914 A | 10/1986 | Sato et al. |
| 4,634,551 A | 1/1987 | Burns et al. |
| 4,652,392 A | 3/1987 | Baginski et al. |
| 4,671,891 A | 6/1987 | Hartman |
| 4,681,592 A | 7/1987 | Hardy et al. |
| 4,681,695 A | 7/1987 | Divo |
| 4,681,704 A | 7/1987 | Bernardino et al. |
| 4,686,063 A | 8/1987 | Burns |
| 4,702,857 A | 10/1987 | Gosselink |
| 4,782,901 A | 11/1988 | Phelps et al. |
| 4,830,773 A | 5/1989 | Olson |
| 4,855,069 A | 8/1989 | Schuppiser et al. |
| 4,963,629 A | 10/1990 | Driemel et al. |
| 4,968,451 A | 11/1990 | Scheibel et al. |
| 5,032,659 A | 7/1991 | Heidel |
| 5,071,895 A | 12/1991 | Hughes et al. |
| 5,076,968 A | 12/1991 | Fringeli et al. |
| 5,121,795 A | 6/1992 | Ewert et al. |
| 5,125,455 A | 6/1992 | Harris et al. |
| 5,223,171 A | 6/1993 | Jost et al. |
| 5,227,446 A | 7/1993 | Denzinger et al. |
| 5,248,449 A | 9/1993 | Mitchell et al. |
| 5,264,470 A | 11/1993 | Eoff |
| 5,296,470 A | 3/1994 | Vaslin et al. |
| 5,304,620 A | 4/1994 | Holtmyer et al. |
| 5,326,864 A | 7/1994 | Besemer et al. |
| 5,332,528 A | 7/1994 | Pan et al. |
| 5,378,830 A | 1/1995 | Yeh |
| 5,385,959 A | 1/1995 | Tsaur et al. |
| 5,412,026 A | 5/1995 | Holy et al. |
| 5,415,807 A | 5/1995 | Gosselink et al. |
| 5,435,935 A | 7/1995 | Kupneski |
| 5,478,503 A | 12/1995 | Swift |
| 5,500,154 A | 3/1996 | Bacon et al. |
| 5,501,815 A | 3/1996 | Man |
| 5,518,646 A | 5/1996 | Van den Brom |
| 5,518,657 A | 5/1996 | Fringeli et al. |
| 5,523,023 A | 6/1996 | Kleinstuck et al. |
| 5,543,459 A | 8/1996 | Hartmann et al. |
| 5,547,612 A | 8/1996 | Austin et al. |
| 5,565,145 A | 10/1996 | Watson et al. |
| 5,580,154 A | 12/1996 | Coulter et al. |
| 5,580,941 A | 12/1996 | Krause et al. |
| 5,583,193 A | 12/1996 | Aravindakshan et al. |
| 5,654,198 A | 8/1997 | Carrier et al. |
| 5,656,646 A | 8/1997 | Perner et al. |
| 5,658,651 A | 8/1997 | Smith et al. |
| 5,670,475 A | 9/1997 | Trinh et al. |
| 5,674,511 A | 10/1997 | Kacher et al. |
| 5,753,770 A | 5/1998 | Breitenbach et al. |
| 5,756,442 A | 5/1998 | Jeschke et al. |
| 5,760,154 A | 6/1998 | Krause et al. |
| 5,830,241 A | 11/1998 | Rohringer et al. |
| 5,852,069 A | 12/1998 | Meister et al. |
| 5,854,191 A | 12/1998 | Krause et al. |
| 5,854,321 A | 12/1998 | Krause et al. |
| 5,869,070 A | 2/1999 | Dixon et al. |
| 5,942,477 A | 8/1999 | Giret et al. |
| 5,942,479 A | 8/1999 | Frankenbach et al. |
| 5,942,485 A | 8/1999 | Kemen |
| 5,945,127 A | 8/1999 | Breitenbach et al. |
| 5,952,278 A | 9/1999 | Mao et al. |
| 5,977,275 A | 11/1999 | Rodrigues et al. |
| 5,985,809 A | 11/1999 | Frankenbach et al. |
| 5,990,065 A | 11/1999 | Vinson et al. |
| 6,004,922 A | 12/1999 | Watson et al. |
| 6,008,181 A | 12/1999 | Cripe et al. |
| 6,020,303 A | 2/2000 | Cripe et al. |
| 6,022,844 A | 2/2000 | Baillely et al. |
| 6,025,311 A | 2/2000 | Clarke et al. |
| 6,060,299 A | 5/2000 | Sreekrishna et al. |
| 6,060,443 A | 5/2000 | Cripe et al. |
| 6,060,582 A | 5/2000 | Hubbell et al. |
| 6,069,122 A | 5/2000 | Vinson et al. |
| 6,093,856 A | 7/2000 | Cripe et al. |
| 6,103,839 A | 8/2000 | Patel et al. |
| 6,106,849 A | 8/2000 | Malkan et al. |
| 6,130,194 A | 10/2000 | Pancheri et al. |
| 6,136,769 A | 10/2000 | Asano et al. |
| 6,143,707 A | 11/2000 | Trinh et al. |
| 6,150,322 A | 11/2000 | Singleton et al. |
| 6,153,570 A | 11/2000 | Decoster |
| 6,153,577 A | 11/2000 | Cripe et al. |
| 6,162,423 A | 12/2000 | Sebag et al. |
| 6,169,062 B1 | 1/2001 | Salager et al. |

(56) References Cited

U.S. PATENT DOCUMENTS

| | | |
|---|---|---|
| 6,194,362 B1 | 2/2001 | Trinh et al. |
| 6,221,825 B1 | 4/2001 | Williams, Jr. et al. |
| 6,225,462 B1 | 5/2001 | Berry et al. |
| 6,231,650 B1 | 5/2001 | Mallow et al. |
| 6,255,427 B1 | 7/2001 | Exner et al. |
| 6,303,560 B1 | 10/2001 | Hartan et al. |
| 6,365,561 B1 | 4/2002 | Vinson et al. |
| 6,372,708 B1 | 4/2002 | Kasturi et al. |
| 6,376,438 B1 | 4/2002 | Rosenberger et al. |
| 6,384,132 B1 | 5/2002 | Horley et al. |
| 6,423,775 B1 | 7/2002 | Brune et al. |
| 6,451,747 B1 | 9/2002 | Decoster |
| 6,482,994 B2 | 11/2002 | Scheper et al. |
| 6,528,477 B2 | 3/2003 | Kasturi et al. |
| 6,537,957 B1 | 3/2003 | Cardola et al. |
| 6,573,234 B1 | 6/2003 | Sivik et al. |
| 6,589,926 B1 | 7/2003 | Vinson et al. |
| 6,605,182 B1 | 8/2003 | Danner |
| 6,627,590 B1 | 9/2003 | Sherry et al. |
| 6,645,925 B2 | 11/2003 | Sivik et al. |
| 6,656,900 B2 | 12/2003 | Sivik et al. |
| 6,764,992 B2 | 7/2004 | Kumar et al. |
| 6,800,712 B2 | 10/2004 | Doane et al. |
| 6,867,262 B1 | 3/2005 | Angel et al. |
| 6,908,955 B2 | 6/2005 | Porsch et al. |
| 6,911,053 B1 | 6/2005 | Bijsterbosch et al. |
| 7,012,048 B2 | 3/2006 | Drovetskaya et al. |
| 7,087,662 B2 | 8/2006 | Ghosh et al. |
| 7,151,079 B2 | 12/2006 | Fack et al. |
| 7,153,821 B2 | 12/2006 | Blokzijl et al. |
| 7,157,413 B2 | 1/2007 | Lazzeri et al. |
| 7,435,293 B2 | 10/2008 | Caveny et al. |
| 7,589,051 B2 | 9/2009 | Erazo-Majewicz et al. |
| 7,666,963 B2 | 2/2010 | Rodrigues et al. |
| 7,670,388 B2 | 3/2010 | Sugano et al. |
| 7,727,945 B2 | 6/2010 | Rodrigues et al. |
| 7,740,873 B2 | 6/2010 | Decoster et al. |
| 7,754,666 B2 | 7/2010 | Walters et al. |
| 7,902,276 B2 | 3/2011 | Sakai et al. |
| 8,058,374 B2 | 11/2011 | Rodrigues et al. |
| 8,227,381 B2 | 7/2012 | Rodrigues et al. |
| 8,674,021 B2 | 3/2014 | Rodrigues et al. |
| 2002/0016282 A1 | 2/2002 | Kumar et al. |
| 2002/0034487 A1 | 3/2002 | Maubru et al. |
| 2002/0055446 A1 | 5/2002 | Perron et al. |
| 2002/0106747 A1 | 8/2002 | Cheng et al. |
| 2002/0173592 A1 | 11/2002 | Saeki et al. |
| 2003/0008793 A1 | 1/2003 | Takiguchi et al. |
| 2003/0008804 A1 | 1/2003 | Xu et al. |
| 2003/0092584 A1 | 5/2003 | Crews |
| 2003/0147827 A1 | 8/2003 | Decoster et al. |
| 2003/0147842 A1 | 8/2003 | Restle et al. |
| 2003/0211952 A1 | 11/2003 | Erazo-Majewicz et al. |
| 2004/0033929 A1 | 2/2004 | Bertleff et al. |
| 2004/0039137 A1 | 2/2004 | Heinemann et al. |
| 2004/0048760 A1 | 3/2004 | Rabon et al. |
| 2004/0067864 A1 | 4/2004 | Aubay et al. |
| 2004/0067865 A1 | 4/2004 | Harrison |
| 2004/0071742 A1 | 4/2004 | Popplewell et al. |
| 2004/0092425 A1 | 5/2004 | Boutique et al. |
| 2004/0102354 A1 | 5/2004 | Fack et al. |
| 2004/0103483 A1 | 6/2004 | Delplancke et al. |
| 2004/0107505 A1 | 6/2004 | Harrison et al. |
| 2004/0147425 A1 | 7/2004 | Castro et al. |
| 2004/0170596 A1 | 9/2004 | Hauschel et al. |
| 2004/0214736 A1 | 10/2004 | Modi |
| 2004/0266653 A1 | 12/2004 | Delplancke et al. |
| 2004/0266655 A1 | 12/2004 | Baum et al. |
| 2005/0019352 A1 | 1/2005 | Mercier et al. |
| 2005/0028293 A1 | 2/2005 | Geffroy |
| 2005/0108832 A1 | 5/2005 | Torri et al. |
| 2005/0143278 A1 | 6/2005 | Pegelow et al. |
| 2005/0171287 A1 | 8/2005 | Baum et al. |
| 2005/0175572 A1 | 8/2005 | Nguyen-Kim et al. |
| 2005/0176878 A1 | 8/2005 | Ettl et al. |
| 2005/0202985 A1 | 9/2005 | Nieendick et al. |
| 2005/0202989 A1 | 9/2005 | Wilson |
| 2005/0215449 A1 | 9/2005 | Penninger et al. |
| 2005/0256027 A1 | 11/2005 | Heibel et al. |
| 2005/0267008 A1 | 12/2005 | Carvell et al. |
| 2005/0271595 A1 | 12/2005 | Brown |
| 2005/0276831 A1 | 12/2005 | Dihora et al. |
| 2006/0019847 A1 | 1/2006 | Fan et al. |
| 2006/0019858 A1 | 1/2006 | Kruse et al. |
| 2006/0024353 A1 | 2/2006 | Trouve et al. |
| 2006/0029561 A1 | 2/2006 | Gunn et al. |
| 2006/0106186 A1 | 5/2006 | Dupont et al. |
| 2006/0111511 A1 | 5/2006 | Narayan et al. |
| 2006/0182917 A1 | 8/2006 | Wood et al. |
| 2006/0183203 A1 | 8/2006 | DeAngelis |
| 2006/0183856 A1 | 8/2006 | Wood et al. |
| 2006/0183857 A1 | 8/2006 | Wood et al. |
| 2006/0252901 A1 | 11/2006 | Narayan et al. |
| 2006/0258555 A1 | 11/2006 | Filippini et al. |
| 2006/0258557 A1 | 11/2006 | Popplewell et al. |
| 2006/0281654 A1 | 12/2006 | Brooker et al. |
| 2007/0015678 A1* | 1/2007 | Rodrigues et al. ............ 510/320 |
| 2007/0021577 A1 | 1/2007 | Rodrigues et al. |
| 2007/0054816 A1 | 3/2007 | Berthier et al. |
| 2007/0056900 A1 | 3/2007 | Mathauer et al. |
| 2007/0111920 A1 | 5/2007 | Baur et al. |
| 2007/0138105 A1 | 6/2007 | Takeda et al. |
| 2007/0260046 A1 | 11/2007 | Tomita et al. |
| 2008/0020948 A1 | 1/2008 | Rodrigues et al. |
| 2008/0020961 A1 | 1/2008 | Rodrigues et al. |
| 2008/0021167 A1 | 1/2008 | Rodrigues |
| 2008/0021168 A1 | 1/2008 | Rodrigues et al. |
| 2008/0118568 A1 | 5/2008 | Smets et al. |
| 2008/0139441 A1 | 6/2008 | Xiao et al. |
| 2008/0146478 A1 | 6/2008 | Lei et al. |
| 2008/0230193 A1 | 9/2008 | Mori et al. |
| 2008/0274940 A1 | 11/2008 | Tjelta et al. |
| 2008/0274942 A1 | 11/2008 | Tjelta et al. |
| 2008/0277620 A1 | 11/2008 | Kesavan et al. |
| 2008/0305982 A1 | 12/2008 | Smets et al. |
| 2008/0311064 A1 | 12/2008 | Lei et al. |
| 2009/0011214 A1 | 1/2009 | Wang |
| 2009/0011973 A1 | 1/2009 | Besse et al. |
| 2009/0023625 A1 | 1/2009 | Tang et al. |
| 2009/0062175 A1 | 3/2009 | Cermenati et al. |
| 2009/0087390 A1 | 4/2009 | Modi |
| 2009/0176687 A1 | 7/2009 | Tjelta et al. |
| 2009/0258042 A1 | 10/2009 | Anastasiou et al. |
| 2009/0258810 A1 | 10/2009 | Song et al. |
| 2009/0326165 A1 | 12/2009 | Patil et al. |
| 2010/0008870 A1 | 1/2010 | Dihora et al. |
| 2010/0056413 A1 | 3/2010 | Harry, Jr. et al. |
| 2010/0069280 A1 | 3/2010 | Rodrigues et al. |
| 2010/0075879 A1 | 3/2010 | Gizaw et al. |
| 2010/0075880 A1 | 3/2010 | Dupont et al. |
| 2010/0075887 A1 | 3/2010 | Wang et al. |
| 2010/0086575 A1 | 4/2010 | Dihora et al. |
| 2010/0093584 A1 | 4/2010 | Brand et al. |
| 2010/0154831 A1 | 6/2010 | Neplenbrock et al. |
| 2010/0167547 A1 | 7/2010 | Kamimura |
| 2010/0236736 A1 | 9/2010 | Brockmeyer et al. |
| 2010/0280146 A1 | 11/2010 | Vanderlaan et al. |
| 2010/0317560 A1 | 12/2010 | Ryther et al. |
| 2011/0017945 A1 | 1/2011 | Miralles et al. |
| 2011/0021410 A1 | 1/2011 | Miralles et al. |
| 2011/0028371 A1 | 2/2011 | Rodrigues et al. |
| 2011/0034622 A1 | 2/2011 | Kawamura et al. |
| 2011/0118168 A1 | 5/2011 | Schunicht et al. |
| 2011/0136718 A1 | 6/2011 | Rodrigues et al. |
| 2012/0134942 A1* | 5/2012 | Thomaides et al. ............ 424/59 |
| 2013/0035273 A1 | 2/2013 | Silvernail et al. |
| 2013/0035274 A1 | 2/2013 | Silvernail et al. |
| 2013/0035275 A1 | 2/2013 | Silvernail et al. |

(56) References Cited

U.S. PATENT DOCUMENTS

| | | |
|---|---|---|
| 2013/0035276 A1 | 2/2013 | Silvernail et al. |
| 2013/0035277 A1 | 2/2013 | Silvernail et al. |
| 2013/0137799 A1 | 5/2013 | Rodrigues et al. |

FOREIGN PATENT DOCUMENTS

| | | |
|---|---|---|
| CN | 101830015 A | 9/2010 |
| CN | 101863540 A | 10/2010 |
| CN | 102146150 A | 8/2011 |
| DE | 40 38 908 A1 | 6/1992 |
| EP | 0 130 756 A1 | 1/1985 |
| EP | 0 404 377 A1 | 12/1990 |
| EP | 0 405 917 A1 | 1/1991 |
| EP | 00438215 | 1/1991 |
| EP | 0 441 197 A2 | 8/1991 |
| EP | 0 526 800 A1 | 2/1993 |
| EP | 0 577 519 A1 | 1/1994 |
| EP | 0628655 B1 | 6/1994 |
| EP | 0 605 084 A1 | 7/1994 |
| EP | 0505371 B1 | 3/1996 |
| EP | 0 725 131 A1 | 8/1996 |
| EP | 0725131 A1 | 8/1996 |
| EP | 0 869 169 A1 | 10/1998 |
| EP | 0 957 114 A1 | 11/1999 |
| EP | 0653485 B1 | 5/2000 |
| EP | 1 007 529 B1 | 6/2000 |
| EP | 1 022 294 B1 | 7/2000 |
| EP | 1043388 B1 | 10/2000 |
| EP | 1043389 B1 | 10/2000 |
| EP | 0703243 B1 | 12/2000 |
| EP | 1021156 B1 | 2/2002 |
| EP | 1 236 748 A1 | 9/2002 |
| EP | 1506765 B1 | 2/2005 |
| EP | 1162257 B1 | 2/2006 |
| EP | 1520004 B1 | 12/2006 |
| EP | 1 881 017 A2 | 1/2008 |
| EP | 1997874 A1 | 3/2008 |
| EP | 1950232 A1 | 7/2008 |
| EP | 1699429 B1 | 10/2008 |
| EP | 2014757 A1 | 1/2009 |
| EP | 1741775 B1 | 4/2009 |
| EP | 2 072 531 A1 | 6/2009 |
| EP | 2 138 560 B1 | 12/2009 |
| EP | 1877171 B1 | 3/2010 |
| FR | 2856073 A1 | 12/2004 |
| FR | 2 908 135 A1 | 5/2008 |
| FR | 2 927 083 A1 | 8/2009 |
| GB | 1137741 | 12/1968 |
| GB | 1322536 A | 7/1973 |
| GB | 1355998 A | 6/1974 |
| GB | 1464616 A | 2/1977 |
| GB | 2322137 A | 8/1998 |
| GB | 2432844 A | 6/2007 |
| GB | 2432852 A | 6/2007 |
| JP | 57-082145 | 5/1982 |
| JP | 61-31497 A | 2/1986 |
| JP | 6157253 | 6/1994 |
| JP | 6-298866 | 10/1994 |
| JP | 6298866 | 10/1994 |
| JP | 6-315622 | 11/1994 |
| JP | 9249892 | 9/1997 |
| JP | 11-343449 | 12/1999 |
| JP | 2000017299 | 1/2000 |
| JP | 2002-526611 | 8/2002 |
| JP | 2002285019 | 10/2002 |
| JP | 2004-107233 | 4/2004 |
| JP | 2005-120045 | 5/2005 |
| JP | 2005-532304 | 10/2005 |
| JP | 2008208051 | 9/2008 |
| JP | 2010-47713 | 3/2010 |
| JP | 2011-195809 | 10/2011 |
| WO | WO 91/06637 | 5/1991 |
| WO | WO 92/06162 | 4/1992 |
| WO | WO 92/10433 | 6/1992 |
| WO | WO 93/02118 | 2/1993 |
| WO | WO 93/11214 | 6/1993 |
| WO | WO 93/11214 A1 | 6/1993 |
| WO | WO 93/19038 | 9/1993 |
| WO | WO 93/19146 | 9/1993 |
| WO | WO 94/09099 | 4/1994 |
| WO | WO 95/10591 | 4/1995 |
| WO | WO 95/26393 | 10/1995 |
| WO | WO 95/26710 A1 | 10/1995 |
| WO | WO 96/35645 A1 | 11/1996 |
| WO | WO 96/37530 A1 | 11/1996 |
| WO | WO 97/45510 A1 | 12/1997 |
| WO | WO 98/18352 A1 | 5/1998 |
| WO | WO 98/35002 | 8/1998 |
| WO | WO 98/35003 | 8/1998 |
| WO | WO 98/35004 | 8/1998 |
| WO | WO 98/35005 | 8/1998 |
| WO | WO 98/35006 | 8/1998 |
| WO | WO 98/49260 A1 | 11/1998 |
| WO | WO 99/02663 | 1/1999 |
| WO | WO 99/05082 | 2/1999 |
| WO | WO 99/05084 | 2/1999 |
| WO | WO 99/05241 | 2/1999 |
| WO | WO 99/05242 | 2/1999 |
| WO | WO 99/05243 | 2/1999 |
| WO | WO 99/05244 | 2/1999 |
| WO | WO 99/07656 | 2/1999 |
| WO | WO 99/20726 | 4/1999 |
| WO | WO 99/27083 | 6/1999 |
| WO | WO 99/36470 A1 | 7/1999 |
| WO | WO 00/12661 A1 | 3/2000 |
| WO | WO 00/15180 A1 | 3/2000 |
| WO | WO 00/18868 A1 | 4/2000 |
| WO | WO 00/20470 | 4/2000 |
| WO | WO 00/23548 | 4/2000 |
| WO | WO 00/23549 | 4/2000 |
| WO | WO 00/36076 A1 | 6/2000 |
| WO | WO 00/47708 | 8/2000 |
| WO | WO 01/24779 A1 | 4/2001 |
| WO | WO 01/32816 A1 | 5/2001 |
| WO | WO 01/42408 A2 | 6/2001 |
| WO | WO 02/38715 A2 | 5/2002 |
| WO | WO 02/44686 A2 | 6/2002 |
| WO | WO 03/042262 A2 | 5/2003 |
| WO | WO 03/095597 A1 | 11/2003 |
| WO | WO 2004/046301 A1 | 6/2004 |
| WO | WO 2004/048418 A2 | 6/2004 |
| WO | WO 2005/012378 A1 | 2/2005 |
| WO | WO 2005/051343 A1 | 6/2005 |
| WO | WO 2005/059023 A1 | 6/2005 |
| WO | WO 2005068552 A1 * | 7/2005 |
| WO | WO 2006/002565 A1 | 1/2006 |
| WO | WO 2006/007945 A1 | 1/2006 |
| WO | WO 2006/026406 A2 | 3/2006 |
| WO | WO 2006/119162 A1 | 11/2006 |
| WO | WO 2007/140267 A1 | 12/2007 |
| WO | WO 2008/089262 A1 | 7/2008 |
| WO | WO 2008/144744 A2 | 11/2008 |
| WO | WO 2008/147940 A2 | 12/2008 |
| WO | WO 2009/006603 A1 | 1/2009 |
| WO | WO 2009/087525 A1 | 7/2009 |
| WO | WO 2009/156233 A1 | 12/2009 |
| WO | WO 2010/057977 A1 | 5/2010 |
| WO | WO 2010/065482 A1 | 6/2010 |
| WO | WO 2010/065483 A1 | 6/2010 |
| WO | WO 2010/079466 A2 | 7/2010 |
| WO | WO 2010/079467 A2 | 7/2010 |
| WO | WO 2010/144575 A1 | 12/2010 |
| WO | WO 2011/008272 A1 | 1/2011 |
| WO | WO 2011/014783 A1 | 2/2011 |
| WO | WO 2011/017223 A1 | 2/2011 |
| WO | WO 2011/025624 A1 | 3/2011 |
| WO | WO 2011/044490 A1 | 4/2011 |
| WO | WO 2011/135313 A1 | 11/2011 |
| WO | WO 2012/000609 A1 | 1/2012 |

OTHER PUBLICATIONS

Rosen, "Geminis: A new generation of surfactants," Chemtech, pp. 30-33 (Mar. 1993).

(56) References Cited

OTHER PUBLICATIONS

"Gemini Surfactants: A New Class of Self-Assembling Molecules," J. American Chemical Soc., vol. 115, pp. 10083-10090 (1993).
Kirk Othmer Encyclopedia of Chemical Technology, 3rd Ed, vol. 7, pp. 430-447 (John Wiley & Sons, Inc., 1979).
Kroschwitz, J.I.; Concise Encyclopedia of Polymer Science & Engineering, Ed., Wiley-Interscience, New York, p. 436 (1990).
Mark, Herman F., Concise Encyclopedia of Polymer Science and Technology, 3rd Ed., vol. 11, Wiley-Interscience, New York, p. 380 (2004).
Odian, George; Principles of Polymerization, 2nd Ed., Wiley-Interscience, New York, p. 424 (1970).
Odian, Principles of Polymerization, 2nd Ed., John Wiley & Sons, p. 226, New York (1981).
Wurzburg, Modified Starches: Properties and Uses, Grafted Starches, Chpt. 10, pp. 149-172, CRC Press, Boca Raton (1986).
Dubois et al, "Colorimetric Method for Determination of Sugars and Related Substances," Analytical Chemistry, vol. 28, No. 3, pp. 350-356 (Mar. 1956).
Kwei-Ping, et al, "Chain Transfer constant of Vinylpyrrolidone with Dextran," Institute of Polymer Research, vol. 66, pp. 828-829, May 1962.
English Translation of Japanese Office Action mailed Sep. 25, 2012.
International Search Report for Application No. PCT/EP2012/071741; Completion Date Nov. 14, 2012.
International Search Report for Application No. PCT/EP2012/071742; Completion Date Nov. 14, 2012.
English Abstract for Japanese Publication No. 2008208051 A1.
English Abstract for Japanese Publication No. 6157253 A1.
English Abstract for Japanese Publication No. 6298866 A1.
English Abstract for Japanese Publication No. 9249892 A1.
English Translation of Japanese Office Action mailed Oct. 22, 2013 for Application No. 2012-523097.
English Abstract of Japanese Publication No. 2004-107233.
European Search Report for EP Application No. 06015025.7; Nov. 13, 2006.
European Search Report for EP Application No. 07014413.4; Nov. 6, 2007.
European Search Report for EP Application No. 07014412.6; Oct. 18, 2007.
European Search Report for EP Application No. 07014412.6; Jan. 23, 2008.
European Search Report for EP Application No. 09175465.5; Jan. 14, 2010.
Questel QPatents Abstract for Japanese Patent Publication 11-343449, 2010.
Chinese Office Action Action mailed Jul. 1, 2010 for Patent Application No. 200710169190.X.
International Search Report for PCT Application No. US2010/043919; Completed Sep. 22, 2010.
International Search Report for PCT Application No. US2010/043930; Completed Sep. 23, 2010.
International Search Report and Written Opinion for Application No. PCTEP2011/073928; Completion Date Jan. 18, 2012.
European Search Report for Application No. 11158599.8; Completion Date Aug. 11, 2011.
Shen, et al, "Graft Copolymers of Vinyl Pyrrolidone on Dextran," Journal of Polymer Science, vol. 53, pp. 81-85 (1961).
Kahya, et al, "A Novel Copolymer: Starch-g-Polyvinylpyrrolidone," Starch/Starke 61 (2009), pp. 267-274.
English QPatent Abstract for European Patent Publication No. 0 577 519 A1, 2011.
English Abstract for Japanese Patent Publication No. JP 2005/120045 (Abstract No. 2005-359217/37), 2005.
European Search Report for Application No. 12154675.8; Completion Date May 14, 2012.
European Search Report for Application No. 12154684.0; Completion Date May 14, 2012.
English Abstract for Japanese Patent Publication No. JP 57-082145, 2012.
English Translation of Japanese Office Action mailed Jun. 5, 2012; (Application No. 2006-198098).
International Search Report issued in PCT/US2012/049514 mailed Feb. 19, 2013, 3 pages.
International Search Report and Written Opinion issued in PCT/US2012/049595, mailed Feb. 25, 2013, 10 pages.
International Search Report and Written Opinion issued in International Application No. PCT/US2012/049547, mailed Jan. 22, 2013, 11 pages.
International Search Report and Written Opinion issued in PCT/US2012/049564, mailed Jan. 23, 2013, 10 pages.
International Search Report and Written Opinion issued in PCT/US2012/049584, mailed Jan. 21, 2013, 11 pages.
Athawale et al., "Graft Polymerization: Starch as a Model Substrate", J.M.S. Rev. Macromol. Chem. Phys., C39(3), 445-480, 1999.
Willett et al., "Initiator Effects in Reactive Extrusion of Starch-Polyacrylamide Graft Copolymers," Wiley InterScience, Received May 28, 2004; Accepted Feb. 22, 2005, pp. 52-58.
Water Purification handbook, Chapter 25, Deposit and Scale Control-Cooling System, retrieved from: http://www.gewater.com/handbook/cooling_water_system.ch_25_deposit.jsp.
English Abstract for European Publication No. 0628655 A1, 1994.
English Abstract for European Publication No. 0725131 A1, 1996.
English Abstract of Chinese Publication No. CN 101830015 A, 2010.
English Abstract of Chinese Publication No. CN 101863540 A, 2010.
English Abstract of Chinese Publication No. CN 102146150 A, 2011.
English Translation of European Publication No. EP 0 725 131 A1, 2012.
English Translation of European Publication No. EP 2 072 531 A1, 2012.
English Translation of French Publication No. FR 2 908 135 A1, 2012.
English Translation of French Publication No. FR 2 927 083 A1, 2012.
English Abstract of Japanese Publication No. JP 6-298866 A, 1995.
English Abstract of Japanese Publication No. JP 2010-47713 A, 2010.
English Abstract of Japanese Publication No. JP 2011-195809 A, 2011.
English Translation for European Publication No. 1021156 A1, 2000.
English Abstract for European Publication No. 1043388 A1, 2000.
English Abstract for European Publication No. 1043389 A1, 2000.
English Abstract for European Publication No. 1506765 A1, 2005.
English Abstract for European Publication No. 1520004 A1, 2005.
English Abstract for European Publication No. 1699429 A1, 2006.
English Translation for European Publication No. 1877171 A1, 2008.
English Abstract for French Publication No. 2856073 A1, 2004.
English Abstract for Japanese Publication No. 2000017299 A1, 2000.
English Abstract for Japanese Publication No. 2002285019 A1, 2002.
Office Action mailed Apr. 9, 2014 for U.S. Appl. No. 11/780,494.
English Translation of Japanese Publication No. 61-31497 A, Feb. 1986.

* cited by examiner

HYBRID COPOLYMER COMPOSITIONS

This application is a National Phase Application of PCT Application No. PCT/US2010/043919, filed Jul. 30, 2010, which claims the benefit of priority to U.S. patent application Ser. No. 12/533,802 filed Jul. 31, 2009, EP 09175465.5, filed Nov. 10, 2009, and Ser. No. 12/689,844, filed Jan. 19, 2010, which claims the benefit of priority to U.S. patent application Ser. No. 12/533,802, filed Jul. 31, 2009, and Ser. No. 11/458,180 filed Jul. 18, 2006, now U.S. Pat. No. 7,666,963, which claims priority to U.S. Provisional patent application Ser. No. 60/701,380, filed Jul. 21, 2005. All of these applications are incorporated by reference in their entireties herein.

FIELD OF THE INVENTION

The present invention is relates to hybrid copolymers and hybrid copolymer compositions which contain a portion of a naturally occurring oligomer or polymer and a moiety from a synthetically derived oligomer or polymer.

BACKGROUND

A number of attempts have been made in the past to use natural materials as polymeric building blocks. These have mainly centered on grafting natural materials such as sugars and starches with synthetic monomers. For example, U.S. Pat. Nos. 5,854,191, 5,223,171, 5,227,446 and 5,296,470 disclose the use of graft copolymers in cleaning applications.

Conventional graft copolymers have been produced by selectively generating initiation sites (e.g., free radicals) for the growth of monomer side chains from the saccharide or polysaccharide backbone (CONCISE ENCYCLOPEDIA OF POLYMER SCIENCE AND ENGINEERING, J. I. Kroschwitz, ed., Wiley-Interscience, New York, p. 436 (1990)). These grafting techniques typically use Fe(II) salts such as ferrous sulfate or Ce(IV) salts (e.g., cerium nitrate or cerium sulfate) to create those initiation sites on the saccharide or polysaccharide backbone (see, e.g., U.S. Pat. No. 5,304,620). Such redox processes are not easily controlled and are inefficient. Also, cerium salts tend to be left in the resulting solution as unwanted byproducts, thereby presenting a potential negative effect on performance. Therefore, there is a need for natural materials as polymeric building blocks that do not provide those problems associated with graft copolymers.

SUMMARY OF THE INVENTION

Hybrid copolymer compositions and the hybrid copolymers derived therefrom contain a portion of a naturally occurring oligomer or polymer and a moiety from a synthetically derived oligomer or polymer. One conventional method of making hybrid molecules utilizes water soluble monomers in the presence of an aqueous solution of a naturally derived, hydroxyl containing material as a chain transfer agent. Such a method is disclosed in US patent application publication number US 2007-0021577 A1, which is wholly incorporated herein by reference. However, it has now been found that the hybrid copolymers according to the present invention can be prepared with a very high level of naturally derived hydroxyl containing chain transfer agent and still maintain the functionality of the synthetic polymers portion. In addition, new combinations of naturally derived hydroxyl containing chain transfer agents and ethylenically unsaturated monomers as well as applications for these hybrid copolymers have been discovered that were heretofore previously unknown.

In an embodiment, the invention relates to a hybrid copolymer composition comprising a hybrid synthetic polymer and a hybrid copolymer comprising a synthetic polymer derived from at least one ethylenically unsaturated monomer and a naturally derived hydroxyl containing chain transfer agent as an end group.

In another embodiment, the invention is directed to an anionic hybrid copolymer composition comprising a hybrid synthetic polymer and a hybrid copolymer comprising a synthetic polymer derived from at least one anionic ethylenically unsaturated monomer connected to a naturally derived hydroxyl containing chain transfer agent as an end group via a carbonyl moiety.

In another embodiment, the invention is directed to an anionic hybrid copolymer composition comprising a hybrid synthetic polymer and a hybrid copolymer comprising a synthetic polymer derived from at least one anionic ethylenically unsaturated monomer and a naturally derived hydroxyl containing chain transfer agent as an end group wherein the chain transfer agent is present from greater than about 75% by weight to about 99% by weight, based on the total weight of the hybrid copolymer composition.

In another embodiment, the invention is directed to a non-anionic hybrid copolymer composition comprising a hybrid synthetic polymer and a hybrid copolymer comprising a synthetic polymer derived from at least one of a non-anionic ethylenically unsaturated monomer and a naturally derived hydroxyl containing chain transfer agent as an end group.

In yet another embodiment, the invention is directed to a method of determining the concentration of a hybrid copolymer composition in an aqueous system. The method comprises reacting a sample of an aqueous hybrid copolymer composition comprising a synthetic polymer derived from at least one anionic ethylenically unsaturated monomer and a naturally derived hydroxyl containing chain transfer agent as the end group with an effective amount of photoactivator under conditions effective to cause the hybrid copolymer to absorb with the wavelength in the range of from 300 to 800 nanometers. The method further includes measuring the absorbance of the aqueous sample and comparing the absorbance of the aqueous sample to a predetermined calibration curve of known absorbances and concentrations. The method also includes comparing the absorbance of the aqueous sample to the known concentrations and known absorbances to determine the concentration of the hybrid copolymer.

In still yet another embodiment, the invention relates to a method of preparing a hybrid copolymer composition. The method comprises polymerizing at least one monomer with a solution of a naturally derived hydroxyl containing chain transfer agent having a minor amount of secondary chain transfer agents.

In still yet another further embodiment, the invention is directed to a blend comprising an anionic hybrid copolymer composition and a builder or a chelating agent. The builder or chelating agent is selected from the group consisting of alkali metal or alkali-metal earth carbonates, alkali metal or alkali earth citrates, alkali metal or alkali earth silicates, glutamic acid N,N-diacetic acid (GLDA), methylglycine N,N-diacetic acid (MGDA) and combinations thereof.

BRIEF DESCRIPTION OF THE DRAWING

The invention is best understood from the following detailed description when read in connection with the accompanying drawings. Included in the drawings are the following figures.

DETAILED DESCRIPTION OF THE INVENTION

Figure 1:
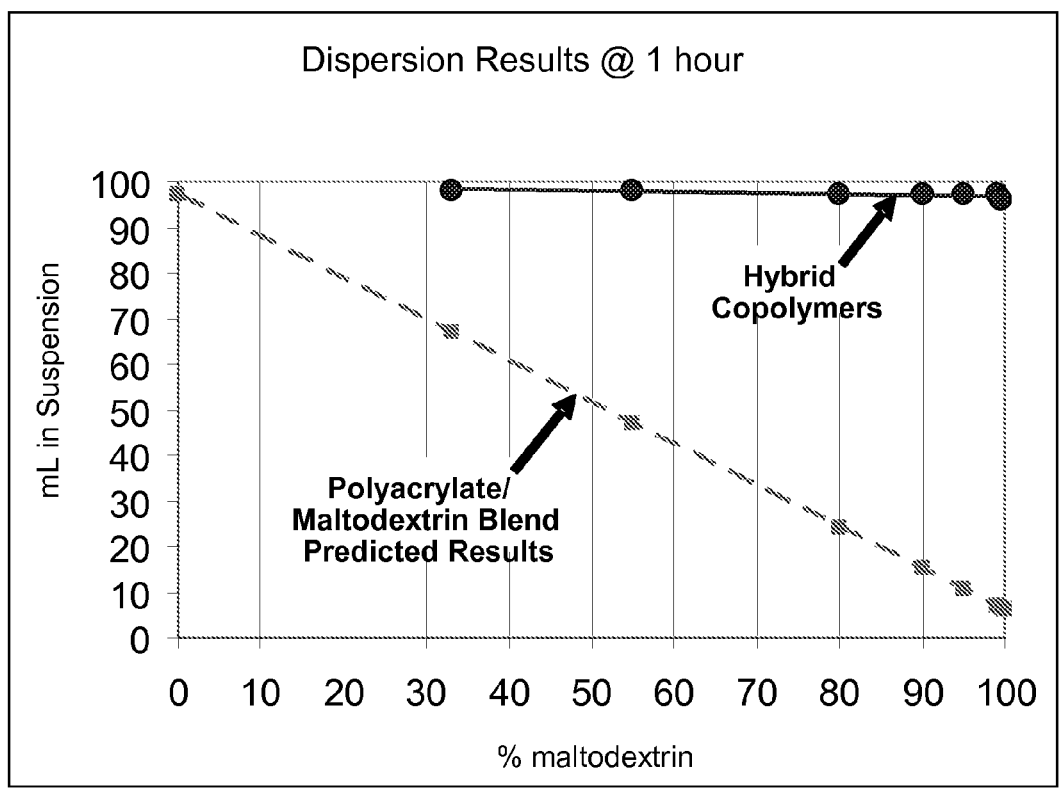
FIG. 1 is a graph depicting the results of dispersion tests conducted for 1 hour comparing a typical polyacrylate/maltodextrin blend with a hybrid copolymer containing greater than 75 weight percent maltodextrin as a chain transfer agent according to an embodiment of the invention.

Generally, the hybrid copolymers of the instant invention are formed by preparing hybrid copolymer compositions in which chain transfer of a growing synthetic polymer chain to a naturally derived hydroxyl containing chain transfer agent occurs. It is expected that the reaction proceeds according to the following mechanism:

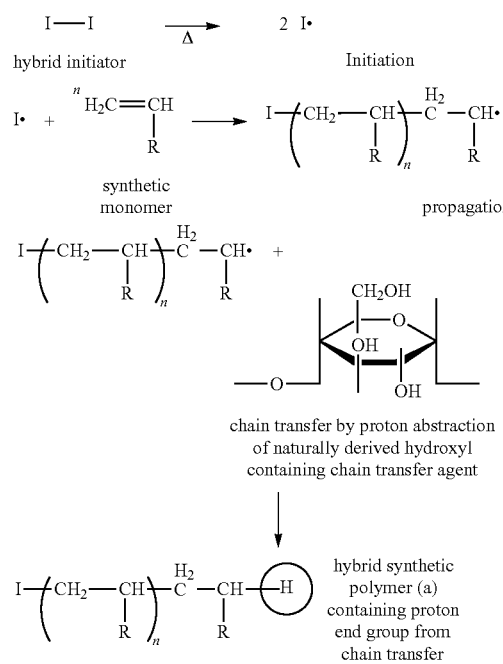

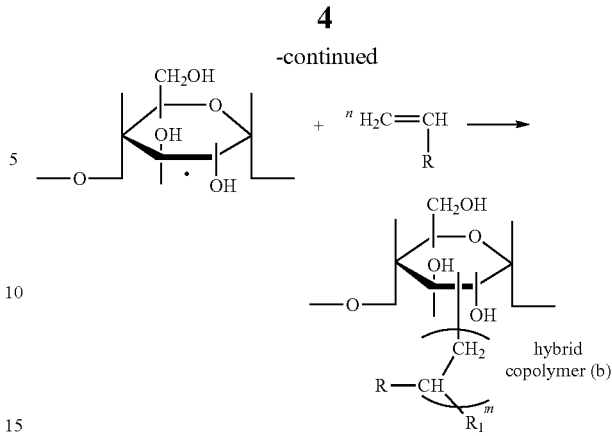

chain transfer generates a new radical on the naturally derived hydroxyl containing chain transfer agent which then reacts with the synthetic monomer Hybrid copolymer composition = mixture of (a) and (b) with a range of wt % of (a) in the composition In the first step the initiator I forms free radicals which reacts with the monomer and initiates the synthetic polymer chain. This then propagates by reacting with several monomer moieties. Termination is then by chain transfer which abstracts a proton from the naturally derived hydroxyl containing chain transfer agent. This terminates the hybrid synthetic polymer (a) and produces a free radical on the naturally derived hydroxyl containing chain transfer agent. The naturally derived hydroxyl containing chain transfer agent then reacts with several monomer moieties to form a species in which the naturally derived hydroxyl containing chain transfer agent is connected to the synthetic polymer chain. This species can then terminate by a chain transfer mechanism or reaction with an initiator fragment or by some other termination reaction such as combination or disproportionation reaction to produce the hybrid copolymer (b). If the termination is by chain transfer, then $R_1$ is H (abstracted from naturally derived hydroxyl containing chain transfer agent) and this generates a free radical on another chain transfer agent which can then initiate another chain.

Accordingly, as used herein and as shown in the above reaction, a "hybrid copolymer composition" is a mixture of (a) a hybrid synthetic copolymer and (b) a hybrid copolymer. The hybrid copolymer composition thus contains the two moieties, (a) and (b), with a minimum amount of the hybrid synthetic copolymer (a) since this component generates the chain transfer which leads to the formation of the hybrid copolymer (b). One skilled in the art will recognize that the hybrid copolymer composition may contain a certain amount of the unreacted naturally derived hydroxyl containing chain transfer agent. In an embodiment of the invention, the hybrid copolymer composition may be an anionic hybrid copolymer composition. In another embodiment, the hybrid copolymer composition may be a non-anionic copolymer composition, such as cationic, nonionic, amphoteric or zwitterionic.

The term "hybrid copolymer", as defined herein, refers to a copolymer of ethylenically unsaturated monomers with an end group containing the naturally derived hydroxyl containing chain transfer agent which is a result of the hybrid synthetic copolymer chain transfer. In an embodiment of the invention, the hybrid copolymer has the following structure:

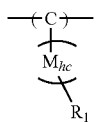

where C is a moiety derived from the naturally derived hydroxyl containing chain transfer agent, $M_{hc}$ is the synthetic portion of the hybrid copolymer derived from one or more ethylenically unsaturated monomers and $R_1$=H from chain transfer or I from reaction with the initiator radical or the naturally derived hydroxyl containing chain transfer agent formed by combination of two growing chains or another moiety formed from a termination reaction.

In an embodiment, the attachment point between C and $M_{hc}$ is through an aldehyde group in C which results in the linkage between C and $M_{hc}$ being a carbonyl moiety. In another embodiment, when the naturally derived hydroxyl containing chain transfer agent is a saccharide/polysaccharide with an aldehyde group as the reducing end group, then the hybrid copolymer can be represented by the structure:

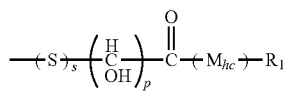

Where S is a saccharide repeat unit from the saccharide/polysaccharide chain transfer agent and s is an integer from 0 to 1000 and p is an integer that is 3, 4 or 5. In another embodiment, when the naturally derived hydroxyl containing chain transfer agent is an oxidized starch which contains aldehyde groups, the hybrid copolymer can be represented by the structure:

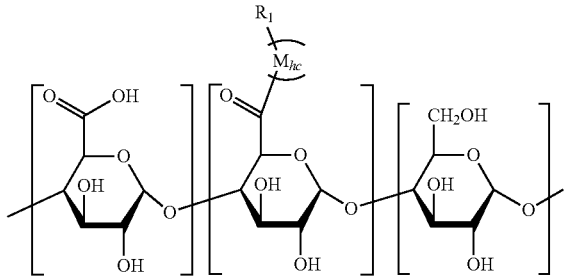

The amount of aldehyde functionality is preferably at least 0.001 mole %, more preferably at least 0.01 mole % and most preferably at least 0.1 mole % of the total anhydroglucose units in the saccharide/polysaccharide chain transfer agent.

Also as used herein, the term "hybrid synthetic copolymer" is a synthetic polymer derived from synthetic monomers with a hybrid initiator fragment as one end group. The other end group is a proton resulting from chain transfer to the naturally derived hydroxyl containing chain transfer agent. As used herein, the term "synthetic monomer" means any ethylenically unsaturated monomer which can undergo free radical polymerization.

In an embodiment of the invention, an exemplary hybrid synthetic copolymer has the following structure:

Where I is the initiator fragment, H is the proton abstracted from the naturally derived hydroxyl containing chain transfer agent and $M_{hsc}$ is the synthetic portion of the hybrid synthetic copolymer derived from one or more ethylenically unsaturated monomers. One skilled in the art will recognize that if one or more ethylenically unsaturated monomers are used, the average composition of $M_{hsc}$ and $M_{hc}$ will be the same.

One skilled in the art will recognize, that the minimum amount of the hybrid synthetic copolymer will depend on the relative amounts of synthetic monomer, initiator and naturally derived hydroxyl containing chain transfer agent. Furthermore, in the hybrid copolymer composition, the amount (number of chains) of hybrid copolymer (b) will be greater than or equal to the number of chains of hybrid synthetic copolymer (a).

Molecular weight of the hybrid synthetic polymer is determined by the relative amounts of synthetic monomer, initiator and naturally derived hydroxyl containing chain transfer agent.

Optionally, in an embodiment of the present invention, the weight average molecular weight of the hybrid copolymer composition may be less than about 500,000, preferably less than 300,000 and most preferably less than 100,000. In an embodiment of the invention, the minimum weight average molecular weight of the natural component is 1000. In a further embodiment, the hybrid copolymer composition may be water soluble. For purposes of the present application, water soluble is defined as having a solubility of greater than about 0.1 grams per 100 grams of water at 25° C. and preferably 1 gram per 100 grams of water at 25° C.

In another embodiment, the hybrid synthetic copolymer will have a hybrid initiator fragment (I) and some of the hybrid copolymer chains will have a naturally derived hydroxyl containing chain transfer agent at one end and a hybrid initiator fragment (where $R_1$ is I) at the other end of the synthetic polymer chain. As used herein, the term "hybrid initiator fragment" is any fragment of the hybrid initiator that gets incorporated into the hybrid synthetic polymer derived from a hybrid initiator. "Hybrid initiators" are free radical initiators or initiating system excluding metal ion based initiators or initiating systems. The hybrid initiators preferably are not free radical abstractors but promote chain transfer. Furthermore, in an embodiment of the invention, the hybrid initiator is water soluble. Exemplary hybrid initiators include, but are not limited to, peroxides, azo initiators as well as redox systems like tert-butyl hydroperoxide and erythorbic acid, peroxide such as persulfate and an amine such as hydroxylamine sulfate, persulfate and sodium formaldehyde sulfoxylate etc. The hybrid initiators may include both inorganic and organic peroxides. Suitable inorganic peroxides include sodium persulfate, potassium persulfate and ammonium persulfate. Azo initiators, such as water soluble azo initiators, may also be suitable hybrid initiators. Water soluble azo initiators include, but are not limited to, 2,2'-Azobis[2-(2-imidazolin-2-yl)propane]dihydrochloride, 2,2'-Azobis[2-(2-imidazolin-2-yl)propane]disulfate dihydrate, 2,2'-Azobis(2-methylpropionamidine)dihydrochloride, 2,2'-Azobis[N-(2-carboxyethyl)-2-methylpropionamidine]hydrate, 2,2'-Azobis{2-[1-(2-hydroxyethyl)-2-imidazolin-2-yl]propane}dihydrochloride, 2,2'-Azobis[2-(2-imidazolin-2- yl)propane], 2,2'-Azobis(1-imino-1-pyrrolidino-2-ethylpropane)dihydrochloride, 2,2'-Azobis{2-methyl-N-[1,1-bis(hydroxymethyl)-2-hydroxyethyl]propionamide}, 2,2'-Azobis[2-methyl-N-(2-hydroxyethyl)propionamide] and others. One skilled in the art will recognize that the hybrid initiator fragment incorporated into the hybrid synthetic copolymer will depend on the hybrid initiator used. For example, sodium persulfate, potassium persulfate and ammonium persulfate will incorporate sulfate initiator fragments, whereas an azo initiator, such as 2,2'-Azobis(2-methylpropionamidine)dihydrochloride, will incorporate a 2-methyl propane propionamidine hydrochloride fragment. In an embodiment of the invention, the hybrid initiator fragment is not an OH moiety derived from hydrogen peroxide since hydrogen peroxide in the presence of a metal ion tends to abstract protons from a substrate and creates conventional graft copolymers. Furthermore, in an embodiment of the invention, the hybrid initiator fragment is water soluble.

In an embodiment, I is preferably 0.01 to 20 mole % of $M_{hc}+M_{hsc}$ and more preferably I is 0.1 to 15 mole % of $M_{hc}+M_{hsc}$ and most preferably I is 1 to 10 mole % of $M_{hc}+M_{hsc}$.

Metal ion initiating systems, such as those containing Fe(II) salts or Ce(IV), are typically used to create graft copolymers. As noted previously, conventional graft copolymers are produced by selectively generating initiation sites (e.g., free radicals) for the growth of monomer side chains from an existing polymer backbone (CONCISE ENCYCLOPEDIA OF POLYMER SCIENCE AND ENGINEERING, J. I. Kroschwitz, ed., Wiley-Interscience, New York, p. 436 (1990)). Therefore, graft copolymers are defined as a backbone of a natural component such as a polysaccharide with one or more side chains derived from synthetic monomers.

The mechanism for producing such "graft" copolymers is illustrated below.

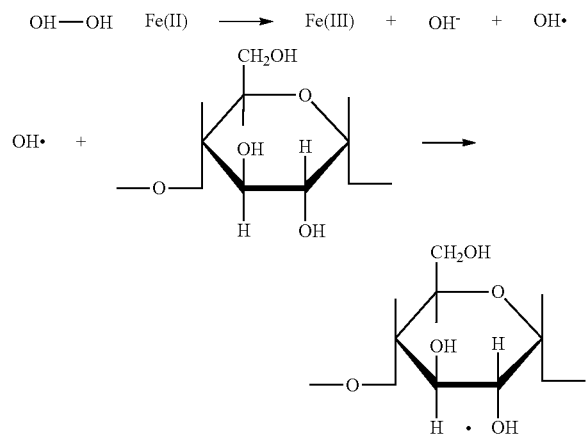

Proton Abstraction from the Polysaccharide to Generate a Free Radical on the Polysaccharide

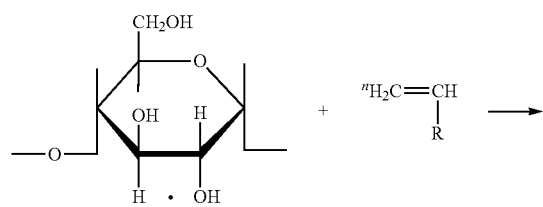

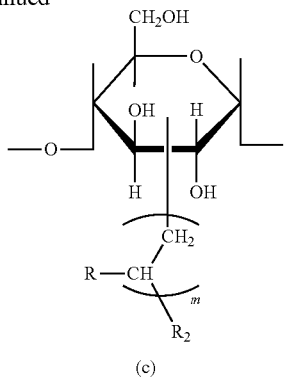

(c)

The Polysaccharide Radical Reacts with Monomer Units

Graft Copolymer

While the graft copolymer may contain a synthetic copolymer component, unlike the hybrid polymer composition, one skilled in the art will recognize that the synthetic polymer is not required in the formation of the graft copolymer. Hence, the higher the amount of synthetic copolymer the lower the amount of graft copolymer since the presence of the synthetic copolymer essentially results in an unwanted side reaction in this case and therefore, the synthetic polymer could be considered an impurity in the graft copolymer.

The term "naturally derived hydroxyl containing chain transfer agent" as used herein, means any hydroxyl containing materials obtained from a renewable source. In an embodiment of the invention, the naturally derived hydroxyl containing chain transfer agents include, but are not limited, to small molecules such as glycerol, citric acid, lactic acid, tartaric acid, gluconic acid, ascorbic acid, glucoheptonic acid. The naturally derived hydroxyl containing chain transfer agents may also include saccharides or derivatives thereof. Suitable saccharides include, for example, monosaccharides and disaccharides such as sugars, as well as larger molecules such as oligosaccharides and polysaccharides (e.g., maltodextrins, pyrodextrins and starches). In an embodiment of the invention, the naturally derived hydroxyl containing chain transfer agent is maltodextrin, pyrodextrin or a low molecular weight starch or oxidized starch. It has been found that the chain transfer reaction does not work well when the naturally derived hydroxyl containing chain transfer agent is not soluble in the reaction system. For example, high molecular weight starches, such as those having molecular weights in the millions or those in granular form, are water dispersable and not water soluble. Accordingly, in embodiments of the invention, the average molecular weight of the chain transfer agent is preferably less than about 500,000 based on a starch standard. Starches having such exemplary molecular weights are water soluble. In another embodiment, the weight average molecular weight (Mw) of the chain transfer agent may be less than about 100,000. In yet another preferred embodiment, the weight average molecular weight of the chain transfer agent may be less than about 50,000. In yet another preferred embodiment, the weight average molecular weight of the chain transfer agent may be less than about 10,000. It has also been determined that for applications in which dispersancy and scale control is particularly desirable, a lower molecular weight, such as 10,000, of the chain transfer agent provides improved performance.

The molecular weight of the polysaccharide was determined by the procedure outlined below:

Eluent: 0.025M $NaH_2PO_4$, 0.025 M $Na_2HPO_4$ and 0.01M of Sodium Azide in HPLC grade water. This solution was filtered through a 0.2 μm filter.

Columns: 1×G6000PWxl 7.8 mm×30 cm, G4000PWxl 7.8×30 cm, G3000PWxl 7.8 mm×30 cm, Guard column is TSKgel Guard PWxl 6.0 mm×4 cm (all made by Tosoh Bioscience)

The column bank was controlled to 5° C. above ambient temperature. Usually 30° C.

Flow Rate: 1.0 mL/min

Detector: Refractive Index, Waters® Model 2414 Temperature controlled to 30° C.

Pump/Autosampler: Waters® e2695 Separation Module. Sample compartment temperature controlled to 25° C.

Primary Standards: HETA (Hydroxyethylstarch). Available from American Polymer Standards Corporation. 5 standards. Prepare a 0.1% w/w in the mobile phase of each of the following:

| | | |
|---|---|---|
| 1. | Mw 9,600 | Mn 5,400 |
| 2. | Mw 25,900 | Mn 10,600 |
| 3. | Mw 51,100 | Mn 34,300 |
| 4. | Mw 114,300 | Mn 58,000 |
| 5. | Mw 226,800 | Mn 95,900 |

Sample Preparation: The samples were prepared by dissolving the polymer in the mobile phase at a 0.1% concentration.

Injection Volume: 450 μl for the standard and sample.

The standards are injected and a first or second order calibration curve is built.

The curve with the best fit and within the range of the molecular weight of the unknown sample was then chosen.

Software: Empower® 2 by Waters Corporation

A calibration curve is first built with the samples of the standards. The molecular weight of the unknown sample is then determined by comparing its elution time with the elution time of the standards.

The naturally derived hydroxyl containing chain transfer agents also may include cellulose and its derivatives, as well as inulin and its derivatives, such as carboxymethyl inulin. The cellulosic derivatives include plant heteropolysaccharides commonly known as hemicelluloses which are by products of the paper and pulp industry. Hemicelluloses include xylans, glucuronoxylans, arabinoxylans, arabinogalactans glucomannans, and xyloglucans. Xylans are the most common heteropolysaccharide and are preferred. Furthermore, these naturally derived hydroxyl containing chain transfer agents also include lignin and its derivatives, such as lignosulfonates In an embodiment of the invention, cellulosic derivatives such as heteropolysaccharides such as xylans and lignin and its derivatives may be present in an amount of from about 0.1% to about 98% by weight, based on the total amount of the hybrid copolymer. In an embodiment of this invention the naturally derived chain transfer agents may be maltodextrins, pyrodextrins and chemically modified versions of maltodextrins and pyrodextrins. In another embodiment, the naturally derived chain transfer agent may be cellulose of inulin or chemically modified cellulose or inulin or a heteropolysaccharide such as xylan or a lignin derivative, such as lignosulfonate.

The naturally derived hydroxyl containing chain transfer agents can be used as obtained from their natural source or they can be chemically modified. Chemical modification includes hydrolysis by the action of acids, enzymes, oxidizers or heat, esterification or etherification. The modified naturally derived chain transfer agents, after undergoing chemical modification may be cationic, anionic, non-ionic or amphoteric or hydrophobically modified. Such chemical modifications and the like pertaining to the naturally derived hydroxyl containing chain transfer agents are detailed in US patent application publication number US 2007-0021577 A1, which is incorporated by reference in its entirety herein. In an aspect of the present invention, the invention relates to an anionic hybrid copolymer composition. In an embodiment according to this aspect, the anionic hybrid copolymer composition comprises a hybrid synthetic copolymer and an anionic hybrid copolymer which is a synthetic polymer produced from at least one anionic ethylenically unsaturated monomer that is chain terminated, or has an end group, with a naturally derived hydroxyl containing chain transfer agent. In a further aspect of the present invention the anionic hybrid copolymer contains a polymer produced from at least one anionic ethylenically unsaturated monomer linked to the naturally derived hydroxyl containing chain transfer agent via a carbonyl moiety.

One skilled in the art will recognize that it is advantageous to have most if not all of the ethylenically unsaturated monomer polymerized. In one embodiment, greater than 90 percent of the ethylenically unsaturated monomer in the hybrid copolymer composition is reacted, in another embodiment, greater than 95 percent of the ethylenically unsaturated monomer in the hybrid copolymer composition is reacted and in an even further embodiment greater than 99 percent of the ethylenically unsaturated monomer in the hybrid copolymer composition is reacted. In another embodiment, less than 10 percent of the ethylenically unsaturated monomer in the hybrid copolymer composition is unreacted, in another embodiment less than 5 percent of the ethylenically unsaturated monomer in the hybrid copolymer composition is unreacted and in an even further embodiment greater than 1 percent of the ethylenically unsaturated monomer in the hybrid copolymer composition is unreacted.

As used herein, the term "anionic ethylenically unsaturated monomer" means an ethylenically unsaturated monomer which is capable of introducing a negative charge to the anionic hybrid copolymer. These anionic ethylenically unsaturated monomers can include, but are not limited to, acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, muconic acid, 2-acryloxypropionic acid, 2-acrylamido-2-methyl propane sulfonic acid, vinyl sulfonic acid, sodium methallyl sulfonate, sulfonated styrene, allyloxybenzene sulfonic acid, vinyl phosphonic acid and maleic acid. Moieties such as maleic anhydride or acrylamide that can be derivatized (hydrolyzed) to moieties with a negative charge are also suitable. Combinations of anionic ethylenically unsaturated monomers can also be used. In an embodiment of the invention, the anionic ethylenically unsaturated monomer may preferably be acrylic acid, maleic acid, methacrylic acid, itaconic acid, 2-acrylamido-2-methyl propane sulfonic acid or mixtures thereof.

In an embodiment of the invention, the anionic hybrid copolymer compositions may contain 1 to 99.5 weight percent of the naturally derived hydroxyl containing chain transfer agent based on the weight of the hybrid copolymer composition. Based on the conventional understanding of one of ordinary skill in the art, one would expect that the performance of the inventive anionic hybrid copolymer compositions would decrease as the weight percent of the chain transfer agent in the polymer increases. For example, polysaccharides have little to no performance as dispersants by themselves. Surprisingly, however, it has been found that when the chain transfer agent content of the polymer is greater than 75 weight percent, performance is still maintained. For example the dispersancy performance of the anionic hybrid copolymer composition is unexpectedly good even when using high amounts, such as 80, 90, 95 or even 99 and 99.5 weight percent, of the polysaccharide as a chain transfer agent.

Accordingly, anionic hybrid copolymer compositions comprise hybrid synthetic copolymer and an anionic hybrid copolymer containing a naturally derived hydroxyl containing chain transfer agent as the terminating moiety, or end group. In embodiments of the invention, the chain transfer agent may optionally be present from greater than 75% by weight to about 99.5%, in another embodiment greater than from about 80 to about 99% by weight, in another embodiment greater than from about 90 to about 99.5% and in yet another embodiment greater than from about 95% to about 99.5%, based on the total weight of the anionic hybrid copolymer composition.

The anionic hybrid copolymer composition can be used as a constituent of a composition for a number of different applications including, but not limited to, cleaning, laundry, automatic dish washing (ADW), superabsorbent, fiberglass binder, rheology modifier, oil field, water treatment, dispersant, cementing and concrete compositions. For cleaning applications, the compositions may include, but are not limited to, detergent, fabric cleaner, automatic dishwashing detergent, rinse aids, glass cleaner, fabric care formulation, fabric softener, flocculants, coagulants, emulsion breakers, alkaline and acidic hard surface cleaners, laundry detergents and others. The compositions can also be used to clean surfaces in industrial and institutional cleaning applications. In an exemplary embodiment for automatic dishwashing detergent formulations, such formulations include phosphate, low phosphate and "zero" phosphate built formulations, in which the detergent is substantially free of phosphates. As used herein, low phosphate means less than 1500 ppm phosphate in the wash, in another embodiment less than about 1000 ppm phosphate in the wash, and in still another embodiment less that 500 ppm phosphate in the wash.

The anionic hybrid copolymer compositions can also be used as scale control agents in cleaning, laundry, ADW, oil field, water treatment, and in any other aqueous system where scale buildup is an issue. The scales controlled include, but are not limited to, carbonate, sulfate, phosphate or silicate based scales such as calcium sulfate, barium sulfate, calcium ortho and polyphosphate, tripolyphosphate, magnesium carbonate, magnesium silicate and others. It has been found that suitable scale inhibiting hybrid copolymers will provide at least 80% scale inhibition in a carbonate inhibition test performed according to the procedure detailed in Example 8 of U.S. Pat. No. 5,547,612. In embodiments of the invention, the hybrid copolymers generally provide greater than 80% carbonate inhibition at a 100 ppm dosage level of the hybrid copolymer in an aqueous system. In further embodiments, the hybrid copolymers provide better than 80% carbonate inhibition at a 25 ppm dosage level of the polymer in an aqueous system. In still further embodiments, the hybrid copolymers will provide better than 80% carbonate inhibition at a 15 ppm dosage level of the polymer in an aqueous system.

In further embodiments, the anionic hybrid copolymer compositions can also be used as dispersants in cleaning, oil field and water treatment applications, paint and coatings, paper coatings and other applications. These anionic hybrid copolymer compositions can be used to disperse particulates including, but not limited to, minerals, clays, salts, metallic ores, metallic oxides, dirt, soils, talc, pigments, titanium dioxide, mica, silica, silicates, carbon black, iron oxide, kaolin clay, calcium carbonate, synthetic calcium carbonates, precipitated calcium carbonate, ground calcium carbonate, precipitated silica, kaolin clay or combinations thereof.

As used herein, the term "anionic hybrid copolymer adjunct ingredient" means ingredients that are optionally used in formulations including the anionic hybrid copolymer composition. These anionic hybrid copolymer adjunct ingredients include, but are not limited to, water, surfactants, builders, phosphates, sodium carbonate, citrates, enzymes, buffers, perfumes, anti-foam agents, ion exchangers, alkalis, anti-redeposition materials, optical brighteners, fragrances, dyes, fillers, chelating agents, fabric whiteners, brighteners, sudsing control agents, solvents, hydrotropes, bleaching agents, bleach precursors, buffering agents, soil removal agents, soil release agents, fabric softening agent, opacifiers, water treatment chemicals, corrosion inhibitors, orthophosphates, zinc compounds, tolyltriazole, minerals, clays, salts, metallic ores, metallic oxides, talc, pigments, titanium dioxide, mica, silica, silicates, carbon black, iron oxide, kaolin clay, modified kaolin clays, calcium carbonate, synthetic calcium carbonates, fiberglass, cement and aluminum oxide. The surfactants can be anionic, non-ionic, such as low foaming non-ionic surfactants, cationic or zwitterionic. In an embodiment of the invention, the chelants may be glutamic acid N,N-diacetic acid (GLDA) and methylglycine N,N-diacetic acid (MGDA) and the like.

Some other oil field uses for the anionic hybrid copolymer compositions of this invention include additives in cementing, drilling muds, dispersancy and spacer fluid applications. Often, the water encountered in oil field applications is sea water or brines from the formation. The water encountered in the oilfield can be very brackish. Hence, the polymers may also desirably be soluble in many brines and brackish waters. These brines may be sea water which contains about 3.5 percent NaCl by weight or more severe brines that contain, for example, up to 3.5% KCl, up to 25% NaCl and up to 20% $CaCl_2$. Therefore, the polymers should be soluble in these systems for them to be effective as, for example, scale inhibitors. It has further been found that the higher the solubility of the anionic hybrid copolymer composition compositions in the brine, the higher the compatibility. The composition of synthetic seawater, moderate and severe calcium brines which are typical brines encountered in the oilfield is listed in Table 1 below.

TABLE 1

Typical brines encountered in the oilfield.
Brine preparation

| Brine number and description | grams per liter | | | ppm | | |
|---|---|---|---|---|---|---|
| | NaCl | $CaCl_2 \cdot 2H_2O$ | $MgCl_2 \cdot 6H_2O$ | Na | Ca | Mg |
| 1  synthetic seawater | 24.074 | 1.61 | 11.436 | 9471 | 439 | 1368 |
| 2  moderate calcium brine | 63.53 | 9.19 | | 24992 | 2506 | 0 |
| 3  severe calcium brine | 127.05 | 91.875 | | 49981 | 25053 | 0 |

As described in Table 1, sea water contains around 35 grams per liter of a mixture of salts. The moderate and severe calcium brines contain around 70 and 200 grams per liter of a mixture of salts respectively.

In oil field applications, the scale inhibitor may be injected or squeezed or may be added topside to the produced water. Accordingly, embodiments of the invention also include mixtures of the anionic hybrid copolymer and a carrier fluid. The carrier fluid may be water, glycol, alcohol or oil. Preferably, the carrier fluid is water or brines or methanol. Methanol is often used to prevent the formation of methane hydrate (also known as methane clathrate or methane ice) structures downhole. In another embodiment of this invention, the anionic hybrid polymers may be soluble in methanol. Thus, the scale inhibiting polymers can be introduced in to the well bore in the methanol line. This is particularly advantageous since there is fixed number of lines that run in to the wellbore and this combination eliminates the need for another line.

In an embodiment of the invention the anionic hybrid polymer compositions can be uniformly mixed or blended with builders or chelating agents and then processed into powders or granules. For example, compositions including the anionic hybrid copolymer compositions of the present invention may include alkali metal or alkali-metal earth carbonates, citrates or silicates as exemplary builders suitable for use in detergent formulations. The term alkali metals are defined as the Group IA elements, such as lithium, sodium and potassium, whereas the alkali-metal earth metals are the Group IIA elements which include beryllium, magnesium and calcium.

Powders as used herein are defined as having an average particle size of less than about 300 microns, whereas granules are particles of an average size of greater than about 300 microns. By uniformly mixing or blending the hybrid copolymer with the builder or chelating agent, the particles or granules provide less hygroscopic properties and afford easier handling and free flowing powders. Free flowing as used in this application are powders or granules that do not clump or fuse together. In an embodiment of this invention, the hybrid polymer is an anionic hybrid copolymer. In another embodiment of this invention, the builders or chelating agents that can be blended with the hybrid copolymer are sodium or potassium carbonate, sodium or potassium silicate sodium or potassium citrate or glutamic acid N,N-diacetic acid (GLDA) or and methylglycine N,N-diacetic acid (MGDA).

In another aspect, the present invention relates to non-anionic hybrid copolymer compositions that contain non-anionic ethylenically unsaturated monomers. As used herein, a non-anionic ethylenically unsaturated monomer are those that are not anionic. These non-anionic ethylenically unsaturated monomers may include but are not limited to cationic ethylenically unsaturated monomers, nonionic ethylenically unsaturated monomers, amphoteric ethylenically unsaturated monomers and zwitterionic enthylenically unsaturated monomers and mixtures thereof. A non-anionic hybrid copolymer composition, as used herein, is a mixture of a hybrid synthetic copolymer produced from at least one cationic ethylenically unsaturated monomer or at least one nonionic ethylenically unsaturated monomer and a hybrid copolymer that comprises a synthetic polymer produced from at least one cationic ethylenically unsaturated monomer or at least one nonionic ethylenically unsaturated monomer that is chain terminated, or has an end group, with a naturally derived hydroxyl containing chain transfer agent. As used herein, the term "cationic ethylenically unsaturated monomer" means an ethylenically unsaturated monomer which is capable of introducing a positive charge to the non-anionic hybrid copolymer composition. In an embodiment of the present invention, the cationic ethylenically unsaturated monomer has at least one amine functionality. Cationic derivatives of these non-anionic hybrid copolymer compositions may be formed by forming amine salts of all or a portion of the amine functionality, by quaternizing all or a portion of the amine functionality to form quaternary ammonium salts, or by oxidizing all or a portion of the amine functionality to form N-oxide groups.

As used herein, the term "amine salt" means the nitrogen atom of the amine functionality is covalently bonded to from one to three organic groups and is associated with an anion.

As used herein, the term "quaternary ammonium salt" means that a nitrogen atom of the amine functionality is covalently bonded to four organic groups and is associated with an anion. These cationic derivatives can be synthesized by functionalizing the monomer before polymerization or by functionalizing the polymer after polymerization. These cationic ethylenically unsaturated monomers include, but are not limited to, N,N dialkylaminoalkyl(meth)acrylate, N-alkylaminoalkyl(meth)acrylate, N,N dialkylaminoalkyl(meth)acrylamide and N-alkylaminoalkyl(meth)acrylamide, where the alkyl groups are independently $C_{1-18}$ cyclic compounds such as 1-vinyl imidazole and the like. Aromatic amine containing monomers such as vinyl pyridine may also be used. Furthermore, monomers such as vinyl formamide, vinyl acetamide and the like which generate amine moieties on hydrolysis may also be used. Preferably the cationic ethylenically unsaturated monomer is N,N-dimethylaminoethyl methacrylate, tert-butylaminoethylmethacrylate and N,N-dimethylaminopropyl methacrylamide.

Cationic ethylenically unsaturated monomers that may be used are the quaternized derivatives of the above monomers as well as diallyldimethylammonium chloride also known as dimethyldiallylammonium chloride, (meth)acrylamidopropyl trimethylammonium chloride, 2-(meth)acryloyloxy ethyl trimethyl ammonium chloride, 2-(meth)acryloyloxy ethyl trimethyl ammonium methyl sulfate, 2-(meth)acryloyloxyethyltrimethyl ammonium chloride, N,N-Dimethylaminoethyl (meth)acrylate methyl chloride quaternary, methacryloyloxy ethyl betaine as well as other betaines and sulfobetaines, 2-(meth)acryloyloxy ethyl dimethyl ammonium hydrochloride, 3-(meth)acryloyloxy ethyl dimethyl ammonium hydroacetate, 2-(meth)acryloyloxy ethyl dimethyl cetyl ammonium chloride, 2-(meth)acryloyloxy ethyl diphenyl ammonium chloride and others.

As used herein, the term "nonionic ethylenically unsaturated monomer" means an ethylenically unsaturated monomer which does not introduce a charge in to the non-anionic hybrid copolymer composition. These nonionic ethylenically unsaturated monomers include, but are not limited to, acrylamide, methacrylamide, N alkyl(meth)acrylamide, N,N dialkyl(meth)acrylamide such as N,N dimethylacrylamide, hydroxyalkyl(meth)acrylates, alkyl(meth)acrylates such as methylacrylate and methylmethacrylate, vinyl acetate, vinyl morpholine, vinyl pyrrolidone, vinyl caprolactum, ethoxylated alkyl, alkaryl or aryl monomers such as methoxypolyethylene glycol(meth)acrylate, allyl glycidyl ether, allyl alcohol, glycerol(meth)acrylate, monomers containing silane, silanol and siloxane functionalities and others. The nonionic ethylenically unsaturated monomer is preferably water soluble. The preferred nonionic ethylenically unsaturated monomers are acrylamide, methacrylamide, N methyl(meth) acrylamide, N,N dimethyl(meth)acrylamide, vinyl pyrrolidone and vinyl caprolactum.

The cationic or non-ionic hybrid copolymer composition has a naturally derived hydroxyl containing chain transfer agent as the terminating moiety, or end group. This chain transfer agent is preferably present from about 0.1% by weight to about 98%, more preferably from about 10 to about 95% and most preferably from about 20 to about 75% by weight, based on the total weight of the cationic or non-ionic hybrid copolymer composition.

In exemplary embodiments, the non-anionic hybrid copolymer compositions can be used in fabric softener compositions as well as fabric care compositions. Suitable fabric softener formulations contain fabric softener actives, water, surfactants, electrolyte, phase stabilizing polymers, perfume, nonionic surfactant, non-aqueous solvent, silicones, fatty acid, dye, preservatives, optical brighteners, antifoam agents, and mixtures thereof. These fabric softener actives include, but are not limited, to diester quaternary ammonium compounds such as ditallowoyloxyethyl dimethyl ammonium chloride, dihydrogenated-tallowoyloxyethyl dimethyl ammonium chloride, dicanola-oyloxyethyl dimethyl ammonium chloride, ditallow dimethyl ammonium chloride, triethanolamine ester quats such as di-(hydrogenated tallowoyloxyethyl)-N,N-methylhydroxyethylammonium methylsulfate and di-(oleoyloxyethyl)-N,N-methylhydroxyethylammonium methylsulfate as well as others such as tritallow methyl ammonium chloride, methyl bis(tallow amidoethyl)-2-hydroxyethyl ammonium methyl sulfate, methyl bis (hydrogenated tallow amidoethyl)-2-hydroxyethyl ammonium methyl sulfate, methyl bis(oleyl amidoethyl)-2-hydroxyethyl ammonium methyl sulfate, ditallowoyloxyethyl dimethyl ammonium methyl sulfate, dihydrogenated-tallowoyloxyethyl dimethyl ammonium chloride, dicanola-oyloxyethyl dimethyl ammonium chloride, N-tallowoyloxyethyl-N-tallowoylaminopropyl methyl amine, 1,2-bis(hardened tallowoyloxy)-3-trimethylammonium propane chloride, dihardened tallow dimethyl ammonium chloride and mixtures thereof.

The preferred actives are diester quaternary ammonium (DEQA) compounds which are typically made by reacting alkanolamines such as MDEA (methyldiethanolamine) and TEA (triethanolamine) with fatty acids. Some materials that typically result from such reactions include N,N-di(acyl-oxy-ethyl)-N,N-dimethylammonium chloride or N,N-di(acyloxy-ethyl)-N,N-methylhydroxyethylammonium methylsulfate wherein the acyl group is derived from animal fats, unsaturated, and polyunsaturated, fatty acids, e.g., oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, and the like. Those skilled in the art will recognize that active softener materials made from such process can comprise a combination of mono-, di-, and tri-esters depending on the process and the starting materials.

As used herein, the term "fabric care formulations" include, but are not limited to, formulations used to treat fabric to improve fabric softness, shape retention, fabric elasticity, fabric tensile strength, fabric tear strength, fabric lubrication, fabric relaxation, durable press, wrinkle resistance, wrinkle reduction, ease of ironing, abrasion resistance, fabric smoothing, anti-felting, anti-pilling, crispness, appearance enhancement, appearance rejuvenation, color protection, color rejuvenation, anti-shrinkage, static reduction, water absorbency or repellency, stain repellency, refreshing, anti-microbial, odor resistance, and mixtures thereof. In addition to the non-anionic hybrid copolymers, the fabric care formulations may contain ingredients such as cationic surfactants, amphoteric surfactants, fabric softener actives, sucrose esters, softening agents, other fabric care agents, dispersing media, such as water, alcohols, diols; emulsifiers, perfumes, wetting agents, viscosity modifiers, pH buffers, antibacterial agents, antioxidants, radical scavengers, chelants, antifoaming agents, and mixtures thereof.

In further embodiments of the invention, the non-anionic hybrid copolymer compositions can be used as flocculants and coagulants for sludge dewatering and water clarification in waste water treatment applications. Further, domestic and industrial sewage contains suspended matter which must be removed. The suspended particles are predominantly stabilized due to their net negative surface charge. The cationic hybrid polymer compositions disrupt this negative charge and enable removal of the suspended solids from the water. In still further embodiments, the non-anionic hybrid copolymer compositions function as emulsion breakers for oil in water emulsions. These are useful in waste water treatment applications to comply with the limitations of fats oil and greases in the discharge water. In addition, the non-anionic hybrid copolymer compositions function as reverse emulsion breakers in the oil field. In this application, small amounts of oil droplets are removed from the water continuous phase before the water can be safely returned to the environment. Additionally, anionic and non-anionic hybrid copolymer compositions of the invention can be utilized in applications requiring film forming characteristics, such as in personal care and/or cosmetic applications.

The hybrid copolymer compositions can be used in cosmetic and personal care compositions. Hybrid copolymer compositions useful in cosmetic and personal care compositions include both anionic and non-anionic hybrid copolymer compositions. Cosmetic and personal care compositions include, for example, skin lotions and creams, skin gels, serums and liquids, facial and body cleansing products, wipes, liquid and bar soap, color cosmetic formulations, make-ups, foundations, sun care products, sunscreens, sunless tanning formulations, shampoos, conditioners, hair color formulations, hair relaxers, products with AHA and BHA and hair fixatives such as sprays, gels, mousses, pomades, and waxes, including low VOC hair fixatives and sunscreens. These cosmetic and personal care compositions may be in any form, including without limitation, emulsions, gels, liquids, sprays, solids, mousses, powders, wipes, or sticks.

The cosmetic and personal care compositions contain suitable "cosmetic and personal care actives". Suitable cosmetic and personal care active agents include, for example, sunscreen agents or actives, aesthetic enhancers, conditioning agents, anti-acne agents, antimicrobial agents, anti-inflammatory agents, analgesics, anti-erythemal agents, antiruritic agents, antiedemal agents, antipsoriatic agents, antifungal agents, skin protectants, vitamins, antioxidants, scavengers, antiirritants, antibacterial agents, antiviral agents, antiaging agents, protoprotection agents, hair growth enhancers, hair growth inhibitors, hair removal agents, antidandruff agents, anti-seborrheic agents, exfoliating agents, wound healing agents, anti-ectoparacitic agents, sebum modulators, immunomodulators, hormones, botanicals, moisturizers, astringents, cleansers, sensates, antibiotics, anesthetics, steroids, tissue healing substances, tissue regenerating substances, hydroxyalkyl urea, amino acids, peptides, minerals, ceramides, biohyaluronic acids, vitamins, skin lightening agents, self tanning agents, coenzyme Q10, niacinimide, capcasin, caffeine, and any combination of any of the foregoing.

Suitable sunscreen agents or actives useful in the present invention include any particulate sunscreen active that absorbs, scatters, or blocks ultraviolet (UV) radiation, such as UV-A and UV-B. Non-limiting examples of suitable particulate sunscreen agents include clays, agars, guars, nanoparticles, native and modified starches, modified cellulosics, zinc oxide, and titanium dioxide and any combination of the foregoing. Modified starches include, for example, DRY-FLO® PC lubricant (aluminum starch octenylsuccinate), DRY-FLO® AF lubricant (corn starch modified), DRY-FLO® ELITE LL lubricant (aluminum starch octenylsuccinate (and) lauryl lysine), DRY-FLO® ELITE BN lubricant (aluminum starch octenylsuccinate (and) boron nitride), all commercially available from National Starch and Chemical Company.

The sunscreen agents may include those that form a physical and/or chemical barrier between the UV radiation and the surface to which they are applied. Non-limiting examples of suitable sunscreen agents include ethylhexyl methoxycinnamate (octinoxate), ethylhexyl salicylate (octisalate), butyl-methoxydibenzoylmethane, methoxydibenzoylmethane, avobenzone, benzophenone-3 (oxybenzone), octocrylene, aminobenzoic acid, cinoxate, dioxybenzone, homosalate, methyl anthranilate, octocrylene, octisalate, oxybenzone, padimate O, phenylbenzimidazole sulfonic acid, sulisobenzone, trolamine salicylate and any combination of any of the foregoing The cosmetic and personal care compositions can optionally include one or more aesthetic enhancers (i.e., a material that imparts desirable tactile, visual, taste and/or olfactory properties to the surface to which the composition is applied) and can be either hydrophilic or hydrophobic. Non-limiting examples of commercial aesthetic enhancers together with their INCI names that are optionally suitable for use in the present invention include PURITY®21C starch (zea maize (corn) starch) and TAPIOCA PURE (tapioca starch), as well as combinations thereof, that are available from the National Starch and Chemical Company.

Suitable conditioning agents include, but are not limited to, cyclomethicone; petrolatum; dimethicone; dimethiconol; silicone, such as cyclopentasiloxane and diisostearoyl trimethylolpropane siloxy silicate; sodium hyaluronate; isopropyl palmitate; soybean oil; linoleic acid; PPG-12/saturated methylene diphenyldiisocyanate copolymer; urea; amodimethicone; trideceth-12; cetrimonium chloride; diphenyl dimethicone; propylene glycol; glycerin; hydroxyalkyl urea; tocopherol; quaternary amines; and any combination thereof.

The cosmetic and personal care compositions can optionally include one or more adjuvants, such as pH adjusters, emollients, humectants, conditioning agents, moisturizers, chelating agents, propellants, rheology modifiers and emulsifiers such as gelling agents, colorants, fragrances, odor masking agents, UV stabilizer, preservatives, and any combination of any of the foregoing. Examples of pH adjusters include, but are not limited to, aminomethyl propanol, aminomethylpropane diol, triethanolamine, triethylamine, citric acid, sodium hydroxide, acetic acid, potassium hydroxide, lactic acid, and any combination thereof.

The cosmetic and personal care compositions may also contain preservatives. Suitable preservatives include, but are not limited to, chlorophenesin, sorbic acid, disodium ethylenedinitrilotetraacetate, phenoxyethanol, methylparaben, ethylparaben, propylparaben, phytic acid, imidazolidinyl urea, sodium dehydroacetate, benzyl alcohol, methylchloroisothiazolinone, methylisothiazolinone, and any combination thereof. In an embodiment of the invention, the cosmetic and personal care composition generally contains from about 0.001% to about 20% by weight of preservatives, based on 100% weight of total composition. In another embodiment, the composition contains from about 0.1% to about 10% by weight of preservatives, based on 100% weight of total composition.

The cosmetic and personal care compositions may optionally contain thickeners or gelling agents. Examples of such gelling agents include, but are not limited to, synthetic polymers such as the acrylic-based Carbopol® series of thickeners available from B. F. Goodrich, Cleveland, Ohio and associative thickeners such as Aculyn™, available from Rohm & Haas, Philadelphia, Pa. Other exemplary gelling agents include, cellulosic thickeners, such as derivatized hydroxyethyl cellulose and methyl cellulose, starch-based thickeners, such as acetylated starch, and naturally occurring gums, such as agar, algin, gum arabic, guar gum and xanthan gum. Thickeners and rheology modifiers may also include without limitation acrylates/steareth-20 itaconate copolymer, acrylates/ceteth-20 itaconate copolymer, potato starch modified, hydroxypropyl starch phosphate, acrylates/aminoacrylates/C10-30 alkyl PEG-20 itaconate copolymer, carbomer, acrylates/C10-30 alkyl acrylate crosspolymer, hydroxypropylcellulose, hydroxyethylcellulose, sodium carboxymethylcellulose, polyacrylamide (and) C13-14 isoparaffin (and) laureth-7, acrylamides copolymer (and) mineral oil (and) C13-14 isoparaffin (and) polysorbate 85, hydroxyethylacrylate/sodium acrylol dimethyltaurate copolymer, and hydroxyethylacrylate/sodium acrylol dimethyltaurate copolymer.

In an embodiment of the invention, the cosmetic and personal care composition is a hair cosmetic composition. Optional conventional additives may also be incorporated into the hair cosmetic compositions of this invention to provide certain modifying properties to the composition. Included among these additives are silicones and silicone derivatives; humectants; moisturizers; plasticizers, such as glycerine, glycol and phthalate esters and ethers; emollients, lubricants and penetrants, such as lanolin compounds; fragrances and perfumes; UV absorbers; dyes, pigments and other colorants; anticorrosion agents; antioxidants; detackifying agents; combing aids and conditioning agents; antistatic agents; neutralizers; glossifiers; preservatives; proteins, protein derivatives and amino acids; vitamins; emulsifiers; surfactants; viscosity modifiers, thickeners and rheology modifiers; gelling agents; opacifiers; stabilizers; sequestering agents; chelating agents; pearling agents; aesthetic enhancers; fatty acids, fatty alcohols and triglycerides; botanical extracts; film formers; and clarifying agents. These additives are present in small, effective amounts to accomplish their function, and generally will comprise from about 0.01 to about 10% by weight each, and from about 0.01 to about 20% by weight total, based on the weight of the composition.

The hair cosmetic composition may optionally be a mousse. For mousses, the solvent may be a lower ($C_{1-4}$) alcohol, particularly methanol, ethanol, propanol, isopropanol, or butanol, although any solvent known in the art may be used.

Optionally, an embodiment of the invention may also comprise a spray. For sprays propellants include any optional propellant(s). Such propellants include, without limitation, ethers, such as dimethyl ether; one or more lower boiling hydrocarbons such as $C_3$-$C_6$ straight and branched chain hydrocarbons, for example, propane, butane, and isobutane; halogenated hydrocarbons, such as, hydrofluorocarbons, for example, 1,1-difluoroethane and 1,1,1,2-tetrafluoroethane, present as a liquefied gas; and the compressed gases, for example, nitrogen, air and carbon dioxide.

In embodiments of the invention, the hybrid copolymer compositions encompassing both anionic and non-anionic hybrid copolymer compositions are latently-detectable, which means that they will not be detectable in the visible light range until the hybrid copolymer composition is contacted with a photoactivator. As defined herein, the "photoactivator" is an appropriate reagent or reagents which, when present in effective amounts, will react with the hybrid copolymer composition, thereby converting the hybrid copolymer composition into a chemical species which strongly absorbs in the region from about 300 to about 800 nanometers when activated with, for example, sulfuric acid and phenol. In an embodiment of this invention, the activated hybrid copolymer composition will absorb in the region from about 400 to about 700 nanometers.

A latently detectable moiety of this invention will be formed from a naturally derived hydroxyl containing chain transfer agent especially when it is saccharide or polysaccharide moiety. The photoactivator may be the combination of sulfuric acid and phenol (see Dubois et al, Anal. Chem. 28 (1956) p. 350 and Example 1 of U.S. Pat. No. 5,654,198, which is incorporated in its entirety by reference herein). Polymers typically tagged with latently detectable moieties exhibit a drop in efficacy when compared to polymers without these groups. This is especially true when the weight percent of the latently detectable moiety is over 10 or 20 percent of the polymer. However, it has been found that the hybrid copolymers compositions of the present invention perform well even when containing 50 percent or more of the latently detectable moiety. Thus, the advantages of good performance and ready detectability are provided, which allow monitoring the system and controlling scale without over dosing the scale control polymer.

In further embodiments of the present invention the ethylenically unsaturated monomer of the ester hybrid copolymer composition may optionally be derived from at least one ester monomer. Exemplary ester monomers include, but are not limited to, esters derived from dicarboxylic acid as well as hydroxyalkyl esters. Suitable ester monomers derived from dicarboxylic acid include, but are not limited to, monomethylmaleate, dimethylmaleate, monomethylitaconate, dimethylitaconate, monoethylmaleate, diethylmaleate, monoethylitaconate, diethylitaconate, monobutylmaleate, dibutylmaleate, monobutylitaconate and dibutylitaconate. Suitable hydroxyalkyl esters include, but are not limited to, hydroxy ethyl (meth)acrylate, hydroxy propyl(meth)acrylate, hydroxy butyl (meth)acrylate and the like.

In yet another aspect, the invention relates to a method of preparing a hybrid copolymer composition. The method of preparing the hybrid copolymer composition comprises reacting at least one monomer with a solution of a naturally derived hydroxyl containing chain transfer agent that includes only minor amounts of secondary chain transfer agents, such as sodium hypophosphite. In an embodiment of the invention, the secondary chain transfer agent may be less than 20 weight percent of the hybrid polymer. In another embodiment, solution of the naturally derived hydroxyl containing chain transfer agent may be substantially free of secondary transfer agents. The method may further comprise catalyzing the polymerizing step with an initiator that is substantially free of a metal ion initiating system at a temperature sufficient to activate said initiator.

In still yet another aspect, the invention relates to a blend of a hybrid copolymer composition or an anionic hybrid copolymer composition and a builder or a chelating agent. Exemplary chelating agents suitable for use in the present invention include, but are not limited to, alkali metal or alkali-metal earth carbonates, alkali metal or alkali earth citrates, alkali metal or alkali earth silicates, glutamic acid N,N-diacetic acid (GLDA), methylglycine N,N-diacetic acid (MGDA) and combinations thereof. In an embodiment according to the invention, the blend may be a particulate containing a uniform dispersion of the hybrid copolymer and the builder or chelating agent. The particulate may also be a powder or a granule.

In still yet another aspect, when the natural hydroxyl containing chain transfer agent in the hybrid copolymer composition is a saccharide or a polysaccharide, the invention relates to the number of reacted anhydroglucose units per every 100 anhydroglucose units in the hybrid copolymer. As used herein, the term "reacted anhydroglucose unit" means any anhydroglucose unit in the hybrid copolymer composition that does not hydrolyze to glucose. These reacted anhydroglucose units include those that have synthetic chains attached to them as well as other side reactions that can occur in the process such as combination of the anhydroglucose radical with other radicals, addition of the synthetic monomer to the anhydroglucose unit etc. The number of reacted anhydroglucose units per every 100 anhydroglucose units in the hybrid is preferably 1 or greater, more preferably 2 or greater and most preferably 4 or greater.

In still yet another aspect, the invention relates to a "amphoteric hybrid copolymer compositions" containing both anionic and cationic groups. The anionic moieties can be on the naturally derived hydroxyl containing chain transfer agent with the cationic moieties on the synthetic component or the cationic moieties can be on the naturally derived hydroxyl containing chain transfer agent with the anionic moieties on the synthetic component or combinations thereof. When the natural component is a polysaccharide, the anionic material can be an oxidized starch and the cationic moiety can be derived from cationic ethylenically unsaturated monomers such as diallyldimethylammonium chloride. Alternatively, the oxidized starch itself may first be reacted with cationic substituent such as 3-chloro-2-hydroxypropyl) trimethylammonium chloride and then reacted with a synthetic anionic or cationic monomer or mixtures thereof. In another embodiment, a cationic starch may be reacted with an anionic monomer. Finally, the cationic and anionic moieties may be on the synthetic component of these polymers. These amphoteric hybrid copolymer composition containing both anionic and cationic groups are particularly useful in detergent formulations as dispersants and cleaning aids. It is understood that these polymers will contain both a natural component and a synthetic component. The cationic moieties are preferably present in the range of 0.001 to 40 mole % of the anionic moieties, more preferably the cationic moieties are present in the range of 0.01 to 20 mole % of the anionic moieties, and most preferably the cationic moieties are present in the range of 0.1 to 10 mole % of the anionic moieties. Polymers formed from a cationic ethylenically unsaturated monomer tend to have poor toxicological and environmental profiles. Therefore, it is necessary to minimize the level of cationic ethylenically unsaturated monomer in the amphoteric hybrid copolymer composition. In an embodiment of the invention, when a cationic ethylenically unsaturated monomer is used to produce the amphoteric graft copolymer composition, the cationic ethylenically unsaturated monomer is preferably present up to 10 mole % of the anionic ethylenically unsaturated monomer, more preferably the cationic ethylenically unsaturated monomer is preferably present up to 6 mole % of the anionic ethylenically unsaturated monomer, and most preferably the cationic ethylenically unsaturated monomer is preferably present up to 5 mole % of the anionic ethylenically unsaturated monomer.

In still yet another aspect, the invention relates to anionic hybrid copolymer compositions derived from monomers produced from natural sources such as itaconic acid produced from corn or acrylamide produced by fermentation. The acrylamide can be hydrolyzed to acrylic acid after the polymerization to introduce anionic functionality. One skilled in the art will recognize that monomers produced from natural sources increase the renewable carbon content of the polymers of this invention.

EXAMPLES

The following examples are intended to exemplify the present invention but are not intended to limit the scope of the invention in any way. The breadth and scope of the invention are to be limited solely by the claims appended hereto.

Example 1

Synthesis of Anionic Hybrid Copolymer Composition with 80 Weight Percent Chain Transfer Agent 200 grams of maltose as a chain transfer agent (Cargill Sweet Satin Maltose 80% aqueous solution, available from Cargill Inc., Cedar Rapids, Iowa) was initially dissolved in 200 grams of water in a reactor and heated to 98° C. A monomer solution containing 40 grams of acrylic acid in 120 grams of water was subsequently added to the reactor over a period of 90 minutes. An initiator solution comprising of 6.6 grams of sodium persulfate in 40 grams of water was added to the reactor at the same time as the monomer solution over a period of 90 minutes. The reaction product was held at 98° C. for an additional 60 minutes. The polymer was then partially neutralized by adding 20 grams of a 50% solution of NaOH. The final product was a light yellow solution with 31% solids.

Example 2

Synthesis of Anionic Hybrid Copolymer Composition with 95 Weight Percent Polysaccharide Functionality 190 grams of maltodextrin as a polysaccharide chain transfer agent (Cargill MD™ 01918 dextrin, spray-dried maltodextrin obtained by enzymatic conversion of common corn starch, available from Cargill Inc., Cedar Rapids, Iowa) was initially dissolved in 200 grams of water in a reactor and heated to 95° C. A monomer solution containing 10 grams of acrylic acid dissolved in 75 g of water was subsequently added to the reactor over a period of one hour. An initiator solution comprising of 0.5 grams of sodium persulfate in 25 grams of water was added to the reactor at the same time as the monomer solution but over a period of 1 hour and 10 minutes. The reaction product was held at 95° C. for an additional 30 minutes. The polymer was then partially neutralized by adding 5 grams of a 50% solution of NaOH dissolved in 40 grams of water.

Example 3

Synthesis of Anionic Hybrid Copolymer Composition with 85 Weight Percent Maltose Functionality 213 grams of maltose as a chain transfer agent (Cargill Sweet Satin Maltose 80% aqueous solution, available from Cargill Inc., Cedar Rapids, Iowa) was initially dissolved in 180 grams of water in a reactor and heated to 98° C. A monomer solution containing 30 grams of acrylic acid in 60 grams of water was subsequently added to the reactor over a period of 90 minutes. An initiator solution comprising of 6.6 grams of sodium persulfate in 40 grams of water was added to the reactor at the same time as the monomer solution over a period of 90 minutes. The reaction product was held at 98° C. for an additional 60 minutes. The polymer was then partially neutralized by adding 15 grams of a 50% solution of NaOH and the final product was a clear amber colored solution.

Example 4

Synthesis of Anionic Hybrid Copolymer Composition with 85 Weight Percent Polysaccharide Functionality 213 grams of maltodextrin as a polysaccharide chain transfer agent (Cargill Sweet Satin Maltose 80% aqueous solution, available from Cargill Inc., Cedar Rapids, Iowa) was initially dissolved in 180 grams of water in a reactor and heated to 98° C. A monomer solution containing 30 grams of acrylic acid dissolved in 100 grams of water was subsequently added to the reactor over a period of 90 minutes. An initiator solution comprising of 6.6 grams of sodium persulfate in 40 grams of water was added to the reactor at the same time as the monomer solution over a period of ninety minutes. The reaction product was held at 98° C. for an additional 60 minutes. The polymer was then neutralized by adding 15 grams of a 50% solution of NaOH and the final product was an amber colored solution.

Example 5

Synthesis of Anionic Hybrid Copolymer Composition with 90 Weight Percent Maltose Functionality 225 grams of maltose as a chain transfer agent (Cargill Sweet Satin Maltose 80% aqueous solution, available from Cargill Inc., Cedar Rapids, Iowa) was initially dissolved in 200 grams of water in a reactor and heated to 98° C. A monomer solution containing 20 grams of acrylic acid in 115 grams of water was subsequently added to the reactor over a period of 90 minutes. An initiator solution comprising of 6.6 grams of sodium persulfate in 40 grams of water was added to the reactor at the same time as the monomer solution over a period of 90 minutes. The reaction product was held at 98° C. for an additional 60 minutes. The polymer was then partially neutralized by adding 10 grams of a 50% solution of NaOH and the final product was a clear yellow colored solution.

Example 6

Synthesis of Anionic Hybrid Copolymer Composition with 80 Weight Percent Polysaccharide as a Chain Transfer Agent 160 grams of maltodextrin as a polysaccharide chain transfer agent (STAR-DRI 180 DE 18 spray-dried maltodextrin available from Tate and Lyle, Decatur, Ill.) was initially dissolved in 200 grams of water in a reactor and heated to 98° C. A monomer solution containing 40 grams of acrylic acid in 120 grams of water was subsequently added to the reactor over a period of 90 minutes. An initiator solution comprising of 6.6 grams of sodium persulfate in 40 grams of water was added to the reactor at the same time as the monomer solution over a period of 90 minutes. The reaction product was held at 98° C. for an additional 60 minutes. The polymer was then partially neutralized by adding 20 grams of a 50% solution of NaOH and the final product was a light yellow solution.

Example 7

Synthesis of Anionic Hybrid Copolymer Composition with 90 Weight Percent Polysaccharide as a Chain Transfer Agent 180 grams of maltodextrin as a polysaccharide chain transfer agent (STAR-DRI 180 DE 18 spray-dried maltodextrin available from Tate and Lyle, Decatur, Ill.) was initially dissolved in 200 grams of water in a reactor and heated to 98° C. A monomer solution containing 20 grams of acrylic acid in 115 grams of water was subsequently added to the reactor over a period of 90 minutes. An initiator solution comprising of 6.6 grams of sodium persulfate in 40 grams of water was added to the reactor at the same time as the monomer solution over a period of 90 minutes. The reaction product was held at 98° C. for an additional 60 minutes. The polymer was then partially neutralized by adding 10 grams of a 50% solution of NaOH and the final product was a clear yellow colored solution.

Example 8

Dispersancy Evaluation of Anionic Hybrid Copolymer Compositions

The polymers of Example 6 and 7 were evaluated in a clay suspension/dispersancy test. A control without any polymer was also tested. These materials were compared against a sodium polyacrylate sample (NaPAA) (ALCOSPERSE® 602N, available from Akzo Nobel Surface Chemistry, Chattanooga, Tenn.). The samples were prepared by adding 2% clay (50:50 rose clay: spinks blend clay) to deionized water. The samples were then stirred on a magnetic stir plate for 20 minutes, after which 0.1% active polymer was added and the samples were stirred for one minute more. The suspensions were then poured into 100 ml graduated cylinders and allowed to rest for one hour. The dispersancy performance was then rated on a scale of 1 to 5 with 1 being no dispersancy and 5 being very good dispersancy. The results are shown in Table 2.

TABLE 2

| Polymer | Dispersancy Performance on a scale of 1 to 5 |
|---|---|
| None | 1 |
| Star-DRI 180 DE (maltodextrin from examples 6 & 7, comparative example) | 1 |
| Anionic hybrid copolymer composition of Example 6 | 5 |
| Anionic hybrid copolymer composition of Example 7 | 5 |
| Alcosperse 602N (Synthetic polymer, comparative example) | 5 |

These data in Table 2 above indicate that the polymers of this invention are excellent dispersants. This is especially notable since these polymers contain 80 and 90% polysaccharide but the polysaccharide by itself has no dispersancy performance. Furthermore, they are comparable in performance to synthetic polymers (e.g., sodium polyacrylate) typically used in this type of application.

Example 9

Synthesis of Anionic Hybrid Copolymer Composition with 85 Weight Percent Natural Polysaccharide Functionality 170 grams of maltodextrin as a polysaccharide chain transfer agent (Cargill MD™ 01918 dextrin, spray-dried maltodextrin obtained by enzymatic conversion of common corn starch, available from Cargill Inc., Cedar Rapids, Iowa) was initially dissolved in 250 grams of water in a reactor and heated to 98° C. A monomer solution containing 30 grams of acrylic acid in 60 grams was subsequently added to the reactor over a period of 90 minutes. An initiator solution comprising of 6.6 grams of sodium persulfate in 40 grams of water was added to the reactor at the same time as the monomer solution over a period of 90 minutes. The reaction product was held at 98° C. for an additional 60 minutes. The polymer was then partially neutralized by adding 30 grams of a 50% solution of NaOH and the pH of this solution was 7.

Example 10-15

The procedure of Example 9 above was repeated for Examples 10-15 in which different levels of sulfonated monomer in the form of sodium 2-acrylamido-2-methylpropane sulfonate (AMPS) were used, as identified in Table 3. This monomer is available as a 50% aqueous solution which was then mixed with the acrylic acid and this monomer mixture was fed in to the reactor over 90 minutes as described above.

TABLE 3

| Example | wt % acrylic acid | wt % AMPS | wt % maltodextrin (Cargill MD 01918) |
|---|---|---|---|
| 10 | 15 | 0 | 85 |
| 11 | 13 | 2 | 85 |
| 12 | 10 | 5 | 85 |
| 13 | 7.5 | 7.5 | 85 |
| 14 | 5 | 10 | 85 |
| 15 | 0 | 15 | 85 |

Example 16

The polymers from Examples 9 to 15 were then tested in 3 different brines designated Brine 1, 2 and 3 respectively Table 4.

TABLE 4

| Polymer of Example | Polymer concentration [ppm] | Brine 1 Observation after 0 h, 21° C. | Brine 1 Observation after 24 h, 90° C. | Brine 2 Observation after 0 h, 21° C. | Brine 2 Observation after 24 h, 90° C. | Brine 3 Observation after 0 h, 21° C. | Brine 3 Observation after 24 h, 90° C. |
|---|---|---|---|---|---|---|---|
| Synthetic homopolymer (Sodium polyacrylate) at pH 5 | 250 | Y | Y | Y | X | X | X |
|  | 5000 | Y | Y | Y | X | X | X |
|  | 100000 | Y | Y | Y | X | X | X |
| 9 | 250 | Y | Y | Y | Y | Y | Y |
|  | 5000 | Y | Y | Y | Y | X | X |
|  | 100000 | Y | Y | X | Y | X | X |
| 10 | 250 | Y | Y | Y | Y | Y | Y |
|  | 5000 | Y | Y | Y | Y | Y | Y |
|  | 100000 | Y | Y | Y | Y | Y | redisperable precipitate |
| 11 | 250 | Y | Y | Y | Y | Y | Y |
|  | 5000 | Y | Y | Y | Y | Y | Y |
|  | 100000 | Y | Y | Y | Y | Y | Y |
| 12 | 250 | Y | Y | Y | Y | Y | Y |
|  | 5000 | Y | Y | Y | Y | Y | Y |
|  | 100000 | Y | Y | Y | Y | Y | X |
| 13 | 250 | Y | Y | Y | Y | Y | Y |
|  | 5000 | Y | Y | Y | Y | Y | Y |
|  | 100000 | Y | Y | Y | Y | Y | X |
| 15 | 250 | Y | Y | Y | Y | Y | Y |
|  | 5000 | Y | Y | Y | Y | Y | Y |
|  | 100000 | Y | Y | Y | Y | Y | X |

| | |
|---|---|
| Y | Compatible, clear solution |
| Uniform haze | Hazy solution, no precipitate settling |
| Redispersable precipitate | minimal precipitate settles, but uniformly redisperses with minimal agitation |
| X | Precipitate formed, either crystalline fiber-like structures or gross powder-like precipitate |

The data indicate that the anionic hybrid copolymer compositions of this invention containing acrylic acid and sulfonate monomer and 85 weight percent polysaccharide chain transfer agent are brine compatible. However, a corresponding synthetic homopolymer is not brine compatible.

Example 17

158 grams of maltodextrin as a polysaccharide chain transfer agent (Cargill MD™ 01960 DE 11, available from Cargill Inc., Cedar Rapids, Iowa) was initially dissolved in 155 grams of water in a reactor and heated to 85° C. A monomer solution containing 39 grams of acrylic acid and 27.5 grams of a 50% solution of sodium 2-acrylamido-2-methylpropane sulfonate was subsequently added to the reactor over a period of 180 minutes. An initiator solution comprising of 8.3 grams of sodium persulfate in 33 grams of water was added to the reactor over a period of 195 minutes. The reaction product was held at 85° C. for an additional 30 minutes. The polymer was then partially neutralized by adding 14.5 grams of a 50% solution of NaOH and 66 grams of water.

Example 18

Brine compatibility of the sulfonated anionic hybrid copolymer composition containing 75 weight percent maltodextrin of Example 17 and a commercial sulfonated synthetic polymer (Aquatreat 545, available from Alco Chemical which is a copolymer of acrylic acid and sodium 2-acrylamido-2-methylpropane sulfonate) was tested in Brine 3, the composition of which is listed in Table 5. The data shown for these compatibility tests are shown below.

TABLE 5

| | | | Brine 3 | | | | |
|---|---|---|---|---|---|---|---|
| Inhibitor | Natural component | Polymer concentration [ppm] | Observation after 0 h, 21° C. | Observation after 1 h, 60° C. | Observation after 2 h, 90° C. | Observation after 24 h, 90° C. | |
| Example 13 | | 5000 | Y | Y | Y | Y | |
|  | | 25000 | Y | Y | Y | Y | |
|  | | 100000 | Y | Y | Y | X | |

TABLE 5-continued

| | | Brine 3 | | | | |
|---|---|---|---|---|---|---|
| | | Polymer | Observation after | | | |
| Inhibitor | Natural component | concentration [ppm] | 0 h, 21° C. | 1 h, 60° C. | 2 h, 90° C. | 24 h, 90° C. |
| Aquatreat 545 from Alco Chemical | | 5000 | X | Uniform haze | Uniform haze | X |
| | | 25000 | X | X | X | X |
| | | 100000 | X | X | Uniform haze | X |

| | |
|---|---|
| Y | Compatible, clear solution |
| Uniform haze | Hazy solution, no precipitate settling |
| Redispersable precipitate | minimal precipitate settles, but uniformly redisperses with minimal agitation |
| X | Precipitate formed, either crystalline fiber-like structures or gross powder-like precipitate |

These data indicate that the anionic hybrid copolymer composition of this invention are extremely brine compatible whereas corresponding synthetic polymers are not.

Example 19

Method for Synthesis of a Hybrid Copolymer Composition with Polysaccharide Chain Transfer Agent as Well as a Secondary Chain Transfer Agent 221 grams of maltodextrin as a polysaccharide chain transfer agent (STAR-DRI 100 DE 10 spray-dried maltodextrin available from Tate and Lyle, Decatur, Ill. Mw 62743, Mn 21406) and 40 g of sodium hypophosphite dihydrate (approximately 7.7 weight % based on the total weight of the polymer) as a secondary chain transfer agent was dissolved in 350 grams of water in a reactor and heated to 75° C. A monomer solution containing 221 grams of acrylic acid was subsequently added to the reactor over a period of three hours. An initiator solution comprising of 11 grams of sodium persulfate in 80 grams of water was added to the reactor at the same time as the monomer solution over a period of 3.5 hours. The reaction product was held at 75° C. for an additional 60 minutes. The polymer was then partially neutralized by adding 80 grams of a 50% solution of NaOH and the final product was a clear yellow colored solution.

Example 20

Synthesis of an Ester Hybrid Copolymer Composition 45.9 grams of monomethylmaleate (ester monomer) was dissolved in 388 grams of water. 15.3 grams of ammonium hydroxide was added and the mixture was heated to 87 C. 85 grams of maltodextrin of DE 18 (Cargill MD™ 01918, spray-dried maltodextrin obtained by enzymatic conversion of common corn starch, available from Cargill Inc., Cedar Rapids, Iowa) was added just before the monomer and initiator feeds were started. A monomer solution containing a mixture of 168 grams of acrylic acid and 41.0 grams of hydroxyethyl methacrylate (ester monomer) was added to the reactor over a period of 5 hours. A first initiator solution comprising of 21 grams of erythorbic acid dissolved in 99 grams of water was added over a period of 5.5 hours. A second initiator solution comprising of 21 grams of a 70% solution of tertiary butyl hydroperoxide dissolved in 109 grams of water was added over a period of 5.5 hours. The reaction product was held at 87° C. for 30 minutes. The final product was a clear light amber solution and had 34.1% solids.

Example 21

The ester hybrid copolymer composition of Example 20 was evaluated for barium sulfate inhibition using the procedure described below:

Part 1: Solution Preparation

1. Prepare Synthetic North Sea seawater (SW) brine.
   a. Add the following salts identified in Table 6 to a glass volumetric flask and bring to volume with DI water. Weigh all +/−0.01 grams.
   b. Buffer SW by adding 1 drop of acetic acid then adjust the pH with saturated sodium acetate solution to reach pH 6.1. Record amount added.
   c. Filter brine through 0.45 μm membrane filter under vacuum to remove any dust particles that may affect test reproducibility.

TABLE 6

| | SW | | | |
|---|---|---|---|---|
| | g/L | g/2 L | g/3 L | record actual |
| NaCl | 24.074 | 48.148 | 72.222 | |
| $CaCl_2 *2H_2O$ | 1.57 | 3.14 | 4.71 | |
| $MgCl_2 *6H_2O$ | 11.436 | 22.872 | 34.308 | |
| KCl | 0.877 | 1.754 | 2.631 | |
| $Na_2SO_4$ | 4.376 | 8.752 | 13.128 | |
| grams sodium acetate added | | | | |

NOTE:
Biological growth occurs in this solution due to sulfate content. Use within 1 week of making.

2. Preparation of a standardized Forties formation water (FW) brine.
   a. Add the following salts identified in Table 7 to a glass volumetric flask and bring to volume with DI water. Weigh all +/−0.01 grams.
   b. Buffer SW by adding 1 drop of acetic acid then adjust the pH with saturated sodium acetate solution to reach pH 6.1. Record amount added.
   c. Filter brine through 0.45 μm membrane filter under vacuum to remove any dust particles that may affect test reproducibility.

TABLE 7

| | FW | | | |
|---|---|---|---|---|
| | g/L | g/2 L | g/3 L | record actual |
| NaCl | 74.167 | 148.334 | 222.501 | |
| $CaCl_2 * 2H_2O$ | 10.304 | 20.608 | 30.912 | |
| $MgCl_2 * 6H_2O$ | 4.213 | 8.426 | 12.639 | |
| KCl | 0.709 | 1.418 | 2.127 | |
| $BaCl_2 * 2H_2O$ | 0.448 | 0.896 | 1.344 | |
| grams sodium acetate added | | | | |

3. Prepare a 1% (10,000 ppm) active polymer solution for each inhibitor to be tested.
   a. Weigh indicated grams of polymer into a volumetric flask and bring to volume with buffered, filtered seawater.

Grams of polymer (g) required can be calculated by the formula below.

$$g=(V \times C)/S$$

where
V is volume in mL of volumetric flask
C is concentration of polymer required (as weight %)
S is solids (active) content (in weight %) of the polymer
Example: A polymer has a solids content of 35%. To create 100 mL of a 1 wt % (10,000 ppm) solution:

$$g=(100 \times 1)/35=2.857 \text{ g of polymer in 100 mL of seawater}$$

4. Prepare a buffer solution.
   a. Add 8.2 g anhydrous sodium acetate to 100 g of DI water
5. Prepare a quenching solution. Since barium sulfate forms readily on cooling, an effective dosage of scale inhibitor is required to prevent further precipitation after the test ends.
   a. Add 9 g KCl to a 3 L volumetric flask. Dissolve with DI water.
   b. Add 1 active wt % ALCOFLOW 615 (~67.5 grams)

$$g=(3000 \times 1)/44.4=67.57 \text{ g of polymer in 3000 mL}$$

c. Bring to volume with DI water.

Part 2: Test Setup
6. Label 40 mL glass vials with inhibitor name and concentration to be tested and number 1 through max 30 samples. The numbers will indicate the run order for the test.
7. Add 15 mL of DI water to each vial numbered 1-3. These will be used to make the totals.
8. Add 15 mL of SW to each vial numbered 4-30.
9. Label a second set of glass vials with "FW".
10. Add 15 mL of FW to each vial.
11. Place FW and SW vials in incubator or oven, but do not heat.

Part 3: Test Period
12. Turn on incubator and set to heat to 80 C.
13. Prepare SW for test. To each SW vial numbered 7-30,
   a. Add 0.3 mL of sodium acetate buffer solution.
   b. Add the appropriate amount of scale inhibitor solution to give desired concentration for 30 mL of sample.

Microliters of inhibitor solution (μl) required can be calculated by the formula below.

$$\mu l=[(V_1 \times C_1)/C_2] \times 1000,$$

where
$V_1$ is volume in mL of test sample (SW+FW)
$C_1$ is concentration of polymer desired (in ppm)
$C_2$ is concentration of active polymer in inhibitor solution
Example: Desired test concentration is 50 ppm in a 30 mL sample size (SW+FW). Using a 10,000 ppm (1%) polymer solution:

$$\mu l=[(30 \times 50)/10,000] \times 1000=150 \, \mu l$$

14. To each SW vial numbered 1-6,
    a. Add 0.3 mL of sodium acetate buffer solution.
    b. Add an equivalent amount of water in place of the average amount of scale inhibitor solution used to prepare samples.
    c. Vials 1-3 will be used to determine ppm Ba for totals.
    d. Vials 4-6 will be used to determine ppm Ba for blanks.
15. Heat solutions for a minimum of 2 hours.
16. At the end of 2 hours take one "FW" vial and #1 labeled SW out of the incubator/oven.
17. Pour the contents of the "FW" vial into the treated SW.
18. Return sample 1 to incubator/oven.
19. Set a timer to begin counting up for 2 hours. (This time period is critical.)
20. When 1 minute has passed, take one "FW" vial and #2 labeled SW out of the incubator/oven.
21. Return sample 2 to incubator/oven.
22. Repeat steps 17-19 with remaining numbered vials, keeping an interval of 1 minute between samples, until each "FW" has been added to a numbered vial.
23. Label a set of test tubes with inhibitor information or run number. These will be used for filtration step.
24. Weigh 5 g+/−0.02 g of quenching solution into each vial.

Part 4: Filtration
25. When the 2 hour period expires, take vial #1 out of the incubator/oven.
26. Filter ~5 g (record weight) into previously prepared vial containing quenching solution, ensuring that the labels on the vials match.
    a. Place open vial containing quenching solution on balance.
    b. Draw sample into a 5 mL luer-lok syringe.
    c. Fit syringe with 0.45 μm membrane syringe filter.
    d. Weigh 5 grams filtrate into vial. Record grams filtrate added (for ppm correction).
27. Repeat this process with each sample at 1 minute intervals, so that each sample has been under test conditions for exactly 2 hours.

Part 5: Ppm Determination
28. Concentration of barium should be determined by ICP. All samples should be run the day of the test.
29. Percent inhibition can be calculated by the following calculation:

$$\% \text{ inhibition}=((S*d)-B)/(T-B),$$

where
S=ppm Ba in sample
d=dilution factor (grams filtrate+5 grams quenching solution)/grams filtrate
B=ppm Ba in blank
T=ppm Ba in total
Additional Test Information:
Sample Matrix:

TABLE 8

| | ppm in samples as tested | ½ dilution |
|---|---|---|
| Na | 20037 | 10019 |
| Ca | 1619 | 809 |
| Mg | 936 | 468 |
| K | 416 | 208 |
| Ba | 126 | 63 |
| $SO_4$ | 1480 | 740 |
| Cl | 25142 | 12571 |

Materials Needed:
calcium chloride dihydrate
sodium chloride
magnesium chloride hexahydrate
potassium chloride
barium chloride dihydrate
sodium sulfate
acetic acid
sodium acetate
polymers to be evaluated
ALCOFLOW 615
Equipment Needed:
Analytical balance
Sample vials These data in Table 9 below indicate that the hybrid materials are excellent barium sulfate inhibitors and compares well in performance with a commercial synthetic polymer that is used for this purpose.

TABLE 9

| Polymer | % solids | % BaSO$_4$ inhibition | | |
|---|---|---|---|---|
| | | Polymer level 10 ppm | Polymer level 25 ppm | Polymer level 50 ppm |
| Alcoflow 300[1] | | | | 98.1 |
| Polymer of Example 19 | | 30.4 | 75.9 | 93.4 |
| Polymer of Example 20 | 33 | 76.9 | 98.7 | 96.7 |

[1] ALCOFLOW® 300 barium sulfate scale inhibition synthetic polymer available from AkzoNobel Surface Chemistry, Chattanooga, TN.

The polymers of examples 19 and 20, as identified in Table 12, were also tested for calcium carbonate inhibition using the test outlined below.

Calcium Carbonate Inhibition Test Protocol:

A liter of Hardness Solution and an Alkalinity Solution was prepared in deionized (DI) water using the ingredients and amounts listed in the Tables 10 and 11 below:

TABLE 10

| Hardness Solution | |
|---|---|
| Compound | g/L |
| MgCl$_2$ * 6H$_2$O | 25.0836 |
| CaCl$_2$ * 2H$_2$O | 36.6838 |
| LiCl | 0.6127 |

TABLE 11

| Alkalinity Solution | |
|---|---|
| Compound | g/L |
| NaHCO$_3$ | 48.9863 |
| Na$_2$CO$_3$ | 7.0659 |

A 100 ml polymer solution was prepared by adding 1% active polymer diluted with DI water.

A sample solution containing the polymer to be tested was prepared in 100 ml volumetric flasks by adding 1.2 grams Hardness Solution, desired level of polymer solution (100 microliters polymer solution=10 ppm polymer in the aqueous treatment solution), and 1.2 grams Alkalinity Solution and using DI water to make up the total solution to 100 ml. A blank solution was prepared as the sample solution above but without the polymer. A total solution was also prepared as the sample solution above but without the polymer and replacing alkalinity with DI water. The samples were placed uncapped in a shaker oven (Classic C24 Incubator Shaker model from New Brunswick Scientific Co., Inc., Edison, N.J.) at 50 C, 250 rpm for 17 hours.

The samples were removed, allowed to cool to ambient and then 1 mL of each sample was filtered through 0.2 micron filter syringes and diluted to 10 grams total with 2.5% nitric acid solution.

The sample solution, blank solution and total solutions were analyzed for calcium and lithium via ICP-OES (Optima 2000DV model from Perkin Elmer Instruments, Covina, Calif., with a low standard of 1 ppm Li, 10 ppm Ca, and a high standard of 2 ppm Li, 20 ppm Ca). After accounting for the dilution during the filtration process, the % calcium carbonate inhibition was determined by:

$$\frac{[Ca]_{Sample} - [Ca]_{Blank}}{\frac{[Li]_{Sample}}{[Li]_{Total}} * ([Ca]_{Total} - [Ca]_{Blank})} \times 100\%$$

Where $[Ca]_{Sample}$ $[Ca]_{Blank}$ $[Ca]_{Total}$ is the concentration of calcium in the sample, blank and total solution respectively and $[Li]_{Sample}$ $[Li]_{Total}$ is the concentration of Lithium in the sample and total solution respectively.

This was the procedure that was used to measure carbonate inhibition in other examples of this patent application.

TABLE 12

| Polymer | weight percent polysaccharide in polymer | Inhibitor dosage (ppm) | % CaCO$_3$ inhibition |
|---|---|---|---|
| polyacrylic acid | 0 | 1 | 30 |
| | | 3 | 96 |
| | | 5 | 88 |
| Maltodextrin DE 10 (used in the synthesis of Example 19) | 100 | 5 | 0 |
| Maltodextrin DE 18 (used in the synthesis of Example 20) | 100 | 5 | 0 |
| Polymer of Example 19 | 45 | 1 | 32 |
| | | 3 | 75 |
| | | 5 | 96 |
| Polymer of Example 20 | 50 | 1 | 22 |
| | | 3 | 87 |
| | | 5 | 96 |

These data indicate that even though the anionic hybrid copolymer compositions containing an ester monomer have 45 to 50 percent of a polysaccharide chain transfer agent, these polymers perform similar to a synthetic polymer. This is noteworthy because the polysaccharide used in these examples does not have any inhibition performance, yet the performance of the hybrid copolymer compositions does not drop even when used at very low levels (typical end use levels for calcium carbonate inhibition polymer are 10-15 ppm).

Example 22

The hybrid copolymer composition of Example 20 was tested for detectability using the procedure of Example 1 of U.S. Pat. No. 5,654,198 and following the procedure of Dubois et al. (Anal Chem. 1956, 28, 350) as shown in Table 13.

TABLE 13

| Polymer concentration ppm | Polymer of Example 20 Absorbance at 490 nm Using 5% phenol in a 1 cm cell | From Example of U.S. Pat. No. 5,654,198 Monomer A Absorbance at 490 nm Using 5% phenol in a 1 cm cell |
| --- | --- | --- |
| 1000 | 1.4160 | 1.868 |
| 100 | 0.6069 | 0.221 |
| 10 | 0.1108 | <0.05 |
| 1 | 0.0570 | <0.05 |

The data indicate that the hybrid copolymer composition of Example 20 is significantly more detectable that the Monomer A tag of Example 1 U.S. Pat. No. 5,654,198. Furthermore, monomer A is only incorporated in to the scale control polymer at about 10 weight percent. Thus the detectability of the hybrid copolymer compositions of this invention are far superior to that of US U.S. Pat. No. 5,654,198.

Example 23

The hybrid copolymer composition synthesized in Example 20 was tested for compatibility in ethylene glycol.

TABLE 14

| Polymer | Solubility of the polymer as a 1% solution in ethylene glycol | Solubility of the polymer as a 50% solution in ethylene glycol |
| --- | --- | --- |
| Example 20 | Soluble | Soluble |

These data indicate that the hybrid copolymer compositions of the invention are extremely soluble in ethylene glycol.

Example 24

The hybrid copolymer composition of Example 20 was tested for compatibility in methanol at a series of concentrations.

| Concentration of Polymer of Example 20 in the test solution (weight percent) | Result |
| --- | --- |
| 1 | Soluble |
| 20 | Soluble |
| 50 | Soluble |
| 80 | Soluble |

These data indicate that the hybrid copolymer composition of Example 20 is extremely soluble in methanol.

Example 25

An automatic zero phosphate dishwash formulation was formulated containing an ester hybrid copolymer composition (Formulation A) and an anionic hybrid copolymer containing a sulfonate monomer (Formulation B), as shown in Table 15.

TABLE 15

| | Formulation | |
| --- | --- | --- |
| | A Weight percent | B Weight percent |
| tri-Sodium citrate - 2 $H_2O$ | 10-30 | 10-30 |
| glutamic acid N,N-diacetic acid (GLDA) or methylglycine N,N-diacetic acid (MGDA) | 15-35 | 15-35 |
| Sodium carbonate | 15-25 | 15-25 |
| Sodium percarbonate | 10 | 10 |
| Sodium disilicate | 5 | 5 |
| TAED | 5 | 5 |
| Protease (e.g. Ovozyme 64T) | 3 | 3 |
| Amylase (e.g. Stainzyme 12T) | 2 | 2 |
| Polymer of Example 20 | 1-10 | 1-10 |
| Polymer of Example 14 | | 1-10 |
| Synperonic 810 | 2.5 | 2.5 |
| Synperonic 850 | 2.5 | 2.5 |
| Sodium sulfate | Rest | Rest |

Example 26

Synthesis of Ester Hybrid Copolymer Composition 34 grams of dimethylmaleate (ester monomer) is dissolved in 150 grams of water. 5.4 grams of ammonium hydroxide is added and the mixture is heated to 87 C. 170 grams of maltodextrin of DE 18 (Cargill MD™ 01918, spray-dried maltodextrin obtained by enzymatic conversion of common corn starch, available from Cargill Inc., Cedar Rapids, Iowa) is added just before the monomer and initiator feeds were started. A monomer solution containing a mixture of 132.6 grams of acrylic acid and 3.4 grams of hydroxyethyl methacrylate (ester monomer) was added to the reactor over a period of 5 hours. A first initiator solution comprising of 21 grams of erythorbic acid dissolved in 99 grams of water was added over a period of 5.5 hours. A second initiator solution comprising of 21 grams of a 70% solution of tertiary butyl hydroperoxide dissolved in 109 grams of water was added over a period of 5.5 hours. The reaction product was held at 87° C. for 60 minutes. The final product was a clear light amber solution and had 42.0% solids.

Example 27

Synthesis of Ester Hybrid Copolymer Composition 102 grams of monomethylmaleate (ester monomer) was dissolved in 150 grams of water. 5.4 grams of ammonium hydroxide was added and the mixture was heated to 87 C. 170 grams of maltodextrin of DE 18 (Cargill MD™ 01918, spray-dried maltodextrin obtained by enzymatic conversion of common corn starch, available from Cargill Inc., Cedar Rapids, Iowa) was added just before the monomer and initiator feeds were started. A monomer solution containing a mixture of 64.6 grams of acrylic acid and 3.4 grams of hydroxypropyl methacrylate was added to the reactor over a period of 5 hours. A first initiator solution comprising of 21 grams of erythorbic acid dissolved in 99 grams of water was added over a period of 5.5 hours. A second initiator solution comprising of 21 grams of a 70% solution of tertiary butyl hydroperoxide dissolved in 109 grams of water was added over a period of 5.5 hours. The reaction product was held at 87° C. for 60 minutes. The final product was a clear light amber solution and had 41.5% solids.

Example 28

Automatic Zero Phosphate Dishwash Powder Formulation

| Ingredients | wt % |
| --- | --- |
| Sodium citrate | 30 |
| Sodium carbonate | 20 |
| Polymer of Example 1 or 13 | 1 to 10 |
| Sodium disilicate | 10 |
| Perborate monohydrate | 6 |
| Tetraacetylethylenediamine | 2 |
| Enzymes | 2 |
| Sodium sulfate | 10 |

Example 29

Anti-Redeposition

The anionic hybrid copolymers of this invention were tested for anti-redeposition properties in a generic powdered detergent formulation. The powdered detergent formulation was as follows:

| Ingredient | wt % |
| --- | --- |
| Neodol 25-7 | 10 |
| Sodium carbonate | 46 |
| Sodium silicate | 3 |
| Sodium sulfate | 40 |

The test was conducted in a full scale washing machine using 3 cotton and 3 polyester/cotton swatches. The soil used was 17.5 g rose clay, 17.5 g spinks blend clay and 6.9 g oil blend (75:25 vegetable/mineral). The test was conducted for 3 cycles using 100 g powder detergent per wash load. The polymers were dosed in at 1.0 weight % of the detergent. The wash conditions used a temperature of 33.9° C. (93° F.), 150 ppm hardness and a 10 minute wash cycle.

L (luminance) a (color component) b (color component) values before the first cycle and after the third cycle was measured as $L_1$, $a_1$, $b_1$ and $L_2$, $a_2$, $b_2$, respectively, using a spectrophotometer. ΔE (color difference) values were then calculated using the equation below—

$$\Delta E = [(L_1-L_2)^2 + (a_1-a_2)^2 + (b_1-b_2)^2]^{0.5}$$

The data shown in Table 16 indicate that the anionic hybrid polymers of this invention show anti-redeposition/soil suspension properties even at low concentrations in the wash liquor (a lower ΔE indicates better anti-redeposition properties).

TABLE 16

Effect on anti-redeposition/soil suspension

| Sample | ΔE | |
| --- | --- | --- |
| | Cotton | Poly/cotton |
| Control (no polymer) | 6.81 | 4.44 |
| Polymer of Example 6 | 2.27 | 2.07 |
| Polymer of Example 7 | 2.74 | 2.41 |

Example 30

Synthesis of Non-Ionic Hybrid Copolymer Composition with Polysaccharide Chain Transfer Agent 50 grams of maltodextrin as a polysaccharide chain transfer agent (STAR-DRI 180 DE 18 spray-dried maltodextrin available from Tate and Lyle, Decatur, Ill.) was dissolved in 150 grams of water in a reactor and heated to 75° C. A monomer solution containing 50 grams of hydroxyethylacrylate was subsequently added to the reactor over a period of 50 minutes. An initiator solution comprising of 2 grams of V-50 [2,2'-Azobis(2 amidino-propane)dihydrochloride azo initiator from Wako Pure Chemical Industries, Ltd., Richmond, Va.] in 30 grams of water was added to the reactor at the same time as the monomer solution over a period of 60 minutes. The reaction product was held at 75° C. for an additional 60 minutes. The final product was a clear almost water white solution.

Example 31

Synthesis of Non-Anionic Hybrid Copolymer Composition 150 grams of maltodextrin as a polysaccharide chain transfer agent (Cargill MD™ 01918 dextrin, spray-dried maltodextrin obtained by enzymatic conversion of common corn starch, available from Cargill Inc., Cedar Rapids, Iowa) was initially dissolved in 200 grams of water in a reactor and 70 g of HCl (37%) was added and heated to 98° C. A monomer solution containing 109 grams of dimethyl aminoethyl methacrylate dissolved in 160 grams of water was subsequently added to the reactor over a period of 90 minutes. An initiator solution comprising of 6.6 grams of sodium persulfate in 40 grams of water was added to the reactor at the same time as the monomer solution over a period of 90 minutes. The reaction product was held at 98° C. for an additional 60 minutes. The reaction product was then neutralized by adding 14 grams of a 50% solution of NaOH and the final product was an amber colored solution.

Example 32

Synthesis of Non-Anionic Hybrid Copolymer Composition 35 grams of Amioca Starch was dispersed in 88 grams of water in a reactor and heated to 52. The starch was depolymerized by addition of 1.07 grams of concentrated sulfuric acid (98%). The suspension was held at 52° C. for 1.5 hours. The reaction was then neutralized with 1.84 grams of 50% NaOH solution and the temperature was raised to 90° C. for 15 minutes. The starch gelatinizes and the viscosity increased during the process and a gel is formed. The viscosity dropped after the gelatinization was completed. The temperature was lowered to 72 to 75° C. A solution of 80.7 grams of dimethyl diallyl ammonium chloride (62% in water) was added to the reactor over a period of 30 minutes. An initiator solution comprising of 0.2 grams of sodium persulfate in 20 grams of water was added to the reactor at the same time as the monomer solution over a period of 35 minutes. The reaction product was held at 98° C. for an additional 2 hours. The final product was a slightly opaque yellow colored solution.

Example 33

Synthesis of Non-Anionic Hybrid Copolymer Composition 35 grams of Amioca Starch was dispersed in 88 grams of water in a reactor and heated to 52. The starch was depolymerized by addition of 0.52 grams of concentrated sulfuric acid (98%). This is half the acid used in Example 32 and causes less depolymerization of the starch resulting in a higher molecular weight. Thus the molecular weight of the polysaccharide chain transfer agent can be controlled. The suspension was held at 52° C. for 1.5 hours. The reaction was then neutralized with 0.92 grams of 50% NaOH solution and the temperature was raised to 90° C. for 15 minutes. The starch gelatinizes and the viscosity increased during the process and a gel was formed. The viscosity dropped after the gelatinization was completed. The reaction was diluted with 30 grams of water and the temperature was lowered to 72 to 75° C. A solution of 80.7 grams of dimethyl diallyl ammonium chloride (62% in water) was added to the reactor over a period of 30 minutes. An initiator solution comprising of 0.2 grams of sodium persulfate in 20 grams of water was added to the reactor at the same time as the monomer solution over a period of 35 minutes. The reaction product was held at 98° C. for an additional 2 hours. The final product was a clear light yellow colored solution.

Example 34

Synthesis of Non-Ionic Hybrid Copolymer Composition with Polysaccharide (Inulin) Chain Transfer Agent 50 grams of a polysaccharide chain transfer agent (DEQUEST® PB11620 carboxymethyl inulin 20% solution available from Thermphos) was dissolved in 150 grams of water in a reactor and heated to 75° C. A monomer solution containing 50 grams of N,N dimethyl acrylamide was subsequently added to the reactor over a period of 50 minutes. An initiator solution comprising of 2 grams of V-50 [2,2'-azobis (2-amidinopropane)dihydrochloride] azo initiator from Wako Pure Chemical Industries, Ltd., Richmond, Va.] in 30 grams of water was added to the reactor at the same time as the monomer solution over a period of 60 minutes. The reaction product was held at 75° C. for an additional 60 minutes. The reaction product was diluted with 140 grams of water and the final product was a clear homogenous amber colored solution.

Example 35

Synthesis of Non-Anionic Hybrid Copolymer Composition with Polysaccharide (Cellulosic) Chain Transfer Agent Carboxymethyl cellulose (AQUALON® CMC 9M3ICT available from Hercules, Inc., Wilmington, Del.) was depolymerized in the following manner. Thirty grams of AQUALON® CMC was introduced in to 270 g of deionized water with stirring. 0.03 g of Ferrous ammonium sulfate hexahydrate and 2 g of hydrogen peroxide ($H_2O_2$) solution (35% active) was added. The mixture was heated to 60° C. and held at that temperature for 30 minutes. This depolymerized CMC solution was then heated to 90° C.

A monomer solution containing 50 grams of acrylamide (50% solution) is subsequently added to the reactor over a period of 50 minutes. An initiator solution comprising of 2 grams of V-086 2,2'-Azobis[2-methyl-N-(2-hydroxyethyl) propionamide] azo initiator from Wako Pure Chemical Industries, Ltd., Richmond, Va.] in 30 grams of water is added to the reactor at the same time as the monomer solution over a period of 60 minutes. The reaction product is held at 90° C. for an additional 60 minutes.

Example 36

Typical dilute fabric softener formulations using non-anionic hybrid copolymers are listed below.

TABLE 17

| Formulations of Dilute Traditional Softeners | |
|---|---|
| Ingredient | (%) |
| Formula A | |
| distearyldimethylammonium Chloride (75% active) | 6-9 |
| Polymer of Example 32 | 0.1-3.0 |
| Perfume | 0.2-0.5 |
| Colorant | 0.001 |
| Water | Balance |
| Formula B | |
| Quaternary dialkylimidazolines (75% active) | 6-9 |
| Polymer of Example 32 | 0.1-3.0 |
| Perfume | 0.2-0.5 |
| Colorant | 0.001 |
| Preservative | + |

Example 37

Concentrated fabric softener compositions with non-anionic hybrid copolymer compositions are exemplified in Table 18.

TABLE 18

| Ready-to-Use Rinse Conditioners at Triple Concentration Formula C | |
|---|---|
| Ingredient | (%) |
| distearyldimethylammonium chloride 75% | 14 |
| Polymer of Example 33 | 3-10 |
| Lanolin | 2 |
| Ethoxylated fatty acid | 4 |
| $CaCl_2$ | 0.05 |
| Water, perfume, color | Balance |

Example 38

Synthesis of a Non-Anionic Hybrid Copolymer Composition Containing a Quaternary Amine Monomer and a Cationic Polysaccharide Functionality 40 grams of Nsight C-1 as a cationic starch chain transfer agent (available from AkzoNobel, Bridgewater N.J.) was initially dissolved in 100 grams of water in a reactor and heated to 98° C. A solution of 38.7 grams of dimethyl diallyl ammonium chloride (62% in water) was subsequently added to the reactor over a period of 45 minutes. An initiator solution comprising of 3.3 grams of sodium persulfate in 20 grams of water was added to the reactor at the same time as the monomer solution over a period of 45 minutes. The reaction product was held at 98° C. for an additional 60 minutes. The final product was a clear amber colored solution.

Example 39

The performance of the non-anionic hybrid copolymer composition of Example 38 as an emulsion breaker is tested using the protocol detailed in Example 1 of U.S. Pat. No. 5,248,449. The synthetic oil in water emulsion is Emulsion No 3 of this example which is 75% 10W-40 Motor Oil Castrol GTX and 25% Petroleum Sulfate (Petrosul 60). The concentration of polymer of Example 37 needed to break this emulsion was around 100 to 200 ppm.

Example 40

The performance of the non-anionic hybrid copolymer composition of Example 38 was tested as a flocculant. 12.5 grams of waste water with suspended particulates (bituminous tailings from an oil field in Canada) was diluted with 12.5 grams of water. 2 grams of the polymer solution of Example 38 was then added and shaken well. The suspended particulates flocced out and a clear water layer was obtained.

Example 41

Non-anionic hybrid copolymer compositions of Examples 32 and 33 are exemplified in the fabric softener compositions listed in Table 19.

TABLE 19

| Fabric Softener composition | | | |
|---|---|---|---|
| Ingredient (Wt %) | Formula A | Formula B | Formula C |
| N,N-di(tallowoyloxyethyl)-N,N-dimethylammonium chloride. | 10 | 14 | |
| Methyl bis(tallow amidoethyl)2-hydroxyethyl ammonium methyl sulfate. | | | 2-5 |
| Ethanol | 2 | 2.5 | |
| Isopropanol | | | 0.5 |
| Non-anionic hybrid copolymer composition of Example 32 | 1-10 | | |

TABLE 19-continued

| Fabric Softener composition | | | |
|---|---|---|---|
| Ingredient (Wt %) | Formula A | Formula B | Formula C |
| Non-anionic hybrid copolymer composition of Example 33 | | 1-10 | 1.5 |
| Electrolyte (calcium chloride) | 0.1-0.5 | 0.1-0.5 | 0.1-0.5 |
| Perfume | 0.1-1.5 | 0.1-1.5 | 0.1-1.5 |
| Dye, Preservative, Phase Stabilizing Polymer, anti-foam agent, water | Rest | Rest | Rest |

Example 42

Synthesis of Non-Anionic Hybrid Copolymer Composition 35 grams of Hylon VII Starch (a high amylose starch containing 70% amylose) was dispersed in 132 grams of water in a reactor and heated to 52° C. The starch was depolymerized by addition of 1.07 grams of concentrated sulfuric acid (98%). The suspension was held at 52° C. for 1.5 hours. The reaction was then neutralized with 1.84 grams of 50% NaOH solution and the temperature was raised to 90° C. for 15 minutes. The starch gelatinizes and the viscosity increased during the process and a gel was formed. The viscosity dropped after the gelatinization was completed. The reaction was diluted with 30 grams of water and the temperature was lowered to 72 to 75° C. A solution of 100.1 grams of [3-(methacryloylamino)propyl]-trimethylammonium chloride (50% in water) was added to the reactor over a period of 30 minutes. An initiator solution comprising of 0.2 grams of sodium persulfate in 20 grams of water was added to the reactor at the same time as the monomer solution over a period of 35 minutes. The reaction product was held at 98° C. for an additional 2 hours. The final product was an opaque white homogenous solution.

Example 43

Synthesis of Non-Anionic Hybrid Copolymer Composition 35 grams of Amioca Starch was dispersed in 88 grams of water in a reactor and heated to 52. The starch was depolymerized by addition of 0.52 grams of concentrated sulfuric acid (98%). This is half the acid used in Example 41 and causes less depolymerization of the starch resulting in a higher molecular weight. Thus the molecular weight of the polysaccharide chain transfer agent can be controlled. The suspension was held at 52° C. for 1.5 hours. The reaction was then neutralized with 0.92 grams of 50% NaOH solution and the temperature was raised to 90° C. for 15 minutes. The starch gelatinizes and the viscosity increased during the process and a gel was formed. The viscosity dropped after the gelatinization was completed. The reaction was diluted with 30 grams of water and the temperature was lowered to 72 to 75° C. A solution of 66.71 g [2-(methacryloxy)ethyl]-trimethylammonium chloride (75% in water) was added to the reactor over a period of 30 minutes. An initiator solution comprising of 0.2 grams of sodium persulfate in 20 grams of water was added to the reactor at the same time as the monomer solution over a period of 35 minutes. The reaction product was held at 98° C. for an additional 2 hours. The final product was a homogeneous opaque white paste.

Example 44

Clear Conditioning Shampoo Formula

A clear conditioning shampoo formula was prepared using the following ingredients:

| Ingredients | INCI Designation | % W/W | Supplier |
|---|---|---|---|
| Polymer of Example 32 | Not applicable | 0.6 | |
| Hydroxyethylurea | Not applicable | 3.00 | National Starch |
| Ammonium Lactate | Ammonium Lactate | 0.06 | |
| DeIonized Water | Water (Aqua) | 18.18 | |
| Standapol ES-2 | Sodium Lauryl Sulfate | 33.33 | Cognis Corp. |
| Standapol ES-3 | Sodium Laureth Sulfate | 30.00 | Cognis Corp. |
| Dehyton K | Cocamidopropyl Betaine | 10.00 | Cognis Corp. |
| Promodium CO | Polypropoxyethoxy-cocamide | 3.18 | Uniqema |
| Germaben II | Diazolidinyl Urea, Propylene Glycol, Methylparaben, Propylparaben | 1.00 | Sutton Laboratories |
| Sodium Chloride | Sodium Chloride | 1.00 | J. T. Baker |
| Citric Acid | Citric Acid | q.s. | |
| | | 100.00 | |

Procedure

The ingredients are combined in the order listed above. The formulation is mixed until homogeneous after each addition.

Example 45

6% VOC Root Lifting Aerosol Mousse Formula

An exemplary 6% VOC Root lifting aerosol mousse formula was prepared using the following ingredients:

| Ingredient | INCI Designation | % W/W | Supplier |
|---|---|---|---|
| Part A | | | |
| AMAZE | Corn Starch Modified | 2.20 | National Starch |
| Polymer of Example 31 | Not applicable | 0.6 | |
| Carbopol Ultrez 10 | Acrylates/C10-30 Alkyl Acrylate Crosspolymer (copolymer) | 0.05 | Noveon |
| Natrosol HHR | Hydroxyethylcellulose | 0.15 | Aqualon |
| Deionized Water | Water (Aqua) | 70.32 | |
| TEA | Triethanolamine 99% | 0.05 | |
| Part B | | | |
| DC-193 | PEG-12 Dimethicone | 0.07 | Dow Corning |
| Versene 100 | Tetrasodium EDTA | 0.10 | Dow Chemical |
| Crovol Pk-70 | PEG-45 Palm Kernal Glycerides | 0.10 | Croda, Inc |
| Cropetide W | Hydrolyzed Wheat Protein (and) Hydrolyzed Wheat Starch | 0.20 | Croda. Inc. |
| Procetyl AWS | PPG-5 Ceteth-20 | 0.10 | Croda, Inc |
| dl-Panthenol | Panthenol | 0.10 | Ritapan |
| Rewoteric AM B-14 | Cocomidapropyl Betaine | 0.05 | Goldschmidt |
| Tween 20 | Polysorbate 20 | 0.20 | Uniqema |
| Uvinul MS-40 | Benzephenone - 4 | 0.001 | BASF |
| Hydroxyethylurea | Hydroxyethyl Urea | 3.00 | National Starch |
| AmmoniumLactate | Ammonium Lactate | 0.06 | National Starch |
| Germaben II | Propylene Glycol (and) Diazolidinyl Urea (and) Methylparaben (and) Propylparaben | 1.00 | Sutton Labs |
| Part C | | | |
| DME | Dimethyl Ether | 6.00 | |
| Dymel 152A | Hydrofluorocarbon 152A | 16.00 | Dupont |
| | | 100.00 | |

Procedure

The Carbopol is slowly sifted into the mixing vortex until completely dispersed. While maintaining good agitation, the NATROSOL® HHR is then slowly sifted in. Once dispersed, both the AMAZE™ and the Polymer of Example 31 is sifted in. When the solution is complete, the TEA is added. The ingredients in Part B are then added and mixed until homogeneous. Filter and fill aerosol containers. For Part C, charge with propellant.

Example 46

Combing Cream for Dry/Damaged Hair Formula

An exemplary 6% VOC Root lifting aerosol mousse formula was prepared using the following ingredients:

| Ingredient | INCI Designation | % W/W | Supplier |
|---|---|---|---|
| Phase A | | | |
| Cetearyl Alcohol | 30/70 Cetearyl Alcohol | 1.80 | |
| Hostacerin CS200 | Ceteareth-20 | 0.20 | Clariant |
| Genamin KDMP | Behentrimonium Chloride | 0.44 | Clariant |
| DC 949 | Amodimethicone (and) Trideceth-12(and) Cetrimonium Chloride | 0.50 | Dow Corning |
| Phase B | | | |
| DI Water | Water (Aqua) | 88.94 | |
| STRUCTURE ZEA | Hydroxypropyl Starch Phosphate | 4.00 | National Starch |
| Polymer of Ex 33 | Not applicable | 1.0 | |
| Phase C | | | |
| Genamin CTAC 50 | Cetrimonium Chloride | 0.30 | Clariant |
| Phase D | | | |
| Glydant | DMDM Hydantoin | 0.20 | Lonza |
| Phenonip | Phenoxyethanol (and) Methylparaben (and) Ethylparaben (and) Butylparaben (and) Propylparaben (and) Isobutylparaben | 0.15 | Nipa/Clariant |
| Hydroxyethylurea | Hydroxyethylurea | 3.00 | National Starch |
| Ammonium Lactate | Ammonium Lactate | 0.06 | |
| Phase E | | | |
| Citric acid (10%) | Citric Acid | q.s. pH 4.0-5.0 | |
| | | 100.00 | |

Procedure

Dissolve STRUCTURE ZEA into the water at room temperature. Add the Polymer of Example 33 and heat to 80° C. while mixing (Phase B). In a separate vessel, combine Phase A and heat to 80° C. Add Phase B to Phase A with agitation. Add Phase C while maintaining temperature (80° C.). Continue mixing and cool to 45° C. Add Phase D and adjust pH, if necessary.

Example 47

Conditioning Styling Gel Formula

An exemplary conditioning styling gel formula was prepared using the following ingredients:

| Ingredient | INCI Designation | % W/W | Supplier |
|---|---|---|---|
| Part A | | | |
| Deionized Water | Water (Aqua) | 50.00 | |
| AMAZE XT | Dehydroxanthan Gum | 1.00 | National Starch |
| Part B | | | |
| Deionized Water | Water (Aqua) | 41.74 | |
| Polymer of Ex 38 | Not applicable | 0.3 | |

| Ingredient | INCI Designation | % W/W | Supplier |
|---|---|---|---|
| Part C | | | |
| Propylene Glycol | Propylene Glycol | 2.00 | |
| DL-Panthenol | Panthenol | 0.50 | Roche |
| Na2EDTA | Disodium EDTA | 0.05 | |
| Hydroxyethylurea | Hydroxyethylurea | 3.00 | |
| Ammonium Lactate | Ammonium Lactate | 0.06 | |
| Cropeptide W | Hydrolyzed Wheat Protein and Hydrolyzed Wheat Starch | 1.00 | Croda |
| DC 193 | PEG-12 Dimethicone | 0.20 | Dow Corning |
| Glydant Plus Granular | DMDM Hydantoin and Iodopropynyl Butylcarbamate | 0.30 | |
| | | 100.00 | Lonza |

Procedure

Dust AMAZE XT into the water in Part A and mix until completely hydrated. Separately, combine the ingredients of Part B and mix until dissolved. Add Part B to Part A with agitation. Add remaining ingredients and mix until uniform.

Example 48

Leave-in Conditioner Formula

An exemplary leave-in conditioner formula was prepared using the following ingredients:

| Ingredients | INCI Designation | % W/W | Supplier |
|---|---|---|---|
| Phase A | | | |
| Polymer of Ex 42 | Not applicable | 1.2 | |
| Deionized Water | Water (Aqua) | 48.00 | |
| dl-Panthenol | Panthenol | 0.50 | Tri-K Industries |
| Phase B | | | |
| Deionized Water | Water (Aqua) | 44.79 | |
| TEA | Triethanolamine | 0.20 | |
| Neo Heliopan, Phenyl Type Hydro | Benzimidazole Sulfonic Acid | 0.20 | Haarmann & Reimer |
| DC 929 Cationic Emulsion | Amodimethicone (and) Tallowtrimonium Chloride (and) Nonoxynol-10 | 0.75 | Dow Corning |
| Phase C | | | |
| Solu-Silk Protein | Hydrolyzed Silk | 1.00 | Brooks Industries |
| Versene 100 | Tetra Sodium EDTA | 0.20 | Dow Chemical |
| Glydant | DMDM Hydantoin | 1.00 | Lonza |
| Hydroxyethylurea | Hydroxyethylurea | 3.00 | |
| Ammonium Lactate | Ammonium Lactate | 0.06 | |
| Fragrance | Fragrance (Perfume) | q.s. | |
| | | 100.00 | |

Preparation

Prepare Phase A by dissolving the Polymer of Example 42 in water using good agitation. Mix until solution is clear and homogenous. Add dl-Panthenol and allow to completely dissolve. Prepare Phase B by adding TEA to water and mix well. Add Neo Heliopan and mix until clear. Follow with DC 929 cationic emulsion. Combine parts by adding Phase B to Phase A. Mix well and continue to mix for approximately 15 minutes. Add Solu-silk and mix well. Add Versene 100, Glydant, hydroxyethylurea, ammonium lactate, and fragrance, mixing well after each addition.

Example 49

Clear Conditioner with Suspended Beads

An exemplary clear conditioner with suspended beads was prepared using the following ingredients:

| Ingredients | INCI Designation | % W/W | Supplier |
|---|---|---|---|
| Phase A | | | |
| Deionized Water | Water (Aqua) | 78.74 | |
| Polymer of Ex 43 | Not applicable | 1.0 | |
| Glydant | DMDM Hydantoin | 0.50 | Lonza |
| Propylene Glycol | Propylene Glycol | 2.00 | |
| Arquad 16-25W | Cetrimonium Chloride | 2.00 | Akzo-Nobel |
| STRUCTURE PLUS | Acrylates/Aminoacrylates/C10-30 Alkyl PEG-20 Itaconate Copolymer | 10.00 | National Starch |
| Hydroxyethylurea | Hydroxyethylurea | 3.00 | |
| Ammonium Lactate | Ammonium Lactate | 0.06 | |
| Versene 100 | Tetrasodium EDTA | 0.05 | Dow Chemical |
| Phase B | | | |
| Silsoft A-858 | Dimethicone Copolyol Bishydroxyethylamine | 2.00 | CK Witco OSI |
| Neo Heliopan AV | Ethylhexyl Methoxycinnamate | 0.05 | Haarman & Reimer |
| Phase C | | | |
| Glycolic Acid (70%) | Glycolic Acid | 0.45 | |
| Phase D | | | |
| Florabeads | Jojoba Esters | 0.80 | Floratech |
| | | 100.00 | |

Procedure

Polyquaternium-4 is dissolved in water with mixing. The remaining ingredients of Phase A are sequentially added with continued mixing. Phase B is combined and then added to Phase A. Continue to mix while slowly adding glycolic acid to Phase AB, taking care to avoid entrapped air. Finally, add beads slowly while mixing.

Example 50

55% VOC Firm Hold, Crystal Clear Pump Hairspray Formula

An exemplary 55% VOC firm hold, crystal clear pump hairspray formula was prepared using the following ingredients:

| Ingredients | INCI Designation | % W/W | Supplier |
|---|---|---|---|
| Polymer of Ex 24 | Not applicable | 12.00 | |
| AMP (reg) | Aminomethyl Propanol | 0.85 | Dow Chemical |
| Deionized Water | Water (Aqua) | 29.09 | |
| Hydroxyethylurea | Hydroxyethylurea | 3.00 | |
| Ammonium Lactate | Ammonium Lactate | 0.06 | |
| *SD Alcohol 40 | SD Alcohol 40 | 55.00 | |
| | | 100.00 | |

Preparation

Dissolve AMP in SD Alcohol 40 and water. While maintaining proper agitation, slowly pour in BALANCE 0/55. Add remaining ingredients and mix until homogenous.

Example 51

Sunscreen Formulas

Exemplary sunscreen formulas were prepared using the following ingredients:

| Ingredient | Function | Formula A | Formula B | Formula C |
|---|---|---|---|---|
| PHASE A | | | | |
| Isohexadecane | Emollient | 1.5 | 1.5 | 1.5 |
| C12-C15 alkyl benzoate | Emollient | 3.0 | 3.0 | 3.0 |
| Cyclopentasiloxane | Emollient | 2.25 | 2.25 | 2.25 |
| Sorbitan Stearate | Emulsifier | 1.0 | 1.0 | 1.0 |
| Glyceryl Stearate (and) PEG-100 Stearate | Emulsifier | 2.0 | 2.0 | 2.0 |
| Caprylic/Capric Triglyceride | Solubilizer | 0.0 | 6.25 | 6.25 |
| Isopropyl Myristate | Solubilizer | 0.0 | 6.25 | 6.25 |
| Octocrylene | UVB filter (org) | 2.0 | 0.0 | 0.0 |
| Ethylhexyl Methoxycinnamate | UVB filter (org) | 7.5 | 0.0 | 0.0 |
| Benzophenone-3 | UVB filter (org) | 3.0 | 0.0 | 0.0 |
| ZnO (and) C12-C15 Alkyl Benzoate (and) Poly-hydroxystearic Acid | UVA/B filter (inorg) | 0.0 | 6.0 | 6.0 |
| PHASE B | | | | |
| Water | | 67.25 | 54.25 | 58.65 |
| Dehydroxanthan Gum | Suspension agent, Rheology modifier | 0.5 | 0.5 | 0.0 |
| Xanthan Gum | Rheology modifier | 0.0 | 0.0 | 0.5 |
| Polymer of Example 20 | Film former | 4.4 | 4.4 | 4.4 |
| Glycerin | Humectant | 3.0 | 3.0 | 3.0 |
| $TiO_2$ and Alumina and Silica and Sodium Polyacrylate | UVB filter (inorg) | 0.0 | 7.0 | 7.0 |
| PHASE C | | | | |
| Corn Starch Modified | Aesthetic enhancer | 2.0 | 2.0 | 2.0 |
| DMDM Hydantoin and Iodopropynyl Butylcarbamate | Preservative | 0.6 | 0.6 | 0.6 |
| Citric Acid (50%) | Neutralizer | qs to pH 7 | qs to pH 7 | qs to pH 7 |
| TOTAL | | 100 | 100 | 100 |

Example 52

Synthesis of Non-Ionic Hybrid Copolymer Composition with Polysaccharide Chain Transfer Agent Hydroxyethyl cellulose (QP 300 available from Dow) was depolymerized in the following manner. Thirty grams of QP 300 was introduced in to 270 g of deionized water with stirring. 0.05 g of Ferrous ammonium sulfate hexahydrate and 1 g of hydrogen peroxide ($H_2O_2$) solution (35% active) was added. The mixture was heated to 60° C. and held at that temperature for 30 minutes. This depolymerized CMC solution was then heated to 90° C.

A solution of 38.7 grams of dimethyl diallyl ammonium chloride (62% in water) is subsequently added to the reactor over a period of 50 minutes. An initiator solution comprising of 2 grams of V-086 2,2'-Azobis[2-methyl-N-(2-hydroxyethyl) propionamide] azo initiator from Wako Pure Chemical Industries, Ltd., Richmond, Va.] in 30 grams of water is added to the reactor at the same time as the monomer solution over a period of 60 minutes. The reaction product is held at 90° C. for an additional 60 minutes.

Example 53

Synthesis of Anionic Hybrid Copolymer Composition Containing 99% Polysaccharide Chain Transfer Agent A reactor containing 198.0 grams of maltodextrin as a polysaccharide chain transfer agent (Star Dri 180, DE 18 spray-dried maltodextrin available from Tate & Lyle, Decatur, Ill.) dissolved in 200.0 grams of water was heated to 95° C. A monomer solution containing 2.0 grams of acrylic acid (0.028 moles) and 70.0 grams of water was added to the reactor over a period of 1 hour. An initiator solution containing 0.10 grams of sodium persulfate and 30.0 grams of water was added simultaneously over a period of 1 hour and 10 minutes. The reaction product was held at 95° C. for an additional 1 hour. The polymer was then neutralized by adding 1.0 grams of a 50% sodium hydroxide solution. The final product was a clear, light amber colored solution.

Example 54

Synthesis of Anionic Hybrid Copolymer Composition

A reactor containing 199.0 grams of maltodextrin as a polysaccharide chain transfer agent (Star Dri 180, DE 18 spray-dried maltodextrin available from Tate & Lyle, Decatur, Ill.) dissolved in 200.0 grams of water was heated to 95° C. A monomer solution containing 1.0 grams of acrylic acid (0.014 moles) and 60.0 grams of water was added to the reactor over a period of 1 hour. An initiator solution containing 0.05 grams of sodium persulfate and 30.0 grams of water was added simultaneously over a period of 1 hour and 10 minutes. The reaction product was held at 95° C. for an additional 1 hour. The polymer was then neutralized by adding 0.5 grams of a 50% sodium hydroxide solution. The final product was a clear, light amber colored solution.

Example 55

A reactor containing 75.0 grams of water and 27.8 grams of a 50% sodium hydroxide solution was heated to 100° C. A solution containing 50.0 grams of acrylic acid, 25.0 grams maltodextrin as a polysaccharide transfer agent (Star Dri 100, DE 10 spray-dried maltodextrin available from Tate & Lyle, Decatur, Ill.) and 60.0 grams of water was added to the reactor over a period of 45 minutes. An initiator solution containing 3.3 grams of sodium persulfate and 28.0 grams of water was added simultaneously over a period of 1 hour. The reaction product was held at 100° C. for an additional 1 hour. The solution was a clear amber color with no crosslinking. This illustrates that crosslinking can be eliminated by reducing the reactivity of the monomer. In this case the monomer activity was reduced by the addition of the 50% NaOH.

Example 56

A reactor containing 75.0 grams of water and 18.6 grams of a 50% sodium hydroxide solution was heated to 100° C. A solution containing 33.5 grams of acrylic acid, 41.5 grams maltodextrin as a polysaccharide transfer agent (Star Dri 100, DE 10 spray-dried maltodextrin available from Tate & Lyle, Decatur, Ill.) and 60.0 grams of water was added to the reactor over a period of 45 minutes. An initiator solution containing 3.3 grams of sodium persulfate and 28.0 grams of water was added simultaneously over a period of 1 hour. The reaction product was held at 100° C. for an additional 1 hour. The solution was a clear amber color with no crosslinking. This illustrates that crosslinking can be eliminated by reducing the reactivity of the monomer. In this case the monomer activity was reduced by the addition of the 50% NaOH.

Example 57

A series of dispersancy tests to prove that hybrid polymers containing greater than 75 weight percent chain transfer agent have unexpected performance benefits. Maltodextrin was used as a chain transfer agent. A series of polymers were synthesized containing 33%, 55%, 80%, 85%, 90%, 95%, and 99% and 99.5% maltodextrin and the process to make these samples are described in Examples 55, 56, 1, 3, 5, 2, 53 and 54 respectively.

The dispersancy test was performed as follows: The samples were prepared by adding 2% clay (50:50 rose clay: spinks black clay) to deionized water. The samples were then stirred on a magnetic stir plate for 20 minutes, after which 0.1% active dispersant was added and the samples were stirred for one minute more. The suspensions were then poured into 100 ml graduated cylinders and allowed to rest. The amount of clear supernatant liquid on the top of the cylinders was measured after 1 hour and after 24 hours. The lower the amount of the clear supernatant liquid the better the dispersancy performance.

Figure 2:
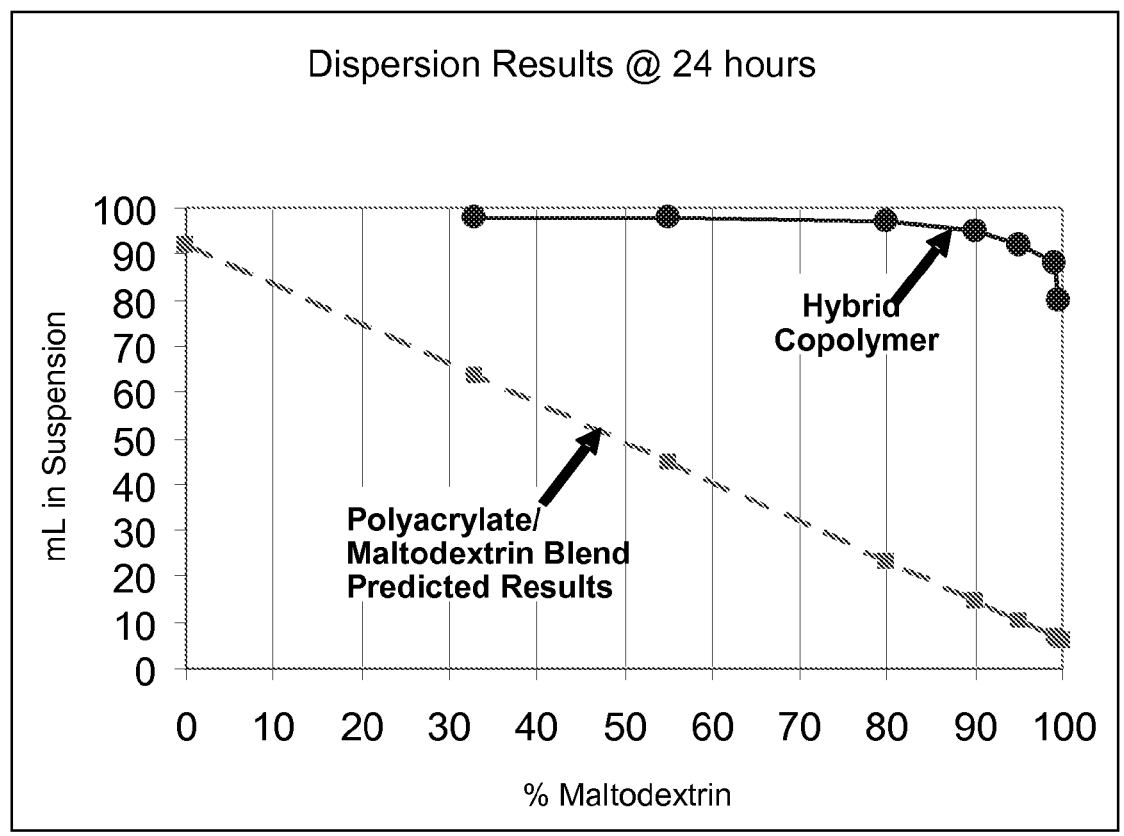
FIG. 2 is a graph depicting the results of dispersion tests conducted for 24 hours comparing a typical polyacrylate/maltodextrin blend with a hybrid copolymer containing greater than 75 weight percent maltodextrin as a chain transfer agent according to an embodiment of the invention.
Figure 3:
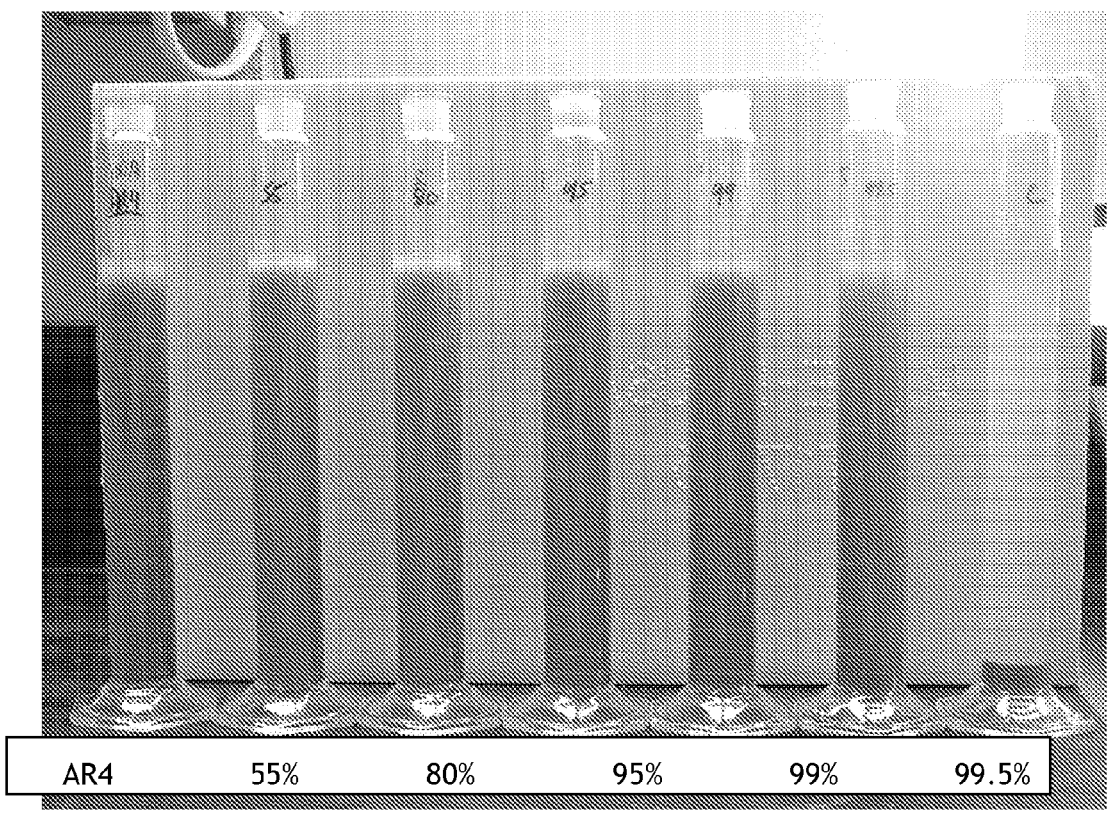
FIG. 3 is an illustration the results after a 1 hour dispersancy test between samples of polyacrylate having 0% maltodextrin, samples of a hybrid copolymer having at least one anionic ethylenically unsaturated monomer shown with various amounts of maltodextrin present, and a sample having 100% maltodextrin, after a 1 hour dispersancy test.
Figure 4:
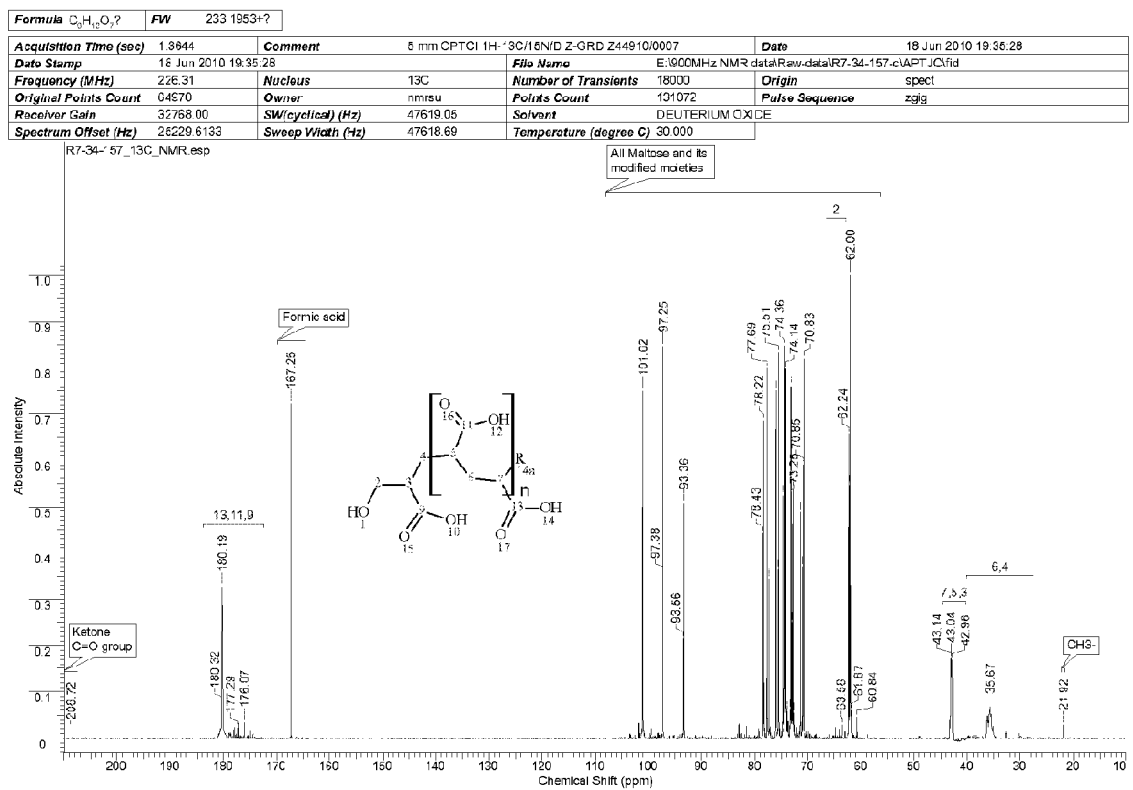
FIG. 4 is an NMR spectra of the graft copolymer of Example 68
Figure 5:
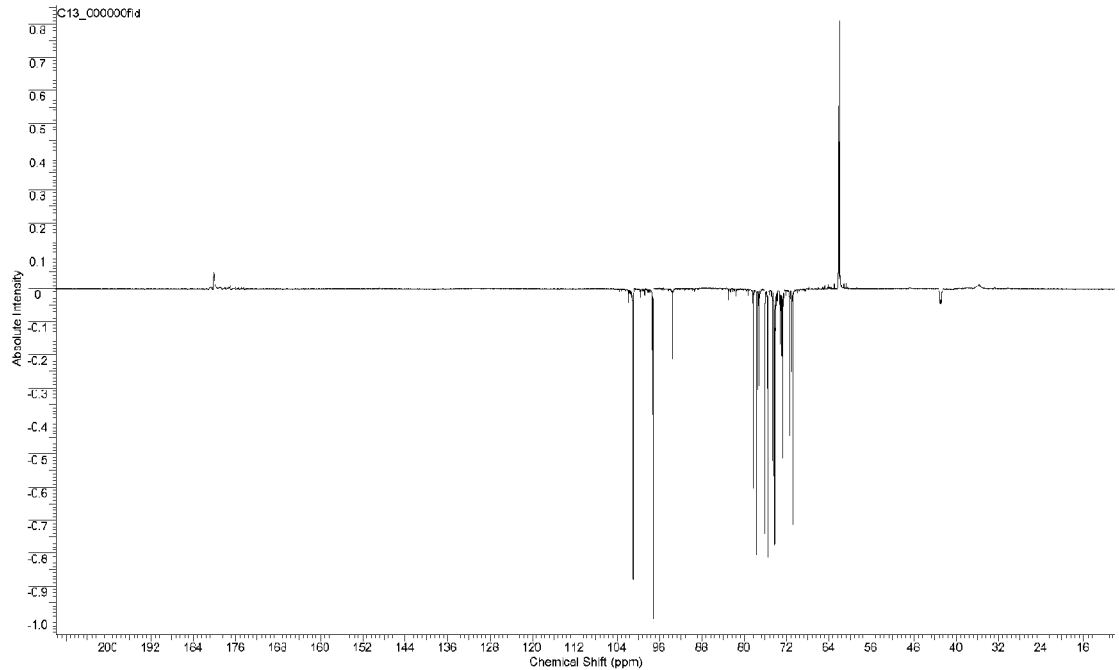
FIG. 5 is an NMR Apt spectra of the graft copolymer of Example 68
Figure 6:
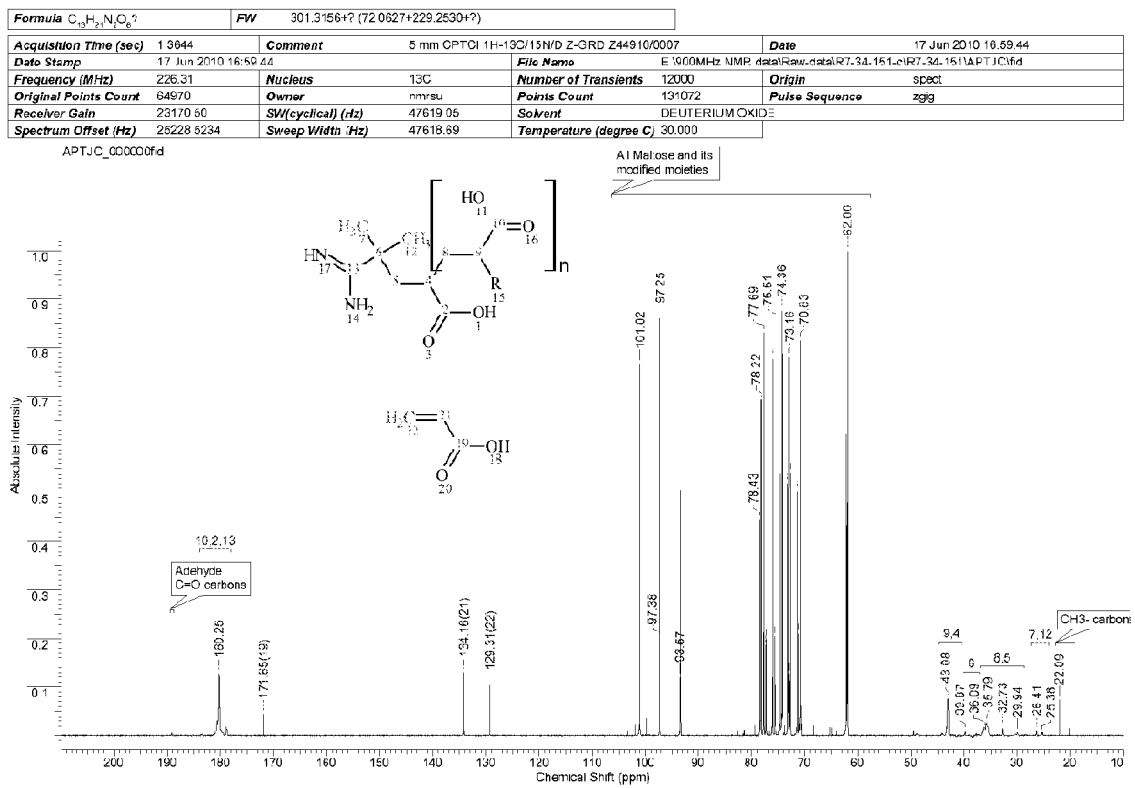
FIG. 6 is an NMR spectra of the Hybrid copolymer composition (using azo initiator) of Example 69.
Figure 7:
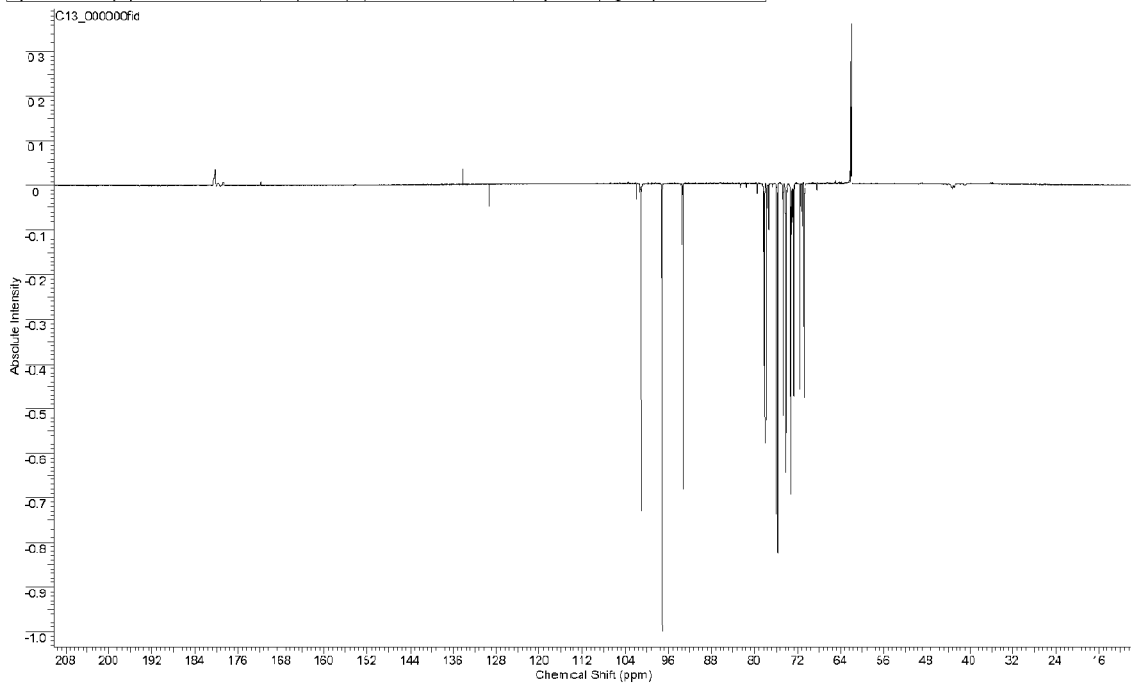
FIG. 7 is an NMR Apt spectra of the Hybrid copolymer composition (using azo initiator) of Example 69.
Figure 8:
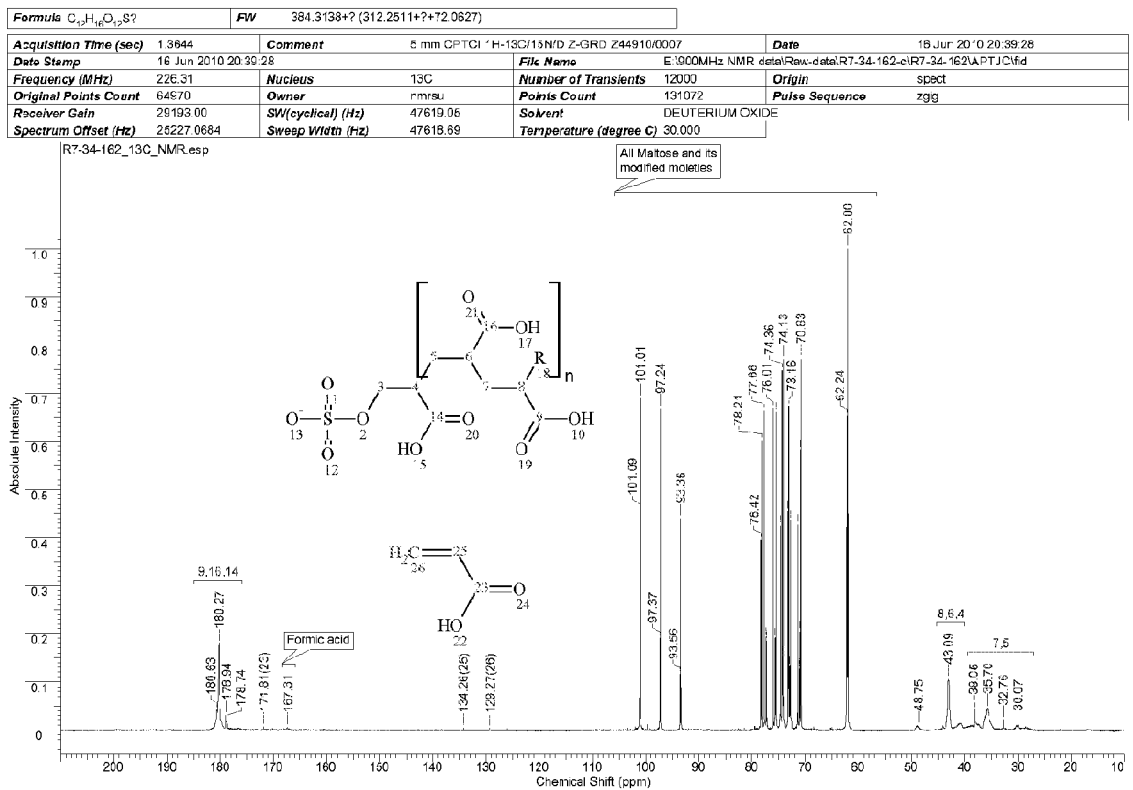
FIG. 8 is an NMR spectra of the graft copolymer composition (using persulfate initiator) of Example 70.
Figure 9:
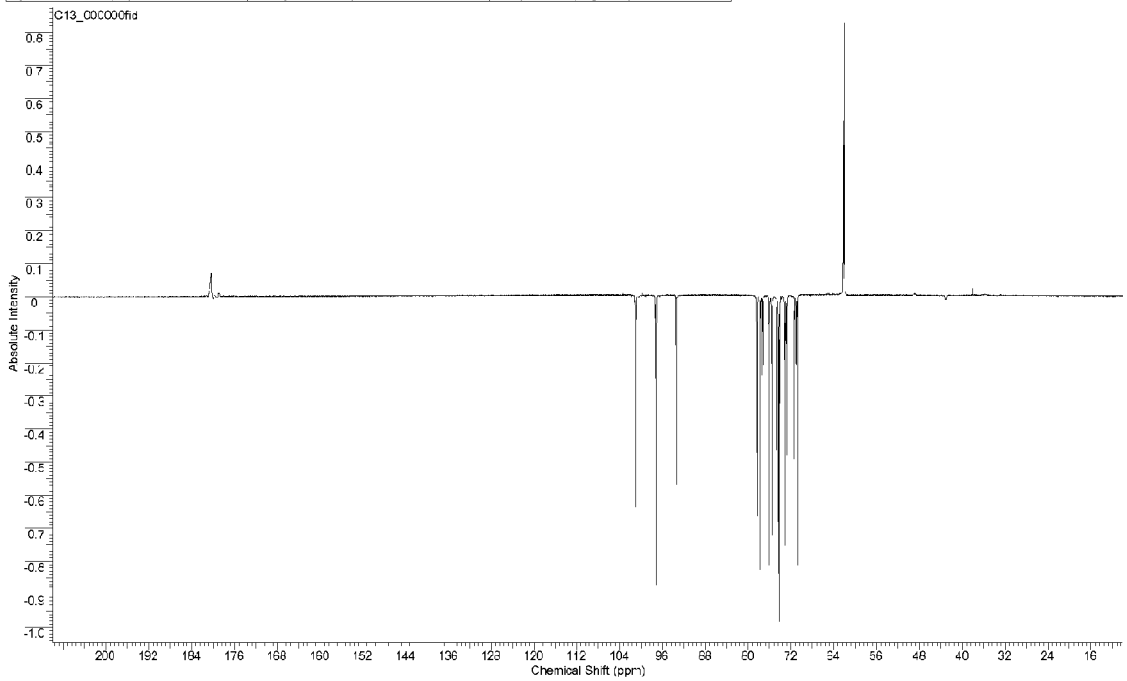
FIG. 9 is an NMR Apt spectra of the graft copolymer composition (using persulfate initiator) of Example 70.

The data in FIG. 1 (1 hour) and FIG. 2 (24 hours) indicate that a typical maltodextrin (Star Dri 180, DE 18 spray-dried maltodextrin available from Tate & Lyle, Decatur, Ill.) chain transfer agent by itself does not have any dispersancy performance. FIG. 3 also illustrates the results after a 1 hour dispersancy test between samples of a hybrid copolymer having at least one anionic ethylenically unsaturated monomer shown with maltodextrin present in amounts of 55%, 80%, 95%, 99% and 99.5%, compared to samples of a polyacrylate (AR4) having 0% maltodextrin present and a sample having 100% maltodextrin (MD) present. A commercial polyacrylate Aquatreat® AR-4 available from AkzoNobel Surface Chemistry performs very well. Therefore, as the weight percent of the chain transfer agent in the hybrid copolymer composition increases, the dispersancy performance of the polymer should decrease (see dotted line in FIGS. 1 and 2). Surprisingly, it has been found that anionic hybrid copolymer composition containing greater than 75 weight percent maltodextrin as a chain transfer agent have good dispersancy performance even though a drop in performance is expected based on the performance of the polyacrylate and the maltodextrin by itself. The performance of these copolymers are similar to those containing 33 and 55 weight percent maltodextrin of US Publication No. 20070021577(A1). Even more surprisingly the sample containing 99 weight percent maltodextrin has very good dispersancy performance and the performance of the hybrid copolymer compositions starts to drop at the 99.5% chain transfer level (FIG. 2). Clearly the polymers of this invention containing greater than 75 weight percent chain transfer agent have an unexpected benefit.

Example 58

Synthesis of Anionic Hybrid Copolymer Composition Containing Lignosulfonate as a Chain Transfer Agent 102 grams of monomethylmaleate was dissolved in 150 grams of water. 5.4 grams of ammonium hydroxide was added and the mixture was heated to 87 C. 340 grams of a naturally derived hydroxyl containing chain transfer agent a lignosulfonate (ARBO S08 50% solution available from Tembec Chemical Products Group) was added to the reactor. A monomer solution containing a mixture of 64.6 grams of acrylic acid and 3.4 grams of hydroxypropyl methacrylate was added to the reactor over a period of 5 hours. A first initiator solution comprising of 21 grams of erythorbic acid dissolved in 99 grams of water was added over a period of 5.5 hours. A second initiator solution comprising of 21 grams of a 70% solution of tertiary butyl hydroperoxide dissolved in 109 grams of water was added over a period of 5.5 hours. The reaction product was held at 87° C. for 60 minutes. The final product was a dark amber/black colored solution.

Example 59

The polymer of Example 58 was evaluated in the anti-redeposition test detailed in Example 29 except that delta Whiteness Index (ΔWI) was measured instead of ΔE where, ΔWI=($L_1$−$L_2$).

TABLE 20

| Sample | ΔWI Cotton | Poly/cotton |
|---|---|---|
| Control (no polymer) | 1.02 | 1.42 |
| Polymer of Example 58 | 0.39 | 0.51 |

Example 60

The polymer of Example 58 was tested in a phosphate inhibition test described in Example 1 of U.S. Pat. No. 5,547,612.

TABLE 21

| Polymer | Polymer concentration (ppm) | % phosphate inhibition |
|---|---|---|
| Example 58 | 25 | 11 |
| Example 58 | 50 | 95 |
| Example 58 | 100 | 100 |

Calcium phosphate inhibition numbers above 80% are considered to be acceptable in this test. These data in Table 21 above indicate that the anionic hybrid copolymer composition with lignosulfonate of Example 58 is an excellent calcium phosphate inhibitor.

Example 61

Synthesis of Amphoteric Hybrid Copolymer Composition Containing Both Anionic and Cationic Groups 150 grams of water was added to 765 grams of RediBond 5330A (available from National Starch and Chemical) (27% aqueous solution), and the solution was heated to 40° C. The pH of the solution was adjusted to pH 7.0 with 50% sodium hydroxide solution. 0.13 grams of alpha-amylase was added to the solution, which was allowed to cook for 1 hour. 254.7 grams of this pre-digested RediBond 5330A as a cationic polysaccharide chain transfer agent, 2.32 grams of 50% sodium hydroxide solution, and 20.16 grams of monomethyl maleate was heated in a reactor to 87° C. A monomer solution containing 73.88 grams of acrylic acid and 17.96 grams of water was subsequently added to the reactor over a period of 4.5 hours. An initiator solution comprised of 13.84 grams of erythorbic acid dissolved in 100 grams of water, and a second initiator solution comprised of 13.98 grams of tert-butyl hydrogen peroxide were added to the reactor at the same time as the monomer solution over a period of 5 hours. The reaction product was cooled and held at 65° C. for an additional 60 minutes. The final product was a brown solution.

Example 62

Determination of the Number of Reacted Anhhydroglucose Units Per 100 Anhydroglucose Units (AGU's)

Hydrolysis of the Samples

Prior to the glucose determination, the maltodextrins and the various copolymers were hydrolysed following the following sulfuric acid procedure. About 500 mg sample was weighed in an acid digestion bomb equipped with 30 ml teflon insert (Parr Instruments) and diluted with 1 ml 70% $H_2SO_4$ followed by addition of approximately 3 ml of distilled (milliQ) water. The mixture was heated to 90° C. for about 5 hours. This hydrolysis was carried out in duplicate for all samples.

Determination of Glucose

The amount of glucose in the various samples was determined by HPLC, using glycerol as internal standard. The HPLC conditions were as follows:

Column: IOA 1000 (Grace Alltech) (300*7.8 mm)

Column temperature: 50° C.

Mobile phase: Sulfuric acid 0.01N

Flow: 0.4 ml/min

Detection: Refractive Index

Injection volume: 20 µl.

Determination of Solid Content for the Maltodextrins

The solid content was determined by treating a known amount of sample in a Mettler Toledo HG63 halogen dryer for 20 minutes. Each analysis was carried out in duplicate.

Degree of Hydrolysis of the Maltodextrin

The glucose is representative of the degree of hydrolysis of the maltodextrin part of the polymer. A theoretical percentage of glucose for a 100% hydrolysis can be calculated for the various samples, as for each of them the exact weight of maltodextrin is known. This theoretical value is the weight of maltodextrin corrected for the addition of one molecule of water per anhydroglucose unit, i.e.:

$$GLU_{th} = [\text{weight of maltodextrin}] \times 180/162$$

The efficiency of the hydrolysis by the sulfuric acid procedure was established using the starting maltodextrins Star Dri 100 (DE 10) and Star Dri 180 (DE 18). The results are summarized in Table 22, together with the solid content of the samples. The solid content was used to correct for water adsorbed on the polymer.

TABLE 22

Efficiency of sulfuric acid hydrolysis.

| Sample code/ Component | Solid content (%) | Weight (mg) | $GLU_{th}$* (mg) | $GLU_{HPLC}$ (mg) | Recovery (%) |
|---|---|---|---|---|---|
| Star Dri 100 (DE 10) | 93.8 | 42.4 | 44.2 | 43.1 | 97.5 |
|  |  | 40.2 | 41.9 | 41.0 | 97.9 |
| Star Dri 180 (DE 18) | 93.1 | 38.6 | 39.8 | 40.1 | 100.8 |
|  |  | 42.5 | 43.9 | 43.9 | 100.0 |

* Corrected for water content

The recovery is slightly lower for the Star Dri 100 (DE 10) sample, but the efficiency of the method is very reasonable. It is important to account for the fact that the maltodextrin samples also contain a certain amount of water.

Hydrolysis of the Copolymers

The copolymer of Example 20 was hydrolyzed using the procedure detailed above. The copolymer of Example 20 contained 85 grams of DE 18 maltodextrin in approximately 339 grams of polymer. This weight of maltodextrin is corrected for the water content mentioned in Table 22,

TABLE 23

| | Determination of glucose in hydrolyzed copolymer samples (% m/m) | | | |
|---|---|---|---|---|
| Polymer | Weight percent of theoretical amount of Glucose in the polymer GLU$_{th}$* | Weight percent of glucose in polymer as determined by sulfuric acid hydrolysis | Weight percent of glucose that is unsubstituted (% unsubstituted GLU) | Number of reacted anhydroglucose units per every 100 anhydroglucose units in the polymer (100 - % unsubstituted GLU) |
| Example 20 | 23.3 | 21.8 | 93.6 | 6.4 |

*Corrected for the water content of the starting maltodextrins

The weight percent of glucose that is unsubstituted was calculated from the results of the sulfuric acid hydrolysis and GLU$_{th}$. Assuming 100% efficiency of the hydrolysis, since only unsubstituted anhydroglucose units will be hydrolysed to glucose, the ratio between the 2 values is the percentage of these unsubstituted units in the copolymers, i.e. units not carrying a synthetic chain or not reacted in some other manner. The number of reacted anhydroglucose units per every 100 anhydroglucose units in the polymer is then 100 minus the % unsubstituted GLU.

Example 63

112.6 grams of maltodextrin as a polysaccharide chain transfer agent (STAR-DRI 42R DE 42, weight average molecular weight (Mw) 906, number average molecular weight (Mn) 312, spray-dried maltodextrin available from Tate and Lyle, Decatur, Ill.) and 24.2 grams of maleic anhydride were initially dissolved in 102 grams of water in a reactor and heated to 98° C. 24.8 grams of 50% sodium hydroxide solution, and an additional 4.6 grams of water were added to the solution in the reactor. A monomer solution containing 36.2 grams of acrylic acid and 150 grams of water was subsequently added to the reactor over a period of 4 hours. An initiator solution comprised of 4.8 grams sodium persulfate dissolved in 150 grams of water was added to the reactor at the same time as the monomer solution over a period of 4 hours. The reaction product was held at 98° C. for an additional 60 minutes. The final product was a brown solution. The number of reacted anhydroglucose units per every 100 anhydroglucose units for the polymer in of this Example as determined by the procedure of Example 62 was found to be 32.6.

Example 64

150 grams of maltodextrin as a polysaccharide chain transfer agent (STAR-DRI 180 DE 18 spray-dried maltodextrin available from Tate and Lyle, Decatur, Ill.) was initially dissolved in 380 grams of water in a reactor and heated to 98° C. A monomer solution containing 50 grams of acrylic acid was subsequently added to the reactor over a period of 90 minutes. An initiator solution comprised of 3.76 grams of 2,2'-Azobis [2-(2-imidazolin-2-yl)propane]dihydrochloride (V 50 available from Wako) initiator in 50 grams of water was added to the reactor at the same time as the monomer solution over a period of 90 minutes. The reaction product was held at 98° C. for an additional 60 minutes. The final product was a clear yellow solution. The number of reacted anhydroglucose units per every 100 anhydroglucose units for the polymer in of this Example as determined by the procedure of Example 70 was found to be 4.3

Example 65

150 grams of maltodextrin as a polysaccharide chain transfer agent (Cargill MD 01918 DE 18, Mw 38215, Mn 13644) was initially dissolved in 260 grams of water and 50 grams of acrylic acid. The solution was fed into a reactor containing 100 grams of water at 98 C over a period of 90 minutes. An initiator solution comprised of 6.6 grams of sodium persulfate in 40 grams of water was added to the reactor at the same time as the monomer solution over a period of 90 minutes. The reaction product was held at 98° C. for an additional 60 minutes. The final product was a clear yellow solution. The number of reacted anhydroglucose units per every 100 anhydroglucose units for the polymer in of this Example as determined by the procedure of Example 70 was found to be 4.0.

Example 66

38 grams of maltodextrin as a polysaccharide chain transfer agent (STAR-DRI 180 DE 18 spray-dried maltodextrin, Mw 25653, Mn 13744, available from Tate and Lyle, Decatur, Ill.) were initially dissolved in 160 grams of water in a reactor and heated to 98° C. A monomer solution containing 62.8 grams of acrylic acid and 99.4 grams of 50% AMPS solution was subsequently added to the reactor over a period of 120 minutes. An initiator solution comprised of 5.0 grams of sodium persulfate in 50 grams of water was added to the reactor at the same time as the monomer solution over a period of 120 minutes. The reaction product was held at 98° C. for an additional 60 minutes. The final product was a clear yellow solution. The number of reacted anhydroglucose units per every 100 anhydroglucose units for the polymer in of this Example as determined by the procedure of Example 70 was found to be 12.6.

Example 67

The calcium carbonate inhibition performance at 15 ppm polymer was determined for the polymers of Example 20, 63, 65 and 66 in Table 24.

TABLE 24

| Polymer of Example | Poly saccharide | # of reacted AGU's per 100 AGU's | Percent CO$_3$ Inhibition at 15 ppm polymer |
|---|---|---|---|
| 20 | DE 18 | 6.3 | 99.0 |
| 63 | DE 42 | 32.6 | 99.0 |
| 65 | DE 18 | 4.3 | 81.0 |
| 66 | DE 18 | 4.0 | 80.0 |

In this test, calcium carbonate inhibition above 80% is considered to be acceptable. These data indicate that the polymers having 4 or more reacted anhydroglucose units per every 100 anhydroglucose units have good performance.

Example 68

Comparative Example of a Graft Copolymer 150 grams of maltose (available from Aldrich) and 0.035 grams of ferrous ammonium sulfate hexahydrate was dissolved in 380 grams of water in a reactor and heated to 98° C. A monomer solution containing 50 grams of acrylic acid was subsequently added to the reactor over a period of 1 hour. An initiator solution comprised of 33.7 grams of 35% hydrogen peroxide solution dissolved in 50 grams of water was added to the reactor at the same time as the monomer solution over a period of 1 hour. The reaction product was held at 98° C. for an additional 60 minutes.

Example 69

Hybrid Polymer with Maltose 150 grams of maltose (available from Aldrich) was dissolved in 380 grams of water in a reactor and heated to 98° C. A monomer solution containing 50 grams of acrylic acid was subsequently added to the reactor over a period of 1 hour. An initiator solution comprised of 3.76 grams V-50 [2,2' azobis (2-amidinopropane)dihydrochloride available from Wako] dissolved in 50 grams of water was added to the reactor at the same time as the monomer solution over a period of 1 hour. The reaction product was held at 98° C. for an additional 60 minutes.

Example 70

Hybrid Polymer with Maltose 150 grams of maltose (available from Aldrich) was dissolved in 380 grams of water in a reactor and heated to 98° C. A monomer solution containing 50 grams of acrylic acid was subsequently added to the reactor over a period of 1 hour. An initiator solution comprised of 3.4 grams sodium persulfate dissolved in 50 grams of water was added to the reactor at the same time as the monomer solution over a period of 1 hour. The reaction product was held at 98° C. for an additional 60 minutes.

Example 71

We collected NMR spectra for the samples of Example 68, 69 and 70. We used maltose as a model compound for the polysaccharide/saccharide in these samples to simplify the spectra and the analysis.

Instrument used: MSU Bruker 900 MHz NMR spectrometer.

All three samples were dissolved in D2O and analyzed by regular and APT (attached proton test) 13C NMR spectroscopy.

Summary from NMR Analysis:
1) Comparing 13C NMR spectra of all three samples, there were several extra 13C signals present in the region of 79 to 105 ppm. All these extra signals are methine-oxy carbons except small amount of quaternary carbons in the region of 98 to 105 ppm (i.e., a quaternary acetal carbon) for the Hybrid copolymer compositions of Example 69 and 70. These quaternary acetal carbons were not observed for the graft copolymer of Example 68. This indicates that the reaction mechanism of Fe(II)+ H$_2$O$_2$ (grafting) is different from the chain transfer mechanism of the azo and the persulfate initiators. This indicates that some of the chain transfer occurred on the C$_1$ acetal carbons when using azo and persulfate as initiator. There may be some more attachment points due to the formation of methine oxy-ether linkage as evidenced by the presence of some extra signals observed in 79 to 85 ppm region.

2) The overall NMR fingerprint of the graft copolymer of Example 68 is distinguishable from the Hybrid copolymer compositions of Example 69 and 70. This is evidenced by the spectra and the summary of the mole % of the different moieties in Table 25 below. The graft copolymers spectra shows the presence of ketone functionality and many extra signals in saccharide (58 to 105 ppm) and acid regions (173 to 178 ppm) which are not present in the Hybrid copolymer compositions spectra of Example 69 and 70. In addition, the graft copolymers spectra shows the presence of significant amount of formic acid (19.6 mole %) compared to little to none in the Hybrid copolymer compositions spectra of Example 69 and 70.

3) The graft copolymer sample of Example 68 also contained traces of other free disaccharides and mono sugars but were not measured and listed in the Table 25 due to NMR signals overlapping with so many new extra NMR signals in this sample.

4) $^{13}$C NMR signals of polyacrylate were mainly located from 30 to 50 ppm for backbone methine and methylene carbons while the acid functionality is located around 180 ppm.

TABLE 25

| | Mole % | | |
|---|---|---|---|
| Component | Example 101 (Graft) | Example 102 (Hybrid) | Example 103 (Hybrid) |
| α-d-Maltose | 17.7% | 26.5% | 27.5% |
| β-d-Maltose | 25.6% | 39.2% | 42.4% |
| α-D-Glucose | 8.1% | 6.9% | 7.0% |
| β-D-Glucose | 11.8% | 12.0% | 13.5% |
| Other free disaccharides | 0.0% | 1.7% | 1.1% |
| Other mono-sugars | 0.0% | 3.4% | 1.9% |
| Modified-disaccharides | 15.9% | 4.3% | 5.7% |
| Aldehyde C=O | 0.0% | 0.8% | 0.0% |
| Ketone C=O group | 1.1% | 0.0% | 0.0% |
| Formic acid | 19.7% | 0.0% | 0.6% |
| Ratio of total acrylate unit per sugar unit | 0.74 | 0.63 | 0.68 |

The carbonate inhibition of the hybrid copolymer composition samples of Example 69 and 70 were compared with the graft copolymer of Example 68.

TABLE 25

| Polymer | % carbonate inhibition at 15 ppm | # of reacted AGU's per every 100 AGU's |
|---|---|---|
| Example 68 | 50 | 19.8 |
| Example 69 | 90 | 6.7 |
| Example 70 | 82 | 6.8 |

These data indicate that the carbonate inhibition performance of the Hybrid Copolymer Compositions of this invention are better than the comparative graft copolymer (carbonate inhibition of 80% or greater as measured by this test is considered to be acceptable). In addition, the NMR spectra fingerprint of the Hybrid copolymer composition of Example 69 is different from the graft copolymer of Example 68 (see FIGS. 4-9 and Table 25). The Hybrid copolymer composition of Example 69 has 6.7 reacted AGU per every 100 AGU's. This indicates that the Hybrid copolymer (b) exists in this composition. However, one skilled in the art will recognize that the azo initiator used in Example 69 will not graft by abstracting a proton from the maltose. Therefore, the hybrid copolymer (b) in the composition of Example 69 is produced by chain transfer. Furthermore, the NMR fingerprint of Example 70 is similar to that of Example 69 which indicates that the persulfate initiator also has a chain transfer mechanism. In addition, the Hybrid copolymer composition of Example 70 has 6.8 reacted AGU's per every 100 AGU's. Therefore, both the Hybrid copolymer compositions of Examples 69 and 70 are different from the graft copolymer and are produced by a chain transfer mechanism illustrated in the first part of this application.

Example 72

55% VOC Firm Hold, Crystal Clear Pump Hairspray Formula

An exemplary 55% VOC firm hold, crystal clear pump hairspray formula was prepared using the following ingredients:

| Ingredients | INCI Designation | % W/W | Supplier |
|---|---|---|---|
| Polymer of Ex 24 | Not applicable | 12.00 | |
| AMP (reg) | Aminomethyl Propanol | 0.85 | Dow Chemical |
| Deionized Water | Water (Aqua) | 29.09 | |
| Hydroxyethylurea | Hydroxyethylurea | 3.00 | |
| Ammonium Lactate | Ammonium Lactate | 0.06 | |
| *SD Alcohol 40 | SD Alcohol 40 | 55.00 | |
| | | 100.00 | |

Preparation

Dissolve AMP in SD Alcohol 40 and water. While maintaining proper agitation, slowly pour in BALANCE 0/55. Add remaining ingredients and mix until homogenous.

Example 73

Sunscreen Formulas

Exemplary sunscreen formulas were prepared using the following ingredients:

| Ingredient | Function | Formula A | Formula B | Formula C |
|---|---|---|---|---|
| PHASE A | | | | |
| Isohexadecane | Emollient | 1.5 | 1.5 | 1.5 |
| C12-C15 alkyl benzoate | Emollient | 3.0 | 3.0 | 3.0 |
| Cyclopentasiloxane | Emollient | 2.25 | 2.25 | 2.25 |
| Sorbitan Stearate | Emulsifier | 1.0 | 1.0 | 1.0 |
| Glyceryl Stearate (and) PEG-100 Stearate | Emulsifier | 2.0 | 2.0 | 2.0 |
| Caprylic/Capric Triglyceride | Solubilizer | 0.0 | 6.25 | 6.25 |
| Isopropyl Myristate | Solubilizer | 0.0 | 6.25 | 6.25 |
| Octocrylene | UVB filter (org) | 2.0 | 0.0 | 0.0 |
| Ethylhexyl Methoxycinnamate | UVB filter (org) | 7.5 | 0.0 | 0.0 |
| Benzophenone-3 | UVB filter (org) | 3.0 | 0.0 | 0.0 |
| ZnO (and) C12-C15 Alkyl Benzoate (and) Poly-hydroxystearic Acid | UVA/B filter (inorg) | 0.0 | 6.0 | 6.0 |
| PHASE B | | | | |
| Water | | 67.25 | 54.25 | 58.65 |
| Dehydroxanthan Gum | Suspension agent, Rheology modifier | 0.5 | 0.5 | 0.0 |
| Xanthan Gum | Rheology modifier | 0.0 | 0.0 | 0.5 |
| Polymer of Example 20 | Film former | 4.4 | 4.4 | 4.4 |
| Glycerin | Humectant | 3.0 | 3.0 | 3.0 |
| TiO$_2$ and Alumina and Silica and Sodium Polyacrylate | UVB filter (inorg) | 0.0 | 7.0 | 7.0 |
| PHASE C | | | | |
| Corn Starch Modified | Aesthetic enhancer | 2.0 | 2.0 | 2.0 |
| DMDM Hydantoin and Iodopropynyl Butylcarbamate | Preservative | 0.6 | 0.6 | 0.6 |
| Citric Acid (50%) | Neutralizer | qs to pH 7 | qs to pH 7 | qs to pH 7 |
| TOTAL | | 100 | 100 | 100 |

All documents cited in the Detailed Description of the Invention are, in relevant part, incorporated herein by reference; the citation of any document is not to be construed as an admission that it is prior art with respect to the present invention.

While particular embodiments of the present invention have been illustrated and described herein, the invention is not intended to be limited to the details shown. Rather, various modifications may be made in the details within the range and scope of equivalents of the claims and without departing from the spirit and scope of the invention.

What is claimed:

1. An anionic hybrid copolymer composition comprising:
a hybrid copolymer derived from at least one anionic ethylenically unsaturated monomer selected from the group consisting of acrylic acid, methacrylic acid, ethacrylic acid, α-chloro-acrylic acid, α-cyano acrylic acid, β-methyl-acrylic acid, α-phenyl acrylic acid, β-acryloxy propionic acid, sorbic acid, α-chloro sorbic acid, angelic acid, cinnamic acid, p-chloro cinnamic acid, β-styryl acrylic acid, itaconic acid, maleic acid, citraconic acid, mesaconic acid, glutaconic acid, aconitic acid, fumaric acid, tricarboxy ethylene, muconic acid, 2-acryloxypropionic acid, 2-acrylamido-2-methyl propane sulfonic acid, vinyl sulfonic acid, sodium methallyl sulfonate, sulfonated styrene, allyloxybenzene sulfonic acid, vinyl phosphonic acid, and mixtures thereof; and a naturally derived hydroxyl containing chain transfer agent as an end group, wherein the chain transfer agent is obtained from a renewable source; and a hybrid synthetic copolymer derived from the at least one anionic ethylenically unsaturated monomer with at least one initiator fragment as an end group, said hybrid synthetic copolymer having the structure:

wherein I is the initiator fragment, H is a proton abstracted from the naturally derived hydroxyl containing chain transfer agent and $M_{hsc}$ is a synthetic portion of the hybrid synthetic copolymer derived from the at least one anionic ethylenically unsaturated monomer; and wherein the chain transfer agent is present in amounts greater than 80% by weight to about 99% by weight, based on the total weight of the hybrid copolymer; and wherein the chain transfer agent is a monosaccharide, disaccharide, oligosaccharide or polysaccharide.

2. The anionic hybrid copolymer composition of claim 1 wherein the chain transfer agent is selected from the group consisting of cellulose, derivatives of cellulose, inulin, and derivatives of inulin.

3. The anionic hybrid copolymer composition of claim 1 wherein the hybrid copolymer is water soluble.

4. The anionic hybrid copolymer composition of claim 1 wherein the hybrid copolymer has an average molecular weight of about 100,000 or less.

5. The anionic hybrid copolymer composition of claim 1 wherein the chain transfer agent has a molecular weight of about 100,000 or less.

6. The anionic hybrid copolymer composition of claim 1 wherein I is derived from a water soluble initiator.

7. The anionic hybrid copolymer composition of claim 1 wherein I is a fragment from an azo or peroxide initiator, with the proviso that the fragment is not an hydroxyl group.

8. The anionic hybrid copolymer composition of claim 1 wherein the at least one anionic ethylenically unsaturated monomer further comprises at least one ester monomer.

9. The anionic hybrid copolymer composition of claim 8 wherein the at least one ester monomer is derived from a dicarboxylic acid or is selected from the group consisting of monomethylmaleate, dimethylmaleate, monomethylitaconate, dimethylitaconate, monoethylmaleate, diethylmaleate, monoethylitaconate, diethylitaconate, monobutylmaleate, dibutylmaleate, monobutylitaconate and dibutylitaconate.

10. The composition of claim 1 wherein the chain transfer agent is present in amounts greater than 85% by weight to about 99% by weight, based on the total weight of the hybrid copolymer.

11. The composition of claim 1 wherein the chain transfer agent is present in amounts greater than 90% by weight to about 99% by weight, based on the total weight of the hybrid copolymer.

12. A formulation comprising the anionic hybrid copolymer composition of claim 1, wherein the formulation is selected from the group consisting of a cleaning formulation, a superabsorbent formulation, a fiberglass binder formulation, a rheology modifier formulation, an oil field formulation, a personal care formulation, a water treatment formulation, a dispersant formulation, a scale inhibiting formulation, a cement formulation and a concrete formulation.

13. The formulation of claim 12 wherein the formulation is the cleaning formulation and said cleaning formulation is a detergent, fabric cleaner, automatic dishwashing detergent, glass cleaner, rinse aids, fabric care formulation, fabric softener, flocculant, coagulant and emulsion breaker, a hard surface cleaner or a laundry detergent.

14. The formulation of claim 13 wherein formulation is the automatic dishwashing detergent and said automatic dishwashing detergent is substantially free of phosphates, low foaming non-ionic surfactants, glutamic acid N,N-diacetic acid or methylglycine N,N-diacetic acid or combinations thereof.

15. The formulation of claim 14 further comprising alkali metal or alkali-metal earth carbonates, citrates or silicates.

16. A scale inhibiting composition for aqueous systems, comprising an anionic hybrid copolymer composition wherein said anionic hybrid copolymer composition comprises:

a hybrid copolymer derived from at least one anionic ethylenically unsaturated monomer selected from the group consisting of acrylic acid, methacrylic acid, ethacrylic acid, α-chloro-acrylic acid, α-cyano acrylic acid, β-methyl-acrylic acid, α-phenyl acrylic acid, β-acryloxy propionic acid, sorbic acid, α-chloro sorbic acid, angelic acid, cinnamic acid, p-chloro cinnamic acid, β-styryl acrylic acid, itaconic acid, maleic acid, citraconic acid, mesaconic acid, glutaconic acid, aconitic acid, fumaric acid, tricarboxy ethylene, muconic acid, 2-acryloxypropionic acid, 2-acrylamido-2-methyl propane sulfonic acid, vinyl sulfonic acid, sodium methallyl sulfonate, sulfonated styrene, allyloxybenzene sulfonic acid, vinyl phosphonic acid, and mixtures thereof; and a naturally derived hydroxyl containing chain transfer agent as an end group, wherein the chain transfer agent is obtained from a renewable source; and a hybrid synthetic copolymer derived from the at least one anionic ethylenically unsaturated monomer with at least one initiator fragment as an end group, said hybrid synthetic copolymer having the structure:

wherein I is the initiator fragment, H is a proton abstracted from the naturally derived hydroxyl containing chain transfer agent and $M_{hsc}$ is a synthetic portion of the hybrid synthetic copolymer derived from the at least one anionic ethylenically unsaturated monomer; and wherein the chain transfer agent is present in amounts greater than 80% by weight to about 99% by weight, based on the total weight of the hybrid copolymer, wherein the chain transfer agent is a monosaccharide, disaccharide, oligosaccharide or polysaccharide, and wherein the scale inhibiting composition has a greater than 80% carbonate inhibition at a 100 ppm dosage level of the anionic hybrid copolymer composition in an aqueous system.

17. The scale inhibiting composition of claim 16 wherein the chain transfer agent is selected from the group consisting of cellulose, derivatives of cellulose, inulin, and derivatives of inulin.

18. The scale inhibiting composition of claim 16 wherein the hybrid copolymer composition is water soluble.

19. The scale inhibiting composition of claim 16 wherein the anionic hybrid copolymer composition has an average molecular weight of less than 100,000.

20. The scale inhibiting composition of claim 16 wherein the chain transfer agent has a molecular weight of less than 100,000.

21. The scale inhibiting composition of claim 16 wherein I is derived from a water soluble initiator.

22. The scale inhibiting composition of claim 16 wherein I is a fragment from an azo or peroxide initiator, with the proviso that the fragment is not an hydroxyl group.

23. The scale inhibiting composition of claim 16 wherein the hybrid copolymer has an absorption in a range of from about 300 to about 800 nanometers when activated.

24. The scale inhibiting composition of claim 16 wherein the at least one anionic ethylenically unsaturated monomer further comprises at least one ester monomer.

25. The scale inhibiting composition of claim 24 wherein the at least one ester monomer is derived from a dicarboxylic acid or is selected from the group consisting of monomethylmaleate, dimethylmaleate, monomethylitaconate, dimethylitaconate, monoethylmaleate, diethylmaleate, monoethylitaconate, diethylitaconate, monobutylmaleate, dibutylmaleate, monobutylitaconate and dibutylitaconate.

26. The scale inhibiting composition of claim 16 wherein said composition has greater than 80% carbonate inhibition at a 25 ppm dosage level of the hybrid copolymer in said aqueous system.

27. The scale inhibiting composition of claim 16 wherein the chain transfer agent is present in amounts greater than 85% by weight to about 99% by weight, based on the total weight of the hybrid copolymer.

28. The scale inhibiting composition of claim 16 wherein the chain transfer agent is present in amounts greater than 90% by weight to about 99% by weight, based on the total weight of the hybrid copolymer.

29. A method of inhibiting scale formation in an aqueous system, said method comprising adding to said aqueous system a scale inhibiting effective amount of the scale inhibiting composition of claim 16.

* * * * *